(12) United States Patent
Mori et al.

(10) Patent No.: US 7,832,145 B2
(45) Date of Patent: Nov. 16, 2010

(54) PLANT-CULTIVATING DEVICE AND PLANT-CULTIVATING METHOD

(75) Inventors: Yuichi Mori, 3-21-2-4, Kamariyaminami, Kanazawa-ku, Yokohama-shi, Kanagawa 236-0045 (JP); Akihiro Okamoto, Yokohama (JP); Makiko Kubota, Enzan (JP); Shinya Ohtsubo, Chofu (JP)

(73) Assignees: Yuichi Mori, Kanagawa (JP); Mebiol Inc., Kanagawa (JP)

( * ) Notice: Subject to any disclaimer, the term of this patent is extended or adjusted under 35 U.S.C. 154(b) by 454 days.

(21) Appl. No.: 10/542,392

(22) PCT Filed: Jan. 16, 2004

(86) PCT No.: PCT/JP2004/000319

§ 371 (c)(1), (2), (4) Date: Jul. 15, 2005

(87) PCT Pub. No.: WO2004/064499

PCT Pub. Date: Aug. 5, 2004

(65) Prior Publication Data

US 2006/0112632 A1    Jun. 1, 2006

(30) Foreign Application Priority Data

Jan. 17, 2003  (JP) ............................ 2003-010198
Sep. 26, 2003  (JP) ............................ 2003-336064

(51) Int. Cl.
*A01G 9/00* (2006.01)

(52) U.S. Cl. ........................................ 47/65.8; 47/65.7

(58) Field of Classification Search .................. 47/65.7, 47/65.8
See application file for complete search history.

(56) References Cited

U.S. PATENT DOCUMENTS

| 4,928,426 | A  | * | 5/1990 | Janssens ....................... 47/48.5 |
| 6,453,610 | B2 | * | 9/2002 | Tonkin et al. ................. 47/66.7 |
| 6,615,537 | B2 | * | 9/2003 | Tonkin et al. ............. 47/58.1 R |
| 7,166,224 | B2 | * | 1/2007 | Tonkin et al. ............... 210/640 |

(Continued)

FOREIGN PATENT DOCUMENTS

EP    0 268 556    5/1988

(Continued)

OTHER PUBLICATIONS

International Search Report, dated Apr. 6, 2004, for corresponding PCT/JP2004/000319.

(Continued)

*Primary Examiner*—Rob Swiatek
*Assistant Examiner*—Kristen C Hayes
(74) *Attorney, Agent, or Firm*—Christie, Parker & Hale, LLP

(57) ABSTRACT

A device having a shape capable of receiving the plant body to be cultivated. As at least a portion of the device, a film which can substantially be integrated with the root of the plant body is disposed. Such a structure can provide a plant-cultivating device, a plant-film integrate, and a plant-cultivating method which can preferably attain both of the supply of oxygen and the supply of water and a fertilizer component to the root of the plant body.

10 Claims, 42 Drawing Sheets

U.S. PATENT DOCUMENTS

2005/0166451 A1 * 8/2005 Stachnik .................. 47/65.7
2006/0117656 A1 * 6/2006 Graham et al. ............ 47/65.8

FOREIGN PATENT DOCUMENTS

| | | | |
|---|---|---|---|
| EP | 1203525 A1 * | 5/2002 | |
| JP | 57012929 A * | 1/1982 | |
| JP | 63-146730 | 6/1988 | |
| JP | 63-146730 A | 6/1988 | |
| WO | WO 8600494 A1 * | 1/1986 | |

OTHER PUBLICATIONS

Youeki Saibai No Shin Manyuaru, "New Manual for Nutrient Fluid Cultivations" edited by the Japan Greenhouse Horticulture Association, issued by Seibundo Shinkosha Inc., in Jul. 2002 (On Order).

Saibai, Y., et al., "New Manual for Nutrient Fluid Cultivations", edited by the Japan Greenhouse Horticulture Association; , issued by Seibundo Shinkosha Inc., in Jul. 2002 (previoulsy listed as "On Order").

English translation of pertinent portion of "New Manual for Nutrient Fluid Cultivations", listed above, p. 34, lines 10-26 and p. 33, FIGS. 3-2-1, 3-2-2 and 3-2-3.

* cited by examiner

VERMICULITE

HYPONEX 100 × DILUTION

HYPONEX 1000 × DILUTION

WATER

HYPONEX 100 × DILUTION

HYPONEX 1000 × DILUTION

WATER

TEST PIECE

NON-WOVEN FABRIC (BACK SIDE)

NON-WOVEN FABRIC (SURFACE SIDE)

PVA (BACK SIDE)

TIME OF PLANTING

EC:1.37 pH:7.2

43 DAYS AFTER PLANTING

EC:0.99 pH:4.2

Fig. 32
(b) PVA
MAY 9 (TIME OF PLANTING)
(a) PH-35

Fig. 33
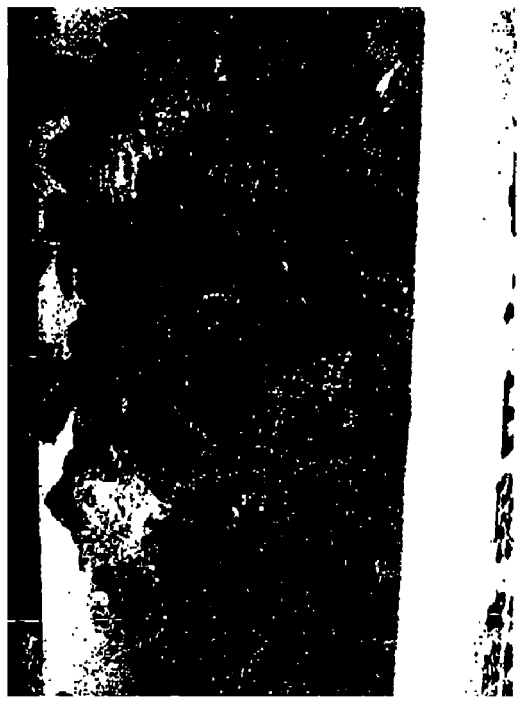
(b) PVA
JUNE 4 (END OF CULTIVATION)
(a) PH-35

PVA FILM THICKNESS: 40 μ

INTERFACE BETWEEN ROOT AND FILM →

INTERFACE BETWEEN FILM AND NUTRIENT FLUID →

NUTRIENT FLUID →

Fig. 36
(b) WITHOUT HEATING
FEB. 15 (END OF CULTIVATION)  (a) UNDER HEATING Fig. 37
(b) WITHOUT COOLING
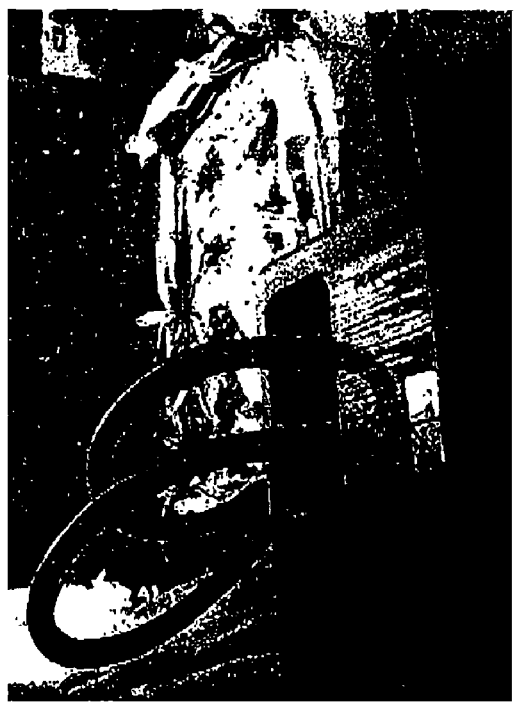
JUNE 23 (TIME OF PLANTING)　(a) UNDER COOLING Fig. 38
(b) WITHOUT COOLING
(a) UNDER COOLING
JULY 31

Fig. 39
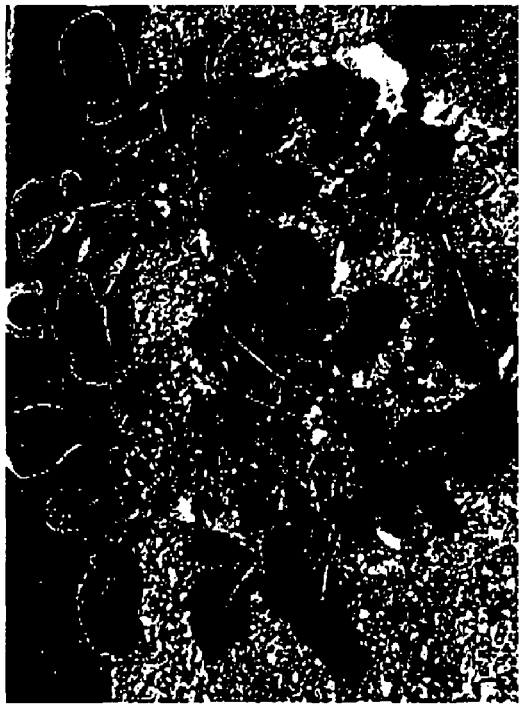
JUNE 14 (END OF CULTIVATION)
(a) RUCOLA (WITH MULCHING-FILM)
(b) RUCOLA (WITHOUT MULCHING-FILM)

Fig. 40
(b) SUNNY LETTUCE (WITHOUT MULCHING-FILM)
JUNE 14 (END OF CULTIVATION)
(a) SUNNY LETTUCE (WITH MULCHING-FILM)

CULTIVATION OF MINI-TOMATO
(AFTER 39 DAYS)

RUCOLA, LETTUCE (AFTER 20 DAYS)

SPINACH (AFTER 43 DAYS CULTIVATION)

No. 1 PVA FILM ALONE (RUCOLA)

No. 2 SUPERPOSITION OF PVA FILM AND SHOJI PAPER (BROCCOLI)

Fig. 49
(b) DEC. 30 (23 DAYS)
(a) DEC. 11 (FOUR DAYS AFTER PLANTING)

Fig. 50
(b) NOV. 15
(a) SEP. 11 (FOUR DAYS AFTER PLANTING)

Fig.52
(b) AUG. 23
(a) JULY 18

ROOTS VIEWED FROM BACK SIDE OF URETHANE FOAM

PLANT-CULTIVATING DEVICE AND PLANT-CULTIVATING METHOD

CROSS-REFERENCE TO RELATED APPLICATION

This application is a National Phase Patent Application of International Application Number PCT/JP2004/000319, filed on Jan. 16, 2004, which claims priority of Japanese Patent Application Number 2003-010198, filed on Jan. 17, 2003, and Japanese Patent Application Number 2003-336064, filed on Sep. 26, 2003.

TECHNICAL FIELD

The present invention relates to a plant-cultivating device, a plant-film integrate (or composite), and a plant-cultivating method. More specifically, the present invention relates to a plant-cultivating device having a film which can substantially be integrated with the root of a plant; a plant-film integrate having a plant body and a film which has substantially been integrated with the root of the plant body; and a plant-cultivating method using the plant-cultivating device.

According to the present invention, the supply of oxygen and the supply of water and a nutrient component to a plant body can preferably be function-separated, and therefore there can be resolved many problems associated with the direct contact of a root of plant and a nutrient fluid (or nutrient solution), as a basis of the nutrient fluid cultivation, inclusive of: difficulty in oxygen supply to the root, necessity of strict control of the nutrient components, the contamination of the nutrient fluid by the root, and the pathogenic contamination of the plant by the contaminated nutrient fluid, etc. Further, by using the plant-cultivating device according to the present invention, the plant to be cultivated can be placed under a water-suppressed condition so that the plant can easily be changed into a high-quality one. Further, by using the plant-cultivating device according to the present invention, the pathogenic contamination of the plant by the contaminated nutrient fluid can be prevented, and therefore it becomes possible to conduct a culture using a sugar-containing medium, i.e. the tissue culture of a cloned seedling or plantlet.

BACKGROUND ART

Heretofore, a variety of plants have traditionally been cultivated outdoors, i.e. by field cultivation utilizing the blessings of nature such as sunlight and soil. On the other hand, protected (or house) cultivation, i.e. cultivation in greenhouses or hothouses covered with glass or polymer films, has come to be widely conducted recently. Such protected cultivation is less liable to be affected by changes in environmental conditions than the field cultivation, and therefore it has an advantage of enabling stable production of various plants (for example vegetables).

According to statistics in 1999, the total area of protected cultivation of vegetables has amounted to 112,822 ha, which indicates the great contribution of protected cultivation in that it has enabled the year-round supply of various vegetables by eliminating no-harvest seasons despite a certain criticism of inferior nutritional value of the products compared to those produced by field cultivation.

In the protected cultivation of plants, the so-called nutrient fluid cultivation (generally referred to as "hydroponic cultivation" in most cases) is beginning to be introduced wherein plants are cultivated by using equipment in greenhouses, without using soil to maintain them, and supplying nutrient and water to them, from viewpoints that it can avoid damages caused by repeated cultivation, it permits cultivation at areas not suitable for cultivation, it leads to reduced working hours and increased yields per unit area compared to the field cultivation, and it has a potential applicability for industrial production. As compared to the cultivation using soil, this nutrient fluid cultivation has advantages that there are no damages caused by repeated cultivation (this merit is particularly great since a total ban on using methyl bromide for use in fumigation is to be implemented in the near future), the growth is generally rapid with high yields, and it is relatively easy to regulate the cultivation environment, etc.

However, the area for nutrient fluid cultivation in 1999 is 1056 ha, which is merely about 1% of the total area for protected cultivation of vegetables. Major reasons for such a lack of growth of nutrient fluid cultivation include: the fact that an initial capital investment is large, the production costs becomes high leading to an increased risk, the operation requires considerable skills, and a failure, even once, in cultivation (contamination by pathogens, the maladjustment of nutrient fluid, etc.) may cause a devastating damage, etc.

Types of nutrient fluid cultivation are classified into three kinds, including: mist cultivation, hydroponic cultivation (deep flow technique, NFT), and solid medium cultivation (sand cultivation, gravel cultivation, rock fiber cultivation). These types of the cultivation have their respective advantages and disadvantages (with respect to details and merits and demerits of each of these types, the paper "New Manual for Nutrient Fluid Cultivations" (YOUEKI SAIBAI NO SHIN MANYUARU) edited by the Japan Greenhouse Horticulture Association, issued by Seibundo Shinkosha Inc., in July, 2002 may be referred to).

The most important points or drawbacks common to each of the above-mentioned nutrient fluid cultivation systems are high initial costs, high running costs, and difficulty in oxygen supply. Further, since the root and the nutrient fluid come into direct contact with each other in the nutrient fluid cultivation, the nutrient fluid needs to be delicately controlled and the tolerable control range is very narrow, and such requirements pose a problem. In particular, utmost care must be taken on changes in the composition, concentration, and pH of the nutrient fluid. Among them, one of the most serious problems in the nutrient fluid cultivation is that the pH of the nutrient fluid may change very easily.

The supply of oxygen to plants is also the most important condition. In particular, there is a problem of oxygen deficiency, because the oxygen demand is increased high at a high temperature due to the enhanced respiration of the root, while the concentration of dissolved oxygen in the nutrient fluid becomes reduced at a high temperature. When the oxygen shortage occurs, a phenomenon of so-called "suffocation of root" arises with a result that the root become decayed, ammonia is produced, and the pH of the nutrient fluid starts to rise. In the nutrient fluid cultivation, the oxygen supply to the root is conducted by dissolving oxygen in the fluid or by the exposure of the root to the air for certain period. However, in general, the use of the dissolved oxygen is inevitable in the nutrient fluid, because of the system configuration in the nutrient fluid cultivation. However, because of the property of the poor solubility of oxygen in the nutrient fluid, it is impossible to increase the concentration of the dissolved oxygen up to adequate level, and in an actual example of the nutrient fluid cultivation, the supply of oxygen to plants is inadequate in a very large number of cases thereof.

In addition, the prevention of infection by pathogenic microorganisms is an extremely serious problem in a very large number of cases in the conventional nutrient fluid cultivation. In order to prevent the infection, various efforts have been made. Although the administration of agricultural chemicals may be contemplated, they cannot be added to the culture liquid because of their registration as agricultural chemicals, and thus various bactericidal methods that do not depend on agricultural chemicals have been devised. Specific examples thereof include: the sterilization with UV, ozone, heat, etc., the elimination of pathogenic microorganisms by filtration, the sterilization by the addition of a metal ion such as silver, and: the addition of antagonistic microorganisms, etc. However, all of them pose the problem of increased costs due to the installment and control of additional equipment, and further they may damage plants or pose new problems of, for example, decomposing an active component in the nutrient fluid, and therefore no definitive effects of preventing the infection have been obtained.

(Non-Patent Document 1)

"New Manual for Nutrient Fluid Cultivations" (YOUEKI SAIBAI NO SHIN MANYUARU) edited by the Japan Greenhouse Horticulture Association, issued by Seibundo Shinkosha Inc. in July, 2002

DISCLOSURE OF THE INVENTION

An object of the present invention is to provide a plant-cultivating device, a plant-film integrate, and a plant-cultivating method which have solved the above problem encountered in the prior art.

Another object of the present invention is to provide a plant-cultivating device, a plant-film integrate, and a plant-cultivating method which can preferably attain both of the oxygen supply to a root, and the supply of water and a nutrient component.

Another object of the present invention is to provide a plant-cultivating device, a plant-film integrate, and a plant-cultivating method which can strongly suppress the risk of infection of a plant by a pathogenic microorganism.

As a result of earnest study, the present inventors have found an entirely new phenomenon that a film (for example, a polymer film) may substantially be integrated with the root of a plant.

As a result of further study based on such a discovery, the present inventors have also found a phenomenon that the root of a plant that have substantially been integrated with a film, can uptake a nutrient component and water from the nutrient fluid via the film to a certain extent as desired for the growth of the plant.

The plant-cultivating device according to the present invention is based on the above discovery. More specifically, the plant-cultivating device is one having a shape capable of receiving a plant body to be cultivated; the device comprising, as at least a portion thereof, a film capable of being substantially integrated with the root of the plant body.

In the present invention having the above configuration, the above film may preferably be one such that in the system where water and a saline solution are brought into contact via the film at a predetermined temperature (27±3° C.) when the difference, $\Delta EC24$ hrs (dS/m) between the electric conductivities (EC) of the water phase and the saline solution phase at 24 hours after the start of measurement, is plotted on the ordinate and the thickness ($\mu$m) of the film is plotted on the abscissa, the resultant slope, $\Delta EC24$ hrs (dS/m)/10 $\mu$m, of the graph may preferably be 0.7 or less. The slope, $\Delta EC24$ hrs (dS/m)/10 $\mu$m, may more preferably be 0.5 or less and particularly preferably 0.3 or less. When such a film is used, a favorable balance between the mechanical durability based on the thickness and the nutrient permeability of the film can be easily obtained.

The present invention further provides a plant-film integrate comprising at least a plant body and a film which has substantially been integrated with the root of the plant body.

The present invention further provides a plant-cultivating method, comprising:

providing a plant-cultivating device having a shape capable of receiving a plant body to be cultivated, and comprising, as at least a portion thereof, a film capable of being substantially integrated with the root of the plant body; disposing the plant body in the device; and cultivating the plant body while allowing water containing a nutrient component or a biologically active substance to be contacted with the plant body via at least the film.

In the plant-cultivating device according to the present invention having the above configuration, the root of the plant and the nutrient fluid (i.e., a liquid containing a nutrient component) are not in direct contact with each other. In other words, the supply of oxygen to the plant body and the supply of water and a fertilizer component to the plant body may preferably be function-separated. Thus, according to the present invention, the plant can effectively utilize oxygen in the air, and can easily solve the problem in the conventional nutrient fluid cultivation (i.e., various problems resulting from the direct contact of a plant root and a nutrient fluid), including: the difficulty in the supply of oxygen to the root, the necessity of the strict control of the nutrient fluid, the contamination of the nutrient fluid from the root and the contamination of pathogenic microorganism of the plant from the contaminated nutrient fluid, etc. Further, by using the plant-cultivating device according to the present invention, the plant to be cultivated can very easily be placed under a water-suppressed condition so that the plant can be changed into a high-quality one.

As a result of further study based on the above discovery, the present inventors have also observed the following phenomenon:

Thus, according to the system of the present invention, water is supplied as water vapor to the surface of the film on the side where the root is present, and on the other hand, a fertilizer component is also dissolved as ions in the water which has entered the inside of the film. It is presumably considered that the fertilizer component is absorbed by the root in either of two methods: (1) the root absorbs the fertilizer component directly from the surface of the film together with water, or (2) when water is present on the surface of the film on the side where the root is present, the fertilizer component migrates from the inside of the film to the water on the root side and is absorbed by the root. An Example (Example 12) described hereinbelow shows data that a major fertilizer component passes through the film (or membrane), which clearly show that the fertilizer component passes through the film.

BRIEF DESCRIPTION OF DRAWINGS

FIGS. 7a and 7b, is a schematic sectional view showing a further example of an embodiment of the plant-cultivating device according to the present invention.

FIGS. 8a and 8b, is a schematic sectional view showing a further example of an embodiment of the plant-cultivating device according to the present invention.

FIG. 32, including FIGS. 32a and 32b, is a photograph showing the state of a plant at the time of planting.

FIG. 33, including FIGS. 33a and 33b, is a photograph showing the state of a plant at the end of cultivation.

FIGS. 35a and 35b, is a photograph showing the state of a plant at the time of planting with heating and without heating in winter.

FIG. 36, including FIGS. 36a and 36b, is a photograph showing the state of a plant at the end of cultivation with heating and without heating in winter.

FIG. 37, including FIGS. 37a and 37b, is a photograph showing the state of a plant at the time of planting with cooling and without cooling in the summer.

FIG. 38, including FIGS. 38a and 38b, is a photograph showing the state of a plant at the end of cultivation with cooling and without cooling in summer.

FIG. 39, including FIGS. 39a and 39b, is a photograph showing the state of a plant at the end of cultivation in the presence and absence of cover by a mulching film for preventing the evaporation of water.

FIG. 40, including FIGS. 40a and 40b, is a photograph showing the state of a plant at the end of cultivation in the presence and absence of cover by a mulching film for preventing the evaporation of water.

FIGS. 49A and 49B are photographs showing the degree of the growth of a plant obtained in Example 23.

FIGS. 50A and 50B are photographs showing the degree of the growth of a plant obtained in Example 24.

FIGS. 52A and 52B are photographs showing the degree of the growth of a plant obtained in Example 25.

BEST MODE FOR CARRYING OUT THE INVENTION

The present invention will now be explained more specifically with reference to drawings as desired. "Part" and "%" that represent a ratio of amount as used herein is based on mass unless otherwise noted specifically.

(Plant-cultivating Device)

The plant-cultivating device according to the present invention is a device which has a shape capable of receiving a plant body, and comprises, as at least a portion thereof, a film capable of being substantially integrated with the root of a plant body.

Figure 1:
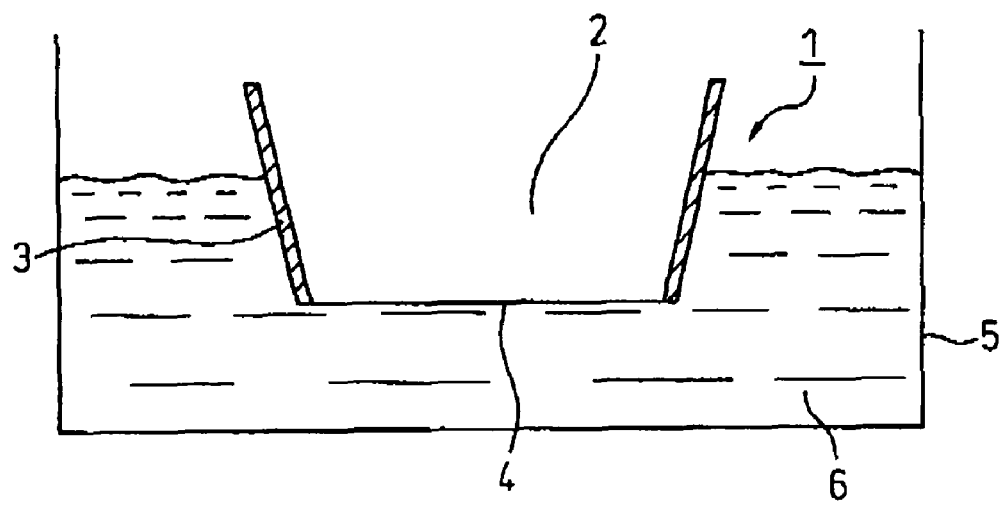
FIG. 1 is a schematic sectional view showing an example of a basic embodiment of the plant-cultivating device according to the present invention.

Referring to FIG. 1 showing one basic embodiment of the device, the plant-cultivating device 1 of this embodiment contains a wall member 3 for providing (defining) a receiving portion 2 for receiving a plant, and a film 4 disposed in at least a part of the position corresponding to the bottom portion of the receiving portion 2 defined by the wall member 3. The film 4 has a property such that it can be substantially integrated with the root of a plant body.

In FIG. 1, the film 4 is disposed on the entire bottom portion of the receiving portion 2. In the present invention, however, it is sufficient that the film 4 is disposed in at least a part of the bottom portion. Also, in view of the strength of device 1 and reinforcement of the film 4, etc., the film 4 may be divided into an appropriate number of portions thereof, by using another material (such as the same material as the wall member 3). In this case, for example, an inner frame (it may be of any shape such as latticed, radial and concentric) similar to "San (frame)" in the case of Shoji may be mounted in order to divide the film 4 into an appropriate number of portions.

Also, the entire device 1 containing the wall member 3 may be constituted by using the film 4 or the same material (the thickness may be controlled as desired) as the film 4, as desired (as long as the conditions of strength, support of a plant body, etc., are satisfied). Thus, the entire parts of a known plant-cultivating container (for example, a pot-type, a tray-type and a planter-type container) which has been conventionally used may be constituted by using the film 4 or the same material as the film 4.

The film 4 and the wall member 3 may be integrally molded, or may be fixed to each other by using adhesive or fixing means such as adhesive agent and physical fixing means.

The plant-cultivating device 1 having the above configuration may be contacted with a solution 6 so that, for example as shown in this FIG. 1, at least the bottom face (the film 4 in this case) of the receiving portion 2 may be contacted with the solution 6 disposed in a solution container 5.

Another Embodiment

Figure 2:
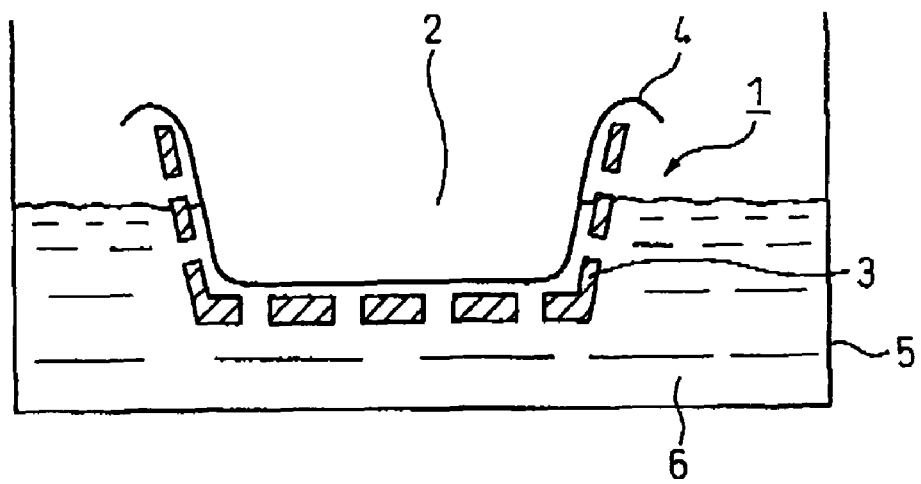
FIG. 2 is a schematic sectional view showing another example of an embodiment of the plant-cultivating device according to the present invention.

FIG. 2 is a schematic sectional view showing another embodiment of the plant-cultivating device 1 according to the present invention. Referring to FIG. 2, this embodiment is the same as that of FIG. 1 except that films 4 having a property of being substantially integrated with a plant root have been disposed entirely on the inside (the side on which the plant is disposed) of the perforated wall member 3 (for example, a wall member 3 having a shape of a "sieve basket") having a function of defining the plant-receiving portion 2.

Another Embodiment 2

Figure 48:
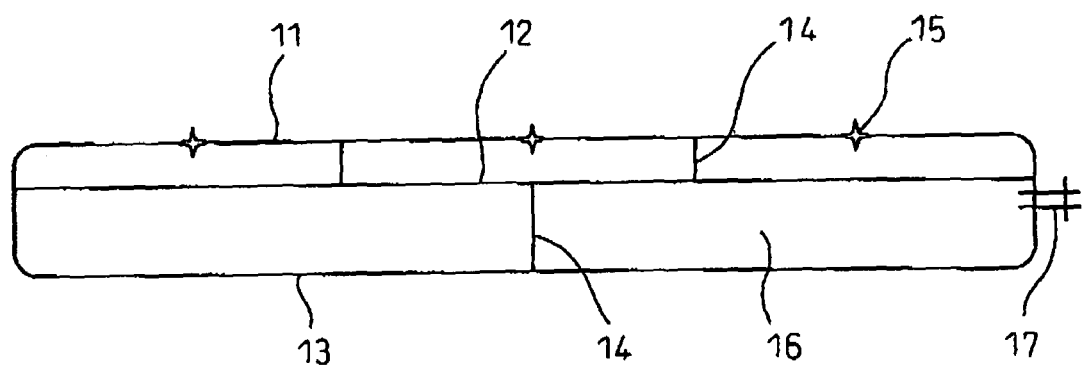
FIG. 48 is a schematic sectional view showing an embodiment in which a film for use in the present invention is disposed as an interlayer film.

Also, as shown in the schematic sectional view of FIG. 48, it may be of a three-layered configuration in which the film of the present invention is disposed as an interlayer film 12, a film having a function of retaining water or a nutrient fluid is disposed as a lower film, and further, as an upper film 11, a film that is impermeable to water vapor or less permeable to water vapor than the interlayer film 12 is disposed. It is further preferred that the upper film 11 may be permeable to air (oxygen or carbon dioxide that are useful for plant). The ends of these three layers may be attached with, for example, heat or an adhesive agent. The shape of each film or the laminated film is not specifically limited, and, as desired, the part 14 other than the end may be attached in dot forms and/or linear forms.

For example, in the upper surface film 11, a plant-planting port 15 may be mounted and a plant can be planted through it. At this time, a plant support may be used as desired. For example, in the lower surface film 13, a water-feeding and draining port 17 may be mounted, and a nutrient fluid or water 16 may be supplied through it.

By taking such a form, the nutrient fluid or water may be sealed in a bag with a result that the solution may not leak out during the transport of the entire system or installment.

Since the above system of the present invention may be placed not only horizontally but vertically like a wall-hanging, it can be used in many forms.

(Film)

According to the present invention, the film 4 constituting the plant-cultivating device 1 (or the film 12 shown in FIG. 48; in the same manner as in the description appearing hereinafter) is characterized in that it can "substantially be integrated" with the root of a plant. According to the present invention, whether it can "substantially be integrated" with the root of a plant or not, can be judged by using, for example, "Integration test" described below. According to the discovery by the present inventors, it has been found that as the film 4 which can "substantially be integrated" with the root of a plant, films having the following balance of water permeability/ion permeability may be preferred. According to the discovery by the present inventors, it can be presumed that in a film having such a balance of water permeability/ion permeability, the growth of the plant to be cultivated (specifically, the growth of root) can be easily realized, and thus substantial integration of the film with the root can be realized. According to the present invention, a plant absorbs a fertilizer as ions through the film, whereupon, it is estimated, such salt (ion) permeability of the film to be used for such a purpose may affect the amount of a fertilizer component to be supplied to the plant. It is preferred to use a film having an ion permeability of 4.5 dS/m or less in terms of a difference in the electric conductivity (EC) in a water/saline solution system at the time of four days after the start of measurement as described below, in the system where water and a saline solution are brought into contact via the film. When such a film is used, it becomes easier to preferably supply water and a fertilizer to the root and thereby to promote the integration of the film with the root.

This film may preferably have a water impermeability of 10 cm or more in terms of water pressure resistance. When such a film is used, it becomes easier to achieve a preferred oxygen supply and to prevent pathogen contamination through the film.

(Water Pressure Resistance)

The water pressure resistance can be measured according to JIS L 1092 (Method B). The water pressure resistance of the film according to the present invention may be 10 cm or more, preferably 20 cm or more, and more preferably 30 cm or more.

(Water/Ion Permeability)

According to the present invention, the film 4 preferably has a difference in the electric conductivity (EC) in a water/saline solution system measured at the cultivation temperature at the time of four days after the start of measurement may be 4.5 dS/m or less when water and saline solution (0.5% by weight) are brought into contact via the film. More preferably, the difference in the electric conductivity (EC) may be 3.5 dS/m or less. Most preferably, it may be 2.0 dS/m or less. This difference in the electric conductivity may preferably be measured in the following manner.

<Experimental Devices, etc.>

Experimental devices, equipment and materials used in the following part of the specification (including Examples) are as described in the part preceding "Examples" described below (unless otherwise specified).

<Method of Measuring Electric Conductivity>

Since a fertilizer may usually be absorbed in the form of an ion, it is preferred to grasp the amount of salts (or ions) dissolved in the solution. As a means of measuring the ion concentrations, electric conductivity (EC) may be used. EC, also referred to as specific conductivity, uses the value of electric conductivity when two sheets of electrodes having a cross section of 1 cm$^2$ are placed at a distance of 1 cm apart. The unit used is siemens (S), or S/cm. Since EC of a fertilizer fluid is small, 1/1000 of S/cm, or mS/cm, is used (in the International System of Units, it is expressed as dS/m in which d means deci).

In an actual measurement, a small amount of a sample (for example a solution) is placed using a dropper on the measuring site for the above electric conductivity, and electric conductivity is measured.

<Test of Film Permeability to Salt/Water>

A commercial salt (for example, "Hakatano Sio" described below) (10 g) is dissolved in 2000 ml of water to prepare a 0.5% saline solution (EC: about 9 dS/m).

Figure 3:
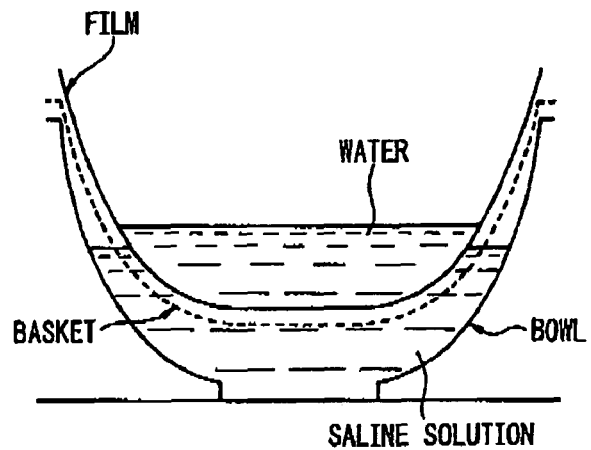
FIG. 3 is a schematic sectional view for illustrating the measurement of a film characteristic (water-saline solution contact) for use in the present invention.

Referring to FIG. 3, the above-mentioned "sieve basket bowl set" is used, on which a film to be tested (size: 200-260 ×200-260 mm) is placed, and then 150 g of water is added on the film. On the other hand, 150 g of the above saline solution is added into the bowl side, and the entire system obtained is wrapped by a wrap for food (a polyvinylidene chloride film, trade name: SARAN wrap, mfd. by Asahi Kasei Corp.) to prevent the evaporation of water. It is left to stand as it is at ordinary temperature, and EC at the water side and the saline solution side is measured every 24 hours.

According to the present invention, from the viewpoint of facilitating nutrient (organics) absorption by a plant root through a film, the above film may preferably exhibit a given permeability to glucose. This permeability to glucose can preferably be evaluated by the following permeability test of a water/glucose solution. According to the present invention, the film preferably may have a difference in concentration (Brix(%)) of a water/glucose solution system measured at the cultivation temperature at the time of three days after the start of measurement may be 4 or less when water and the glucose solution are brought into contact via the film. Further, the difference in concentration (Brix(%)) may be 3 or less, and more preferably 2 or less (specifically 1.5 or less).

<Test of Film Permeability to Water/Glucose>

Using a commercial glucose (dextrose), a 5% glucose solution is prepared. Using the same "sieve basket bowl set" as in the above saline solution test, a film to be tested (size: 200-260×200-260 mm) is placed thereon, and then 150 g of water is added on the film. On the other hand, 150 g of the glucose solution is added into the bowl side, and the entire system obtained is wrapped by a wrap for food (polyvinylidene chloride, trade name: SARAN wrap, mfd. by Asahi Kasei Corp.) to prevent the evaporation of water. At this state, it is left to stand as it is at ordinary temperature, and the sugar content (Brix) of the water side and the glucose side is measured every 24 hours using a Brix meter.

(Integration with a Plant)

The test is conducted under the condition of Example 1 (vermiculite is used) described below. Thus, using two pieces of sunny lettuce (main leaf, one-odd) which were cultivated under the condition of the liquid fertilizer (1000× diluted solution of Hyponex stock) of Example 1 for 35 days, the integration test is conducted.

Figure 17:
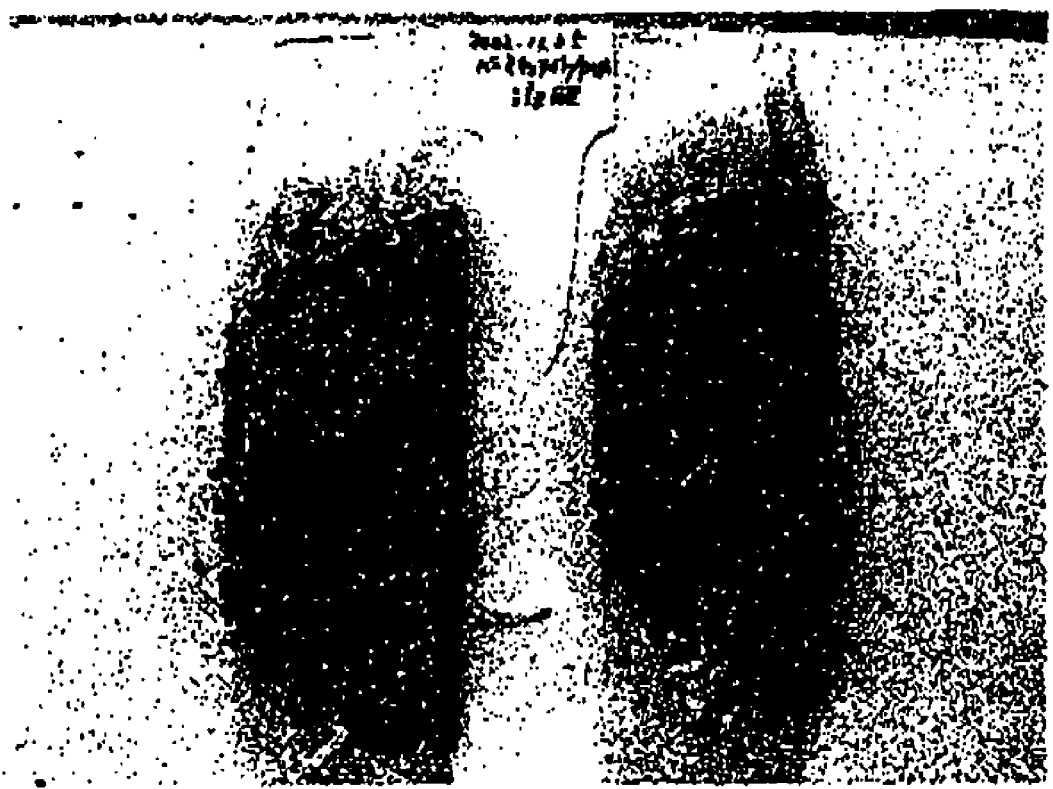
FIG. 17 is a photograph showing a test piece for the measurement of film characteristic (peeling strength) for use in the present invention.

In the plant-film system obtained, the stem and leaves are cut at the root of the plant seedling. The film is cut into a test piece with a width of 5 cm (length: about 20 cm) so that the stem of the plant whose root is closely adhered to the film may be positioned almost at the center of the film (see FIG. 17).

Figure 4:
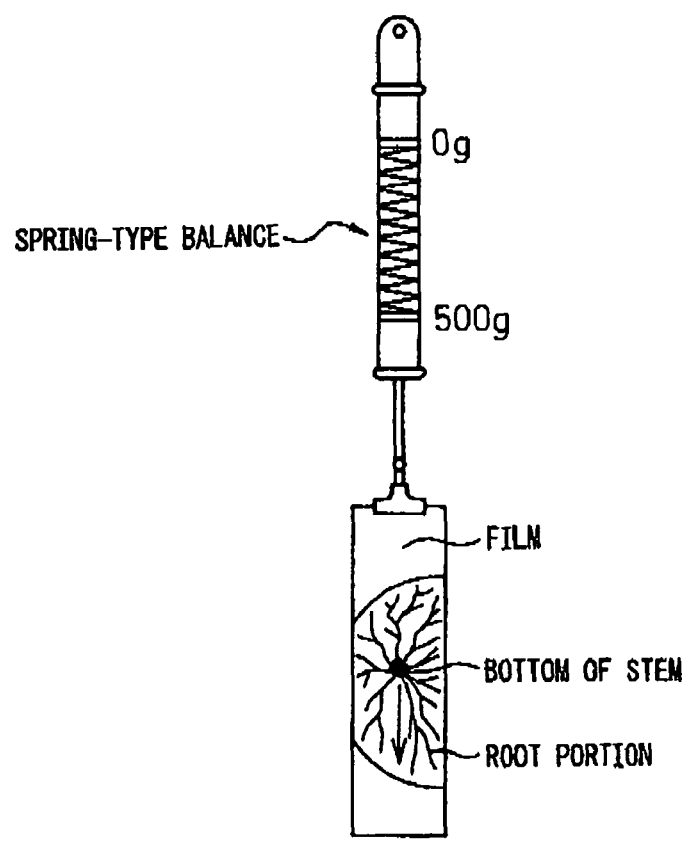
FIG. 4 is a schematic sectional for illustrating the measurement of a film characteristic (peeling strength) for use in the present invention.

Referring to FIG. 4, a commercially available clip is attached to a spring type balance, and one end of the test piece obtained as above is secured with the clip, and the weight (corresponding to the own weight of the test piece=A grams) indicated by the spring type balance is recorded. Then by holding the stem in the center of the test piece by hand, it is gently pulled downward, and the weight (load=B grams) when the root and the film are detached (or cut away) is read from the scale of the spring type balance. The initial weight is subtracted from this value, and (B-A) grams is set as the peeling load of the width of 5 cm.

According to the present invention, with regard to the peeling strength thus measured, a film that exhibits a peeling strength of 10 g or more with respect to the root of the plant can preferably be used. This peeling strength may preferably be 30 g or more, specifically 100 g or more.

(Confirmation by an Optical Microscope)

According to the present invention, as described above, the integration of a film and a plant root can be evaluated by the magnitude of the load required for peeling the root from the film to which the root is closely attached, and can also be evaluated using an optical microscope. For example, in a photomicrograph of the interface of the root and the film as shown in Example 14 below, it is observed, the root and the film have been integrated, and the root is covering the film surface leaving substantially no space in between. It may also be observed that the root per se are intimately attached with each other sharing the root.

(Film Material)

As long as the above property of "can substantially be integrated with the root" is satisfied, film material which can be used is not limited, and any material can be selected as desired from known materials and can be used. Such a material can generally be used in the form of films or films.

More specifically, as such film materials, hydrophilic materials such as polyvinyl alcohol (PVA), cellophane, cellulose acetate, cellulose nitrate, ethyl cellulose, and polyester can be used.

The thickness of the above film may generally be, but not limited to, about 300 μm or less, more preferably about 200-5 μm, and particularly preferably about 100-20 μm.

If desired, the above film 4 may be complexed (for example, laminated) with another material. Such a complex formation may be preferred from the viewpoint of maintaining film strength. The above "another material" is not specifically limited as long as it does not substantially affect the effect (substantial integration with the root) of the film 4. Even if a common porous material (for example, unwoven fabric), a water-permeable and/or an ion-permeable material, etc. is disposed outside of the film 4 (i.e. at the solution side of the film 4) when viewed from the plant body, the effect of the film 4 may not substantially be affected in most cases. On the other hand, as described below, even if a given material is disposed inside of the film 4 (i.e. at the plant side of the film 4) when viewed from the plant body, the effect of the film 4 may not substantially be affected in some cases (thus, such "another material" can also be used).

For the purpose of reinforcing the strength, and enhancing the easiness of handling and the shape-maintaining property of the film 4 of the present invention, as desired, it is complexed with "another material", such "another material" include, for example, unwoven fabric and sponge having communicating pores comprising polyethylene, polypropylene, polyethylene terephthalate, polyamide, polyvinyl alcohol, cellulose, etc. As a device for such complex formation, there can be mentioned lamination, double container, etc.

Further, considering the mechanical strength of the film 4, the outside of the film 4 may be covered with another material having a water-permeability. The "another material" may be in contact (may include partial contact) with the film 4, and, as desired, may be disposed with gaps in between. As such a material, there can be mentioned, for example, a relatively hard material such as a metal, plastics, ceramic, wood, etc.

(Device, Receiving Portion, Wall Material)

The shape and the dimension of device 1 are not specifically limited, and the shape and the dimension of conventionally used known cultivating containers (for example, pot-type, tray-type, planter-type containers) can be used as they are.

Also, the shape, dimension of the receiving portion 2 of the device 1, and the material, thickness, etc. of the wall member 3 are not specifically limited, and can be selected as desired considering various conditions such as the amount of water to be consumed, the internal volume of the container, ventilating capability of a plant support (soil, etc.), and the temperature of water.

For example, as the material for the wall member 3, general plastics such as polypropylene, polyvinyl chloride, and polyethylene may preferably be used.

(Non-Porous Hydrophilic Film and Porous Hydrophobic Film)

"As water vapor-permeable materials that are permeable to water vapor, there are known two types: (1) the porous type, and (2) the non-porous type. As the former porous type, there are hydrophobic polymer films in which a large number of micropores have been imparted, in which type water vapor passes through micropores but water does not enter micropores due to the hydrophobic property of the film, and thus, it may be presumed, ions as a fertilizer component cannot substantially enter the micropores of the film. On the other hand, according to the discovery by the present inventor, water and ions as a fertilizer component can easily enter the inside of the latter non-porous type. In this regard, (2) the non-porous type is more suited for the system of the present invention than (1) the porous type. For example, an Example (Example 13) described below shows an example of plant cultivation using a microporous polypropylene film "PH-35" (mfd. by Tokuyama Corp.). In this example, the weight of a plant cultivated for 26 days is 13.1 g for the PVA film, and the growth was poorer at 1 g or less for the microporous polypropylene film, indicating that water and a fertilizer component do not substantially enter the microporous polypropylene film and the plant can not uptake water and a fertilizer component from the inside of the film."

(Control of Growth and Brix(%) of a Plant with a Mulching Film)

According to the present invention, the so-called mulching film can preferably used. As used herein mulching film means a film used for the purpose of assisting the growth of a plant by applying cold-proof, preventing drying, etc. to the root or the stem. When such a mulching film is used, an advantage of enhanced water availability can be obtained.

Thus, in the system of the present invention, the mulching film substantially prevents evasion of water vapor migrated from the nutrient fluid to the air side via the film and allows the water vapor to be condensed on the surface of the film so that the plant can uptake the condensed water. For example, Example 18 shows the weight and Brix(%) of sunny lettuce and rocket with or without a mulching film. It demonstrates that the weight of the products is increased in the presence of the mulching film, and water suppression becomes greater when the mulching film is absent than when the mulching film is present, resulting in enhanced Brix(%).

(Water Content of a Film)

According to the discovery of the present inventors, the reason for the ion permeability of a non-porous hydrophilic film to ions is, it is presumed, that an ion which is a fertilizer component enters the inside of the film together with water and reaches to the film surface on the plant side. According to this mechanism, by increasing the water content of a film, for example, the amount of water, a fertilizer component, etc. that entered the inside of the film can be increased.

Example 26 described below demonstrates the result of measurement of water content of a film (in the film used in this example, difference in water content with changes in film type or thickness was relatively small). According to the present invention, by modifying the film into one having an enhanced water content, the permeability of water or a fertilizer component can be further enhanced. Thus, film modification in order to enhance water content can be realized by increasing the hydrophilicity of the film. For example, there is a method of copolymerizing the monomer containing hydrophilic groups such as hydroxyl groups (OH) in a method referenced in, for example, [the paper: P. J. Flory, "Polymer Chemistry I", 3rd. ed. 9th. print on Aug. 20, 1965, translated by Oka, Koten, Kyo Kanamaru, published by Maruzen Co., Ltd., pages 38-47, 48-54, 168-221]). There is also a surface modification method, details of which may be referenced in, for example, [the paper: "Plastic Materials for electricity and electronics" (DENKIDENSIYO PULASUTIKKU ZAIARYO), issued on March 2002 by Toray Research Center, Inc., pages 47-77].

(The Introduction of an Ionic Group into Film Composition)

In general, plant may absorb a fertilizer component as ions dissolved in water. For example, nitrogen, one of the fertilizer components, is absorbed by plant as $NH_4^+$ or $NO_3^-$, and which of the component is more easily absorbed varies with plant. Heretofore, modification of balances of the $NH_4^+$-form nitrogen and the $NO_3^-$-form nitrogen as fertilizers to be fed has been employed. In the system of the present invention, the introduction of a cationic group or an anionic group into the film, for example, can control the permeability of $NO_3^-$ ion or $NH_4^+$ ion. Thus, the introduction of an ionic group into film composition can be realized by a method detailed in, for example, [the paper: P. J. Flory, "Polymer Chemistry I", 3rd. ed. 9th. print on Aug. 20, 1965, translated by Oka, Koten, Kyo Kanamaru, published by Maruzen Co., Ltd., pages 38-47, 48-54, 168-221]. There is also a surface modification method, details of which may be referred to [reference: "Plastic Materials for electricity and electronics" (DENKIDENSIYO PULASUTIKKU ZIARYO), issued on March 2002 by Toray Research Center, Inc., pages 47-77].

(Method of Forming a Container)

A method of using a plant-cultivating device having the above configuration is not specifically limited, and it is sufficient that a plant-retaining support and a plant body may be disposed, allowing at least the film to be contacted to water or a fertilizer solution, and the plant body may be cultivated.

(Plant Body)

Figure 14:
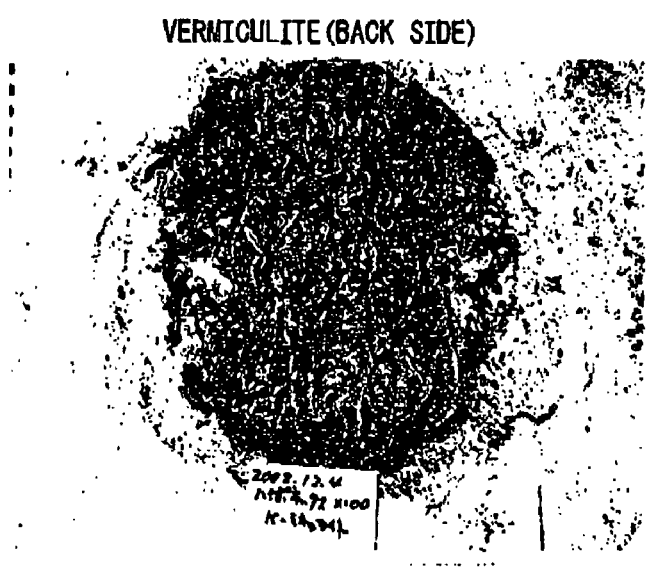
FIG. 14 is a photograph showing the state of development of a plant root on a film obtained in an Example appearing hereinafter.
Figure 15:
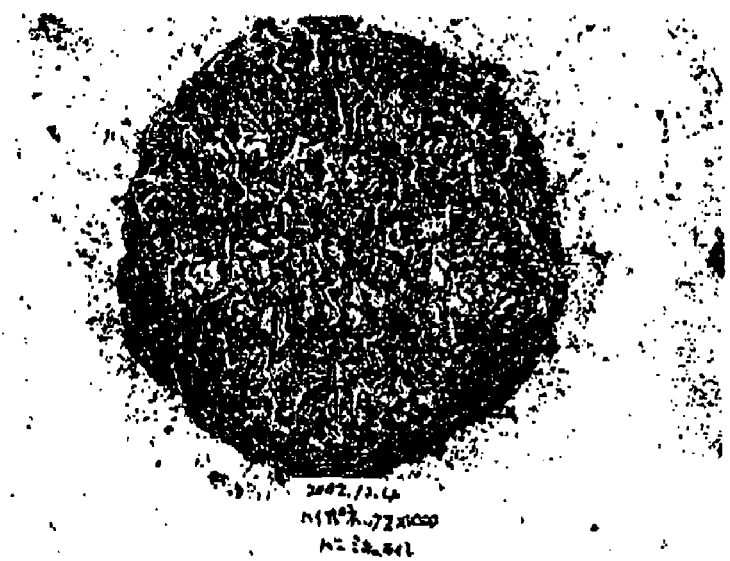
FIG. 15 is a photograph showing the state of development of a plant root on a film obtained in an Example appearing hereinafter.
Figure 34:
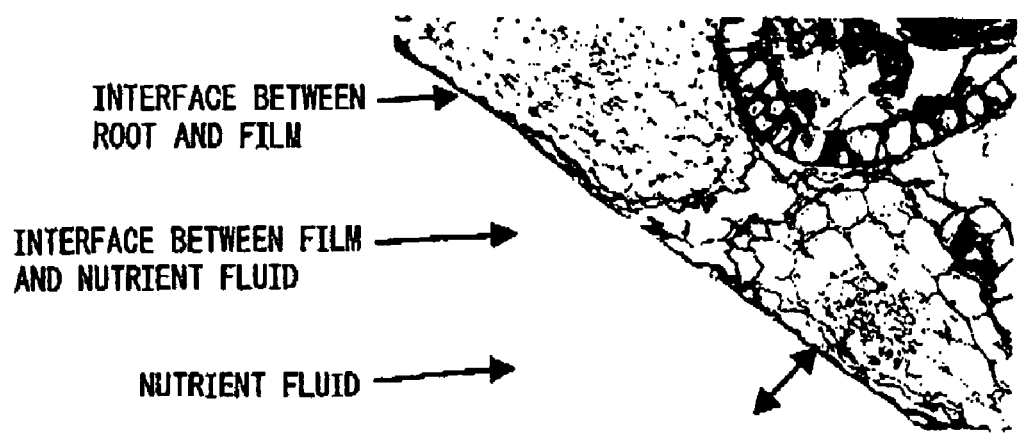
FIG. 34 is an optical microphotograph (magnification: ×250) showing the state of the vicinity of the interface of root/film/nutrient fluid at the end of the cultivation of a plant.
Figure 35:
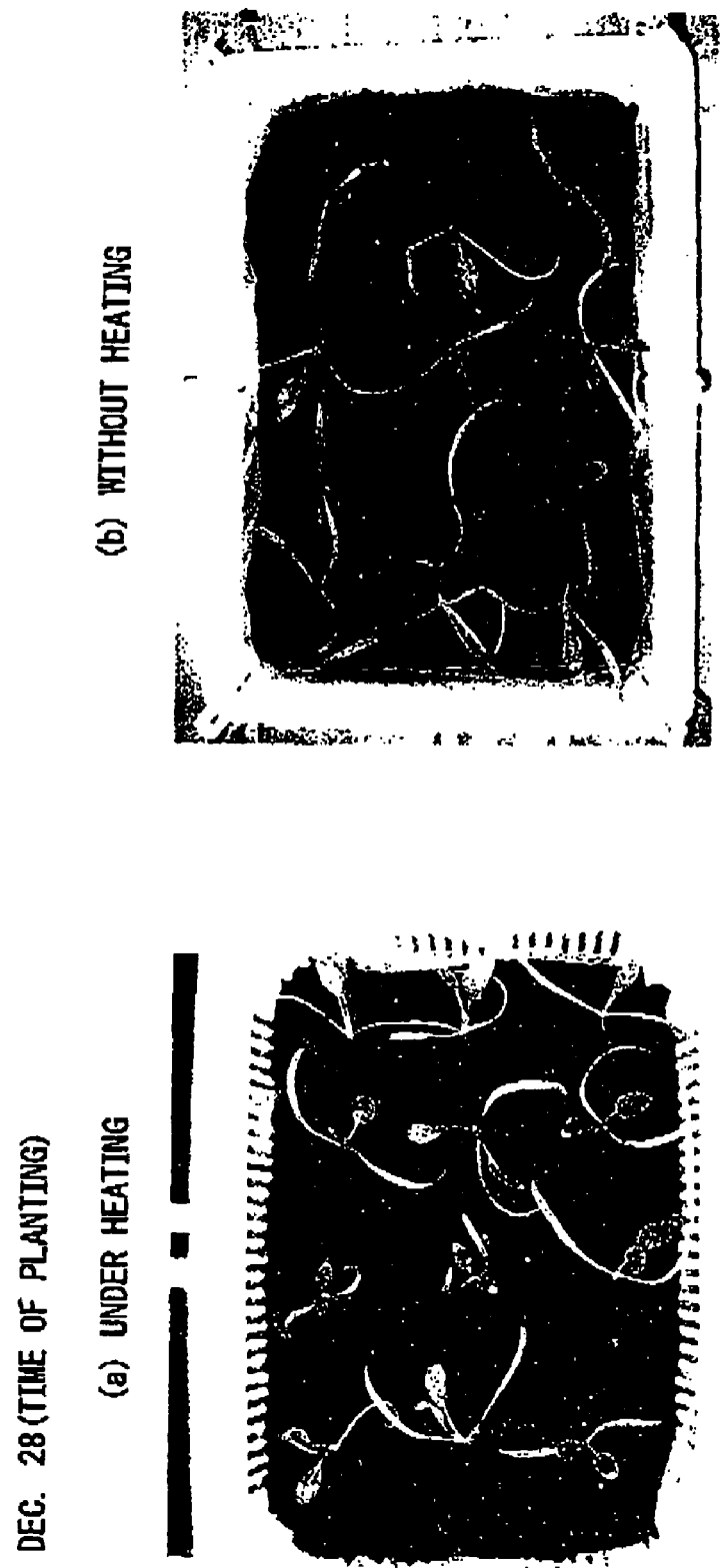
FIG. 35, including

A plant (body) which can be cultivated in the present invention is not specifically limited. In the cultivation method of the present invention, the developed root of a plant, after being integrated with the above film, can absorb a fertilizer component from the liquid in contact therewith through the film, and thus the plant may preferably be in the state of a seedling that developed to a certain degree. However, by incorporating a nutrient or water into the plant support oh the film that permits the development of root to a degree in which the plant may be integrated with the film, even seeds or seeds immediately after germination can be cultivated by the cultivation method of the present invention. Also, the growth rate of plants cultivated from seeds by the cultivation method of the present invention is large and uniform, and for example the yield of seedling production becomes enhanced. This is probably because the conventional watering in which uniform supply of water and a nutrient is very difficult, is not needed in the cultivation method of the present invention, and, as shown in FIGS. 14, 15 or 34, the root of plant bodies develops on the film contacting with each other, and sharing a rhizosphere region.

According to the present invention, it is also possible to plate a plant body (for example, a seed) directly on the film without a support, and to allow it to germinate and grow.

As shown in Example 22 described below, for example, by setting a PVA film with a thickness of 40 μm alone on a nutrient fluid or stacking a Shoji paper on the PVA film, excellent germination and growth of rocket and broccoli are recognized. In this case, the film on which the plant is cultivated may be a water vapor-permeable film alone or, as desired, a water vapor-permeable film stacked with a paper such a Shoji paper, a hydrophilic fiber, an unwoven fabric, etc.

Thus, by sowing a seed directly on a film and allowing it to grow, the plant body obtained after growth not only can be used as a "seedling", but also the cultivation method of the present invention is very useful as a production method of a sprout (shoot) of vegetables. For example, as has been described as one of the characteristics of the present invention, the contamination of a plant body with a virus or a pathogenic microorganism from the nutrient fluid can be effectively prevented. In general, also, seeds have been sown on a medium such as porous polyurethane to germinate and grow sprouts. Since sprouts can be grown on a film according to the present invention, sprouts can be easily recovered by peeling the root from the film. Further, in the production of sprouts as well, naturally many characteristics owned by the cultivation method of the present invention can be effectively used.

(Plant-Retaining Support)

According to the present invention, as the above plant support (or soil), a conventionally known support can be used without limitation. As such a support, there can be mentioned, for example, a soil (gravel, sand, earth), a carbide, a natural mineral (vermiculite, perlite, zeolite, etc.), a natural plant material (peat moss, bark, sphagnum moss, coconut shell, etc.), a hydrogel for growing plant, and a combined planting material for growing seedlings, etc.

(Soil)

As described above, any of commonly used soils or media can be used in the present invention. As such a soil or a medium, there can be mentioned, for example, a soil for use in soil cultivation and a matrix for use in hydroponic cultivation.

In the inorganic substances, there are, for example, natural sand, gravel, pumice sand, etc., and in the manufactured products (high temperature calcination, etc.), rock fiber, vermiculite, perlite, ceramic, smoked rice hull, etc. In the organic substances, there are natural peat moss, coconut fiber, bark medium, hull, Nitan, Sotan, etc., synthetic products of particulate phenol resin, etc. Alternatively, combinations thereof may be used. A minimally required amount of a fertilizer or a trace element may be added to these soils or media. According to the finding of the present inventors, in the cultivating device/cultivation method of the present invention, a nutrient required until the root of a plant grow to a degree in which they can absorb it from the nutrient fluid side in contact therewith through a film, may preferably be added into the plant support (i.e., into the plant side) as a "minimally required amount of a fertilizer or a trace element" mentioned above.

(When a Plant-Retaining Support is Absent)

In the system of the present invention, a seedling for planting can be grown even in the absence of a plant-retaining support. For example, Example 23 described below indicates an example wherein a case in which a mulching film was only stacked on the film was used, and Example 24 shows data wherein a seedling was grown using a case in which space was created with a plastic box in between the film and the mulching film. In both cases, the growth of the plant can be observed.

Example 25 also shows a case in which a soft polyurethane foam was placed in between the film and the mulching film. In this example, the plant body is grown, too. Thus, according to the present invention, it is possible to grow a plant when the soil selected from generally known soil, even when no soils are used, or when an artificial structure (plate, box, fiber, flocculent, particulate, foam, etc.) is used.

(Nutrient Fluid)

A nutrient fluid (or a fertilizer solution) which can be used in the present invention is not specifically limited. For example, a liquid component which has been used in the conventional nutrient fluid cultivation or hydroponic cultivation can also be used in the present invention.

Generally, as inorganic component such as water or a nutrient fluid essential for the growth of plant, there can be mentioned as major component: nitrogen (N), phosphorous (P), potassium (K), calcium (Ca), magnesium (Mg), and sulfur (S); as trace component: iron (Fe), manganese (Mn), boron (B), copper (Cu), zinc (Zn), and molybdenum (Mo). In addition to these, there are, as secondary component, silicon (Si), chlorine (Cl), aluminum (Al), sodium (Na), etc. If desired, another biologically active substance which controls growth and quality of a plant, can also be added as long as it does not substantially inhibit the effect of the present invention. Further, a saccharide such as glucose (dextrose) can also be added.

In recent years, materials called plant energizers containing vitamins, amino acids, saccharides, and microorganism, etc. in addition to a fertilizer component such as nitrogen, phosphorous and potassium have been used. Such "plant energizers" can also be used in the present invention. In addition to saccharides mentioned above, for example, vitamins, amino acids, etc. can also be used. For example "peptone" can be used. Also, for example "yeast extract" can be used.

As used herein, peptone is a generic term for hydrolyzates of various proteins with an enzyme or an acid. This peptone has been defined as a substance in which component from polypeptides to amino acids are present and which does not coagulate with heating treatment (with respect to the details of the "peptone", for example, [the paper "Encyclopedia of Chemistry (KAGAKU DAIJITEN) 8, Feb. 15, 1987, the abridged version, 30th print, edited by the Editors Committee for Encyclopedia of Chemistry, issued by Kyoritsu Shuppan Co., Ltd., page 369] may be referred to).

The above "yeast extract" refers to vitamins, nucleic acid component, minerals, unknown microbial growth hormones, etc. contained in yeast that have been taken out of the cell utilizing the autolytic action of the yeast per se without substantial loss thereof, and the water-soluble parts have only been subjected to low-temperature treatment and spray-dried (with respect to the details of "yeast extract", for example, [a reference "Encyclopedia of Chemistry (KAGAKU DAIJITEN) 8, Feb. 15, 1987, the abridged version, 30th print, edited by the Editors Committee for Encyclopedia of Chemistry, issued by Kyoritsu Shuppan Co., Ltd., page 603] may referred to).

(Control of Rhizosphere Temperature)

According to the present invention, by controlling the temperature of the liquid (for example, a nutrient fluid) in contact with the root of a plant body through the film as desired, the temperature of the vicinity of the root to be integrated (or have already been integrated) with the film, namely the rhizosphere temperature can be controlled. According to such an embodiment, it is easier to control the temperature of rhizosphere of the plant accurately and in an energy-saving manner as compared to a conventional method of warming/cooling the entire interior of the greenhouse, etc.

In addition, particularly in the present invention, since the root of a plant body is in intimate contact or integrated with a film, it is particularly easy to control the rhizophere temperature.

According to the present invention, since the root of a plant body is closely contacted or integrated with the film, it is specifically easy to control the temperature of the rhizosphere.

In addition, since the system of the present invention requires an extremely small amount of water to be heated or cooled, does not require dissolving process of oxygen in the nutrient fluid unlike the conventional nutrient fluid cultivation, and in this system the nutrient fluid in the cultivation bed is sealed with the film and does not come into the direct contact with the outside air, the effect of maintaining temperature is excellent and heating and cooling generally can be effectively carried out in extremely low energy cost. For example, the heating effect in winter and the cooling effect in summer of a rhizosphere for spinach are shown in Example 17. The suitable temperature for the growth of spinach is 15-20° C., and in severely cold winter and hot summer it is difficult to maintain the temperature within the adequate range. By controlling the temperature of the rhizosphere, it may be seen, excellent growth with an enhanced product yield can be obtained as seen in Example 17, even in such periods of severely cold winter and hot summer.

(Cultivation Method)

According to the present invention, a cultivation method to be used in combination with the cultivation device 1 is not specifically limited, as long as the device 1 having the above-mentioned configuration is used. Embodiments of the cultivation method which can be preferably used according to the present invention are described below.

(Preferred Cultivation Method)

Figure 5:
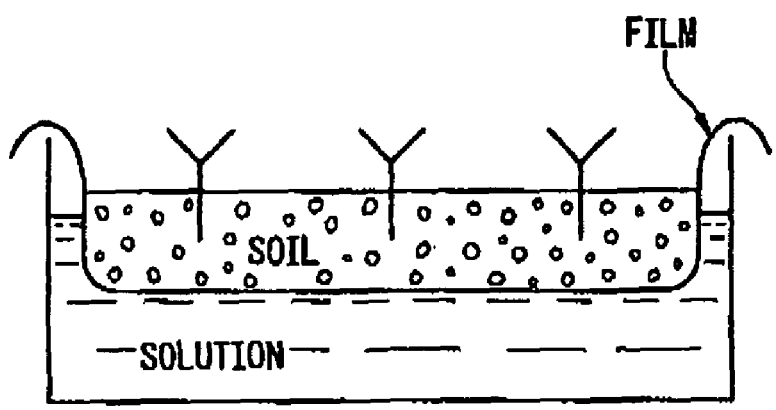
FIG. 5 is a schematic sectional view showing another example of an embodiment of the plant-cultivating device according to the present invention.

Referring to a schematic sectional view of FIG. 5, a film and a solution are in the direct contact in this embodiment. In this embodiment, the solution can be heated with a heater disposed inside of the solution. The solution can also be heated outside thereof and can be circulated. For example, using a Styrofoam box, a film is placed on a fertilizer solution (a meshed box may be used as a support), a soil is placed thereon, and seedlings can be planted. In this embodiment, the fertilizer solution is covered with the film, and the evaporation of water is carried out mainly through the plant so that the direct evaporation from the surface of the aqueous solution can be prevented by the film.

Figure 6:
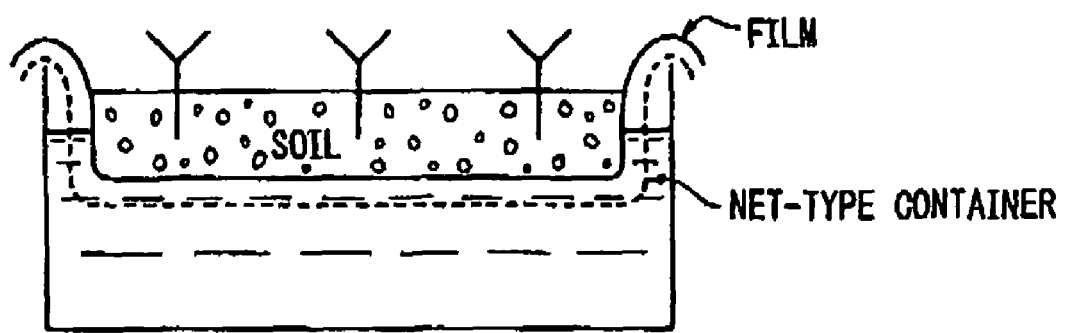
FIG. 6 is a schematic sectional view showing a further example of an embodiment of the plant-cultivating device according to the present invention.
Figure 7:
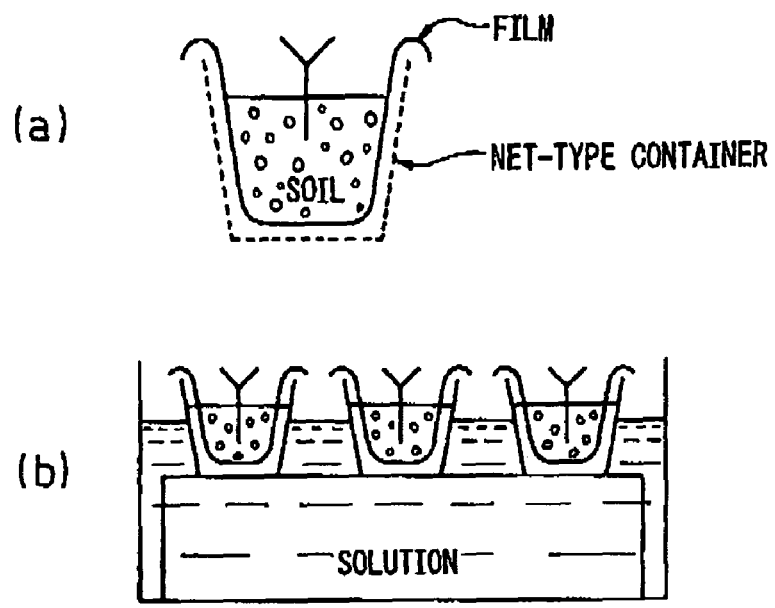
FIG. 7, including

Referring to a schematic sectional view of FIG. 6, a film is in contact with a solution through a meshed container in this embodiment. The meshed container is useful for preventing the breakage of the film, etc. FIGS. 7(a) and (b) show an example in which a film was disposed in the meshed container (FIG. 7 (a)) and an example in which a plurality of these containers were disposed in the solution (FIG. 7 (b)).

Figure 8:
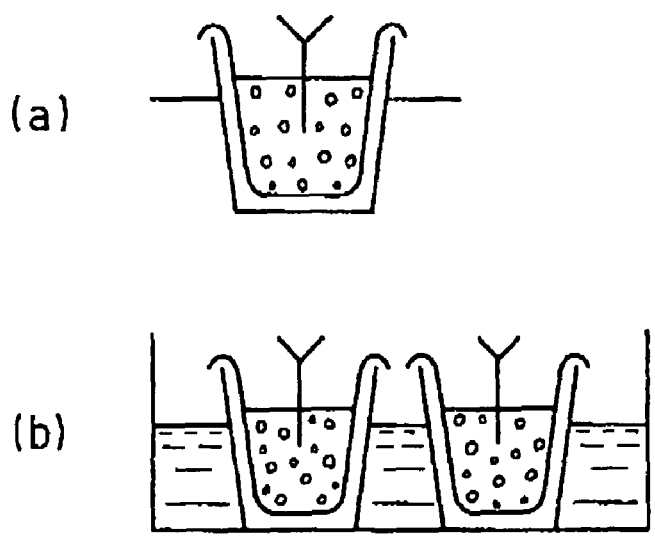
FIG. 8, including

Referring to a schematic sectional view of FIG. 8, this embodiment shows an example in which a solution and a film are bought into contact with each other by the siphon effect at the contact interface of the film and the container. This embodiment has an advantage that freedom such as easy switching of solutions is increased.

Figure 9:
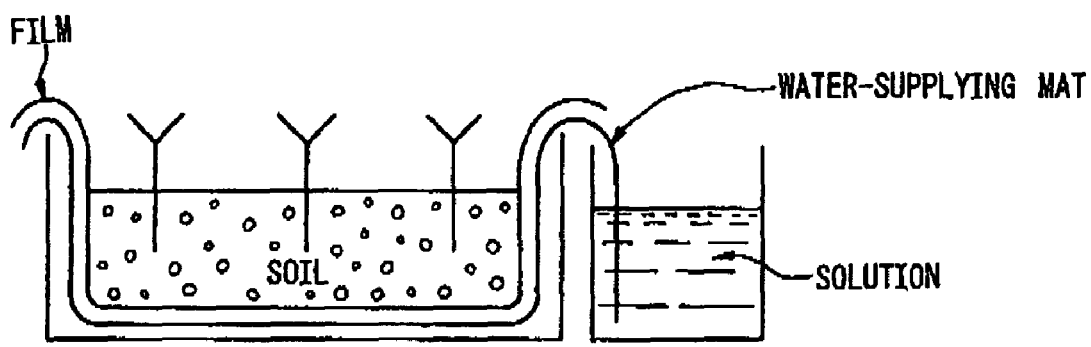
FIG. 9 is a schematic sectional view showing a further example of an embodiment of the plant-cultivating device according to the present invention.

Referring to a schematic sectional view of FIG. 9, in this embodiment a film is disposed on a feeding water mat of unwoven fabric, etc., so that the solution is brought into contact with the film and supplied thereto. For example, a container containing water may be placed adjacent to a container which uses a water supplying mat, and water is guided to the soil container by the siphon effect.

According to the present invention, two or more of the structures individually shown in FIG. 5 to FIG. 9 as described above may be combined as desired.

(Advantages of the Present Invention)

By using the cultivation device or the cultivation method of the present invention having the above configuration, the supply of oxygen to plant can be separated from water and nutrient supply to plant. Thus, oxygen to the root, conventionally a largest problem in the nutrient fluid culture, can be fully supplied from the air, and on the other hand water and nutrient can be supplied at a degree required from the nutrient fluid in contact through the film. Thus, according to the present invention, in terms of controlling nutrient fluid concentration, pH, etc., the present invention has a much larger freedom than the conventional nutrient fluid cultivation. Thus, according to the present invention, since a plant body has been physically separated from the nutrient fluid by a film, the nutrient fluid can be managed substantially irrespective of the plant body. In other words, it is extremely easy to change nutrient fluids in the course of cultivation, and/or to control the concentration of the nutrient components, pH, etc.

Further, according to the present invention, it is extremely easy to isolate a plant body from harmful bacteria in the nutrient fluid. In addition, since water supply to the plant from the nutrient fluid in contact through the film may be relatively regulated, enhancement of quality such as sugar content can be realized.

(Advantages in the Nutrient Fluid)

As described above, as inorganic component essential for the growth of plant, there can be mentioned as major component: nitrogen (N), phosphorous (P), potassium (K), calcium (Ca), magnesium (Mg), and sulfur (S); as trace component: iron (Fe), manganese (Mn), boron (B), copper (Cu), zinc (Zn), and molybdenum (Mo). In addition to these, there are, as secondary component, silicon (Si), chlorine (Cl), aluminum (Al), sodium (Na), etc. Since these components may generally be supplied in the form of ions and the amount of each component required differs with the type of plant, blending must be decided for each plant. Further, depending on the water used, adjustment of concentration may become necessary considering the amount of ions contained therein.

According to the present invention in which the nutrient fluid and the plant body have been separated by a film, such an adjustment of a nutrient fluid composition can be conducted much easily. For example, this may be carried out by picking up a plant body together with the film from the first nutrient fluid and separating therefrom, and then immersing it in the second nutrient fluid having another composition.

(Concentration of Nutrient Fluid)

The concentration of an individual component or the total concentration of salts may greatly affects the growth and quality of the products. Thus, setting the concentration value of the nutrient fluid is a very important problem. It has been demonstrated that the value greatly changes with the growth stage and the environmental condition for growth.

Up to now, it has been considered ideal in Japan that the component composition initially adjusted does not change during cultivating, and that unwanted products do not accumulate, but in a solid medium such as rock fiber, the composition and concentration of irrigated culture liquid and the drainage are not necessarily in agreement. In Europe, the nutrient fluid present in the medium is called a starter nutrient fluid, and a nutrient fluid irrigated every day is called a supplementary topdressing, distinguishing the two from each other. There is a possibility that changes in the nutrient fluid composition and concentration in every stage of cultivation may be necessary in the future.

According to the present invention in which the nutrient fluid and the plant body have been separated by a film, such an adjustment of nutrient fluid composition can be conducted much easily.

(pH)

The pH (hydrogen ion concentration) of a nutrient fluid which changes with nutrient absorption by a plant, and at the same time, it is known, may directly affect the ability of a plant root to absorb nutrient. At high pH (alkaline side) conditions, the solubility of P, Ca, Fe, and Mn may be poor, and they may not be in the form suitably absorbed by plant. Also, at low pH (acid side), Mn may be excessively absorbed. Therefore, it is generally thought that pH 5.5-6.5 is favorable. A major reason for changes in pH of the nutrient fluid during the cultivation, is lack of balance in absorption of cations and anions. Which of nitrate nitrogen ($NO_3^-$) and ammonia nitrogen ($NH_4^+$) is preferentially absorbed by the plant may also affect pH, and when $NO_3^-$ is preferentially absorbed, pH may tend to increase, and when $NH_4^+$ is preferentially absorbed, pH may tend to decrease. Further, pH of the nutrient fluid may easily change due to the generation of organic acids such as acetic acid, formic acid, propionic acid, etc. by leakage from the root or decaying of the root.

According to the present invention in which the nutrient fluid and the plant body have been separated by a film, such an adjustment of nutrient fluid pH can also be conducted much easily.

(Oxygen Concentration)

Generally in the growth of plant, oxygen supply may be the most important condition. In particular, at high temperature the respiration by the root may enhance and result in an increased demand for oxygen whereas the concentration of the dissolved oxygen may decrease, thus posing a problem of oxygen shortage. When oxygen is insufficient, a phenomenon called "root suffocation" occurs with a result that the root may be decayed, ammonia may be generated, and pH of the nutrient fluid may start to rise. In the hydroponic cultivation, the supply of oxygen to the root may be conducted by the dissolved oxygen in the liquid or by directly exposing the plant to air. When oxygen is supplied by the dissolved oxygen in the liquid, there are a case of natural dissolution at the interphase between liquid and air and a case of aeration or suction during liquid circulation. When it is directly contacted with oxygen in the air, part of NFT method (flow of the nutrient fluid is transiently suspended, and the root is completely exposed to the air) or rock fiber may be used.

With regard to the growth state of root, root hairs seldom grow and the range of adaptation to the environment is narrow when the dissolved oxygen is only used. In contrast, when oxygen in the air is used, root hairs grow well and become highly adaptive to changes in the environment. Thus, in a soil in which organic substance have been sufficiently supplied, crumbled structures of the soil have been developed and air or oxygen has been contained in the soil in sufficient quantities, and thus root hairs are well developed and thereby may become highly adaptive to the environment. In the nutrient fluid cultivation, efforts have been made to utilize the merits of being cultivated in the soil, and it is intended to compensate the drawbacks resulting when cultivated in the soil, and therefore utmost care has been taken especially for the supply of oxygen.

According to the present invention in which the nutrient fluid and the plant body have been separated by a film, such a supply of oxygen can be conducted by effectively using oxygen in air, and can be conducted better than the conventional cultivation in the soil since moisture which prevents the oxygen supply to root, is very little in the plant support.

(Technology for Controlling Nutrient Fluid for Higher Quality—High Sugar Content)

Recently, in fruits and vegetables such as tomatoes and melons, efforts have been made to impart added values by attaining higher quality. In the nutrient fluid cultivation of melons, it is a common practice to enhance the concentration of nutrient component before harvesting in order to increase sugar content. In tomatoes, fruits with high sugar content have been obtained by adding salt to the culture liquid, or adding sea water to increase the osmotic pressure, thereby to suppress water absorption by the plant body.

According to the present invention in which the nutrient fluid and the plant body have been separated by a film, higher quality such as higher sugar content can be easily attained since the supply of water to plant is in a relative shortage.

For example, Example 15 described below shows an example of cultivating mini tomato by the system of the present invention, which confirmed that a sugar content level of 7.0-8.4 may be at least possible in this example as compared to that of 4-5 of mini tomato cultivated in the conventional system. In Example 16, the Brix(%) values of sunny lettuce, rocket and spinach cultivated by the system of the present invention were compared to the conventional method, and each of the above exhibits a high Brix(%) as compared to the conventional method.

(Technology for Controlling the Nutrient Fluid for Higher Quality—Reduction in the Content of a Specific Component)

According to the present invention in which the nutrient fluid and the plant body have been separated by a film, as described above, the control of nutrient fluid composition, concentration, pH, etc. is extremely easy, and thus the adjustment of a specific component can also be conducted easily as described below.

(1) Nitrate Nitrogen

Since salads and leaf vegetables such as spinach contain petioles in the edible parts, high concentrations of nitrates may be contained. A nitrate may react with saliva thereby to turn into a nitrite, from which carcinogenic nitrosoamine may be formed during the process of digestion. Therefore, the content of nitrates contained in vegetables is becoming one of the important criteria for quality, and thus there is a demand for a smaller content thereof. In order to reduce the nitrate content of a plant body by the control of the nutrient fluid, it is also possible to suspend the supply of nitrate nitrogen for a few days before harvesting.

(2) Oxalates

Among leaf vegetables, spinach is known to contain the highest amount of oxalic acid. Not only is oxalic acid an component responsible for "aku" (lye) and "egumi" (harshness), but is known to be a causative agent for urinary calculus, and thus there is a demand for a smaller content thereof.

The content of oxalic acid can be reduced by, for example, reducing nitrate nitrogen in a nutrient fluid (though slight reduction in growth may generally be accompanied).

(Overcoming or Reducing Demerits of Nutrient Fluid Cultivation).

(1) It is generally believed that in the nutrient fluid cultivation, the initial capital investment is large. Thus, in the nutrient fluid culture, not only gardening facilities such as greenhouses and hothouses but the installment of nutrient fluid cultivation equipment are essential, and thus the initial capital investment tends to be large as compared to the soil cultivation. Further, in order to automate the control of nutrient fluid supply and environmental control, further investment is required on various controllers.

In contrast, according to the present invention in which the nutrient fluid and the plant body have been separated by a film, since a plant root that is at the same time in contact with a film, is also in contact with a matrix used in the soil cultivation, a buffering effect may be exhibited to environmental changes in the nutrient fluid, etc., thus making environmental control, etc. very easy, and therefore marked reduction in facility costs could be attained.

(2) It is generally believed that in the nutrient fluid cultivation, the running costs are thought to become higher. Thus, the nutrient fluid cultivation requires more expenses for fertilizers and for heat, electricity and power than the soil cultivation. In addition to the analysis of culture liquids and maintenance of instruments and devices, expenses may also be required for waste treatment of used rock fiber and wastes.

In contrast, according to the present invention in which the nutrient fluid and the plant body have been separated by a film, as described above, not only the cost for facilities described above but running costs may markedly be reduced by the simplification of the cultivation environment.

(3) It is generally believed that in the nutrient fluid cultivation, the control of a culture liquid is difficult. Thus, in the case of the nutrient fluid cultivation, the buffering ability of the underground part is smaller than in the soil cultivation, and thus is more vulnerable to a fertilizer component, temperature, the amount of oxygen, etc.

In contrast, according to the present invention in which the nutrient fluid and the plant body have been separated by a film, as described above, the control of the nutrient fluid described above can be markedly simplified by the buffering ability of the plant support matrix used for the soil cultivation.

(4) It is generally believed that in the nutrient fluid cultivation, the species of plant (e.g. vegetables) for which it can be introduced may be limited.

In contrast, according to the present invention in which the nutrient fluid and the plant body have been separated by a film, it is possible to further expand the species of the subject plant to be adapted than the conventional nutrient fluid cultivation due to the above facilitation of oxygen supply (oxygen supply substantially identical to or better than the field cultivation) and facilitation of nutrient fluid control.

(5) Further, in the cultivation method (e.g. the cultivation of cloned seedlings, etc.) of young seedlings which can only be grown by sugar-containing culture, glucose (dextrose), etc. have conventionally been added to an agar medium, etc. and cultivated aseptically, but this has several serious problem. For example, there are high costs associated with sterilization procedures and the use of a clean room, the removal of glucose-containing agar at the time of transfer from the cultivation stage to the field, reduced viability of the plant due to drastic changes in the moisture environment, and degraded quality of seedlings.

In contrast, according to the present invention in which the nutrient fluid and the plant body have been separated by a film, nutrient component such as glucose are supplied to plant through the film, oxygen is sufficiently supplied, and microbial contamination my be prevented by the film, and therefore the above problem of the conventional tissue culture method may be completely solved.

(The Amount Consumed of a Nutrient Fluid (Water))

It is generally believed that in the nutrient fluid cultivation a large amount of water is used, and for tomatoes during summer one shoot consumes several hundred ml to more than 2 L per day. In an example of actual measurement for gerbera, it was 1 L/day. In the case of a common nutrient fluid cultivation, more water will be consumed by increase in the contact area of the nutrient fluid with air in order to increase the dissolved oxygen.

In contrast, in the case study of the present invention, as shown in Example 19, the amount consumed of the nutrient fluid in the cultivation of sunny lettuce and rocket was 0.015 L/day/piece, indicating that the amount of water consumed is very small. In addition, since the amount of water used is small, waste of fertilizers is expected to be reduced. That the amount of water used is small, provides an economic advantage in terms of capital investment and running costs. Further, according to the present invention, the amount used of water and fertilizers may be minimized, which, in addition to reduced costs, can minimized the waste liquids used, enabling the minimization of environmental pollution.

(Reuse of Nutrient Fluid, Contamination Prevention)

In accordance with the system of the present invention in which the nutrient fluid and the plant body have been separated by a film, as described above, secretions from the root and/or contamination of the nutrient fluid from the soil are rare, and almost no impurities are contained in the nutrient fluid after use, facilitating the control of pH and nutrient fluid concentration. Example 20 shows the result in which the degree of contamination of the nutrient fluid after cultivating several vegetables. In any case of this Example 20, the nutrient fluid after use is clear and almost maintains the initial transparency. This is probably because the nutrient fluid has been covered with the film on which the soil is spread, and thus there is little contamination from the soil, or oxygen in the air cannot easily enter, or no light enters thereinto, and microorganism and algae can not easily grow. Therefore, treatments required for the reuse of a nutrient fluid is easy and a procedure therefore may be minimized, and reuse may become easier.

Also, since there is little soil contamination from the nutrient fluid, it becomes easier to recover, qualify and quantify trace elements secreted from a plant root by using, as the soil, materials that do not contain a fertilizer component or other impurities.

(Grafting)

Generally, when vegetables cannot grow due to diseases and nematodes in the soil, or low or high temperature, seedlings are sometimes prepared by grafting of a scion of a cultivar to a rootstock having a pest resistance, a dry and humidity resistance or a cold and heat resistance. Cultivation using grafting has been used for the cultivation of vegetables such as watermelon, melon, cucumber, tomato, and egg plant, with 95% of watermelon, 40-90% of melon, cucumber and egg plant, 5-15% of tomato being cultivated by grafting.

Nutrient sources of grafted crops are basically the absorption of inorganic nutrient from the root (of the rootstock) and photosynthesis, whereas since the nutrient fluid and the plant body have been separated by a film in the present invention, it is also possible to supply nutrient such as glucose to a plant to be grafted (or grafted plant) through the film until the scion has been completely joined to the rootstock. Also, since the root of a seedling prepared by the system of the present invention has an excellent growing ability, a large quantity of root, and well-developed root hairs, it is suitable as a rootstock for use in grafting.

(Relationship between Film Strength and Ion Permeability)

It is generally believed that as the thickness of a film increases, the permeability of a nutrient fluid tends to decrease (though the resistance of the film to breakage by root, etc. increases).

In accordance with the system of the present invention, plant cultivation is carried out on the film for a long time, and thus it is preferred that a long-term durability (for example, resistance to breakage) of the film is high. As a method of enhancing the durability of a film, there are methods of changing the type of the film by changing composition or processing methods such as stretching, or in the case of the same type, a method of increasing the thickness thereof. In contrast, when film thickness is only increased, ion permeability may tend to decrease.

However, according to the finding of the present inventor, it was found that in a film having a skin structure, an increased thickness may not markedly decrease permeability. In the case of the solvent casting, for example, the surface alone is initially dried and form a dense film (skin layer), and thus a film having a skin structure may be formed. In this case, parts (interior of the film) other than the skin structure mostly remain porous. According to the finding of the present inventors, it may be estimated that permeability of the dense skin layer is rate-limiting in "permeability of the nutrient fluid" and the porous parts in the interior has little effect (i.e., an increased thickness may not markedly decrease permeability unless the thickness of the skin structure greatly changes). For example, it has been found that when a PVA film is used as described below, an increased thickness does not markedly decrease permeability, which is very favorable. As described below in Example 21, a PVA film has an advantage that if the film thickness is increased in order to enhance film strength, the permeability of a 0.5% saline, a measure of ion permeability for a fertilizer component, does not greatly change.

This Example 21 demonstrates the results of a study in which a hydrophilic polyester film and a PVA film were examined on the permeability of a 0.5% saline, a measure of film permeability for a fertilizer ions, by changing film thickness in the range of 20-75 μm. It can be seen that when film thickness is changed in 25-65 μm in the case of a PVA film, saline solution permeability changes very little, indicating that the film is very advantageous in the plant cultivation by the system of the present invention.

(Dependence of Water/Ion Permeability on Film Thickness)

According to the present invention, the above film may preferably have dependence of water/ion permeability on film thickness, the water/ion permeability being expressed as a difference in the electric conductivity (EC) in a water/saline solution system measured 24 hours after the start of measurement when water and saline solution (0.5% by weight) are brought into contact through the film so that the water and saline solution face each other through the film at a given temperature (27±3° C.). It is because when this dependence of water/ion permeability on film thickness is small (for example, from the viewpoint of increasing the breakage resistance of the film), the increased film thickness may not markedly reduce the water/ion permeability of the film, thus enabling both of the enhanced breakage resistance of the film and the maintenance of water/ion permeability.

More specifically, when water and saline solution are brought into contact through the film so that the water and saline solution face each other through the film at 27+/−3° C., and the difference, ΔEC24 hrs (dS/m), in the electric conductivity in a water/saline solution system at 24 hours after the start of measurement is plotted on the ordinate and the thickness (μm) of the film is plotted on the abscissa, the slope, ΔEC24 hrs (dS/m)/10 μm (i.e. variation in ΔEC24 hrs per 10 μm thickness), of the graph may preferably be 0.7 or less, and more preferably 0.5 or less (particularly preferably 0.3 or less).

Although a relatively high temperature (27+/−3° C.) was used in the above film permeability study, the temperature is only used to confirm the film which can be preferably used in the present invention, and other temperatures (for example, temperature condition at the actual cultivation) are not limited in any way. Thus, according to the present invention, for example, by substantially omitting temperature control, a plant body can be cultivated at a relatively cold condition (winter, etc.).

Now the present invention will be explained in further details with reference to Examples.

EXAMPLES

The methods used hereinbelow are as follows in addition to those described above.

<Measurement of the Amount of Evaporated Water>

Figure 10:
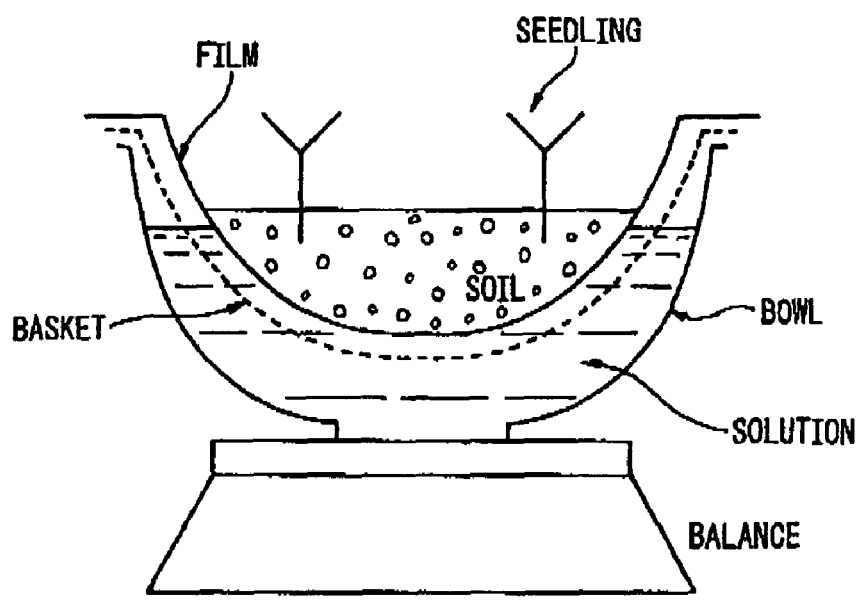
FIG. 10 is a schematic sectional for illustrating the measurement of a film characteristic (amount of water evaporation) for use in the present invention.

Referring to the schematic sectional view in FIG. 10, the above-mentioned "sieve basket bowl set" was used, and after placing a film (size: 200-260×200-260 mm) in a sieve basket, the soil was added, on which seedlings (1-2 pieces) were planted. After water or a predetermined amount of the diluted solution of a fertilizer is added into the bowl, the sieve basket was placed thereon. On a regular basis, the weight was measured on pan scales, and from the amount decreased, the amount of the evaporated water was determined. When the amount decreased due to evaporation, etc., the liquid was added as desired.

<Observation of Growth>

The photographs of growth of the seedling were taken by a digital camera (digital camera: IXY Digital 200a mfd. by Canon Inc.).

<Observation and Measurement after Completion of Study>

After the study was completed, the backside of the film on which the root is present was photographed, or after removing the film, photographs were taken with the part of the root in the center. The weight of the seedling developed was measured with the root on, or after the root was cut, the weight of the leaf was measured.

<Measurement of pH> pH was measured using a pH meter described below. The sensor part calibrated with a calibration solution (pH 7.0) was dipped in a solution to be measured, the main body was gently shaken until the value became stabilized, when the value displayed on the LCD (liquid crystal) display was read.

<Measurement of Brix(%)>

Brix(%) was measured using a Brix meter (refractometer). The solution for measurement was sampled using a dropper, and dropped on the prism part of the Brix meter, and after measurement, the value of the LCD was read.

<Experimental Devices, etc.>

1. Experimental devices and devices used

1) Sieve basket bowl set: The radius of the sieve basket 6.4 cm (the area of the bottom face about 130 $cm^2$), mfd. by Sakata Seed Corporation 2) Styrofoam box: size 55×32×15 cm, etc.

3) Pan scales: Max. 1 Kg, mfd. by Tanita

4) Spring type balance: Max. 500 g, mfd. by Kamoshita Seieijo K.K.

5) Post scale: Postman 100, mfd. by Maruzen Co., Ltd.

6) Conductometer: Twin Cond B-173, mfd. by Horiba Ltd.

7) pH meter: pH pal, TRANS Instruments mfd. by Gunze Sangyo
8) Brix meter (refractometer): PR201, mfd. by Atago, Co., Ltd.

2. Materials used
(soil)
1) Supermix A: Water content about 70%, contains a trace amount of fertilizers, mfd. by Sakata Seed Corporation
2) Rock fiber: granular cotton for cultivation 66R (fine particles), mfd. by Nitto Boseki Co., Ltd. Component (%): $SiO_2$ 43, CaO 33, $Al_2O_3$ 15, MgO 6, $Fe_2O_3$ 1 or less, MnO 1 or less
3) Vermiculite: Type GS, mfd. by Nittai K.K.

(film)
4) Polyvinyl alcohol (PVA): 40 μm, mfd. by Aicello Chemical Co., Ltd.
5) Biaxially oriented PVA: BOVLON, mfd. by The Nippon Synthetic Chemical Industry Co., Ltd.
6) Hydrophilic polyester, one with unwoven fabric, one with cloth: 12 μm, mfd. by Dupont
7) Cellophane
8) Permeable cellophane: mfd. by Yokohama Shoji K.K.
9) Micro porous polypropylene film: PH-35 (about 40 μm), mfd. by Tokuyama
10) Unwoven fabric: Shaleria (ultrafine fiber unwoven fabric) mfd. by Asahi Kasei Corp. (for seedling)
11) Sunny lettuce: Red Fire, mfd. by Takii Co., Ltd.
12) Pansy: Maxim F-1, mfd. by Sakata Seed Corporation
(fertilizer)
13) Stock Hyponex: mfd. by Hyponex Japan Co., Ltd., Total nitrogen content 5.0% wherein ammonia nitrogen 1.95%, nitrate nitrogen 0.90%, water-soluble phosphoric acid 10.0%, water-soluble potassium 5.0%, water-soluble magnesia 0.05%, water-soluble manganese 0.001%, water-soluble boron 0.005% (others)
14) Hakatano Sio: mfd. by Hakata Engyo Co., Ltd. In 100 g, sodium 37.5 g, magnesium 110 mg, calcium 90 mg, potassium 50 mg
15) Glucose: Glucose 100 mfd. by ES NA Example 1

(Effect of Liquid Fertilizer)

Using the system of FIG. 10, the effect of the concentration of Hyponex stock was examined. Thus, the effects of Hyponex 100×diluted solution, 1000×diluted solution, and water (tap water) were compared.

On a film (PVA) with a dimension of about 20 cm×20 cm, about 300 ml of vermiculite or rock fiber was placed as the soil. Into this soil, two pieces of sunny lettuce (main leaf, one-odd piece) were disposed. Six different tests were conducted for each soil and each solution. At this time, 300 ml each of the solution was used, and the soil was placed on the film (PVA) at a depth of 2 cm. The experiment was conducted in a greenhouse, and natural sunlight was used. The temperature at the time of experiment was about 0-25° C. and the humidity was about 50-90% RH.

The amount of water evaporation and the EC value of the solution were measured at the time of day 13 and 35 after the start of cultivation. At the time of day 35, the "peeling test" mentioned above was also conducted.

The above experimental condition can be summarized as follows:

1. Experiment
1) Film: PVA 40 μm (Aicello Chemical Co., Ltd.), 200×200 mm
2) Seedling: Sunny lettuce, one-odd main leaf
3) Soil; vermiculite (fine particles), rock fiber 66R
4) Solution: water, Hyponex stock, a 100×diluted aqueous solution, a 1000×diluted aqueous solution
5) devices: A set of a sieve basket and a bowl
6) Place: Greenhouse (without control of temperature or humidity)
7) Experimental method: 150 g of vermiculite (moisture 73%, dry weight 40 g) or 200 g of rock fiber (moisture 79%, dry weight 40 g) was placed on the film (200×200 mm) which was set on a sieve basket. Then two seedlings were planted into the vermiculite or the rock fiber on the film. Into the bowl, 240-300 g of water or the nutrient fluid was added, and the sieve basket with the film and the planted seedlings was placed thereon.
8) Period: October 29 to Dec. 4, 2002. The results obtained in the above experiment are shown in Table 1 below.

TABLE 1

| | | Exp. No. | | | | | |
|---|---|---|---|---|---|---|---|
| | | 1-1 | 1-2 | 1-3 | 2-1 | 2-2 | 2-3 |
| Exp. condition | film | PVA 40 μm | | | | | |
| | seedling | sunny lettuce having one-odd true leaf (two seedlings for each condition) | | | | | |
| | soil | vermiculite | | | rock fiber | | |
| | dilution factor for liquid fertilizer | 100x | 1000x | water | 100x | 1000x | water |
| Exp. results | amount of water evaporation (g) | | | | | | |
| | 13 days | 107 | 105 | 105 | 124 | 124 | 114 |
| | 35 days | 201 | 201 | 182 | 221 | 231 | 209 |
| | liquid fertilizer EC (dS/m) | | | | | | |
| | 0 days | 3.6 | 0.61 | — | 3.6 | 0.61 | — |
| | 13 days | 3.3/3.4 | .58/.58 | — | 3.3/3.5 | .64/.64 | — |
| | 35 days | 4.2 | 0.31 | 0.18 | 4.2 | 0.52 | 0.36 |
| | leaf weight (g) | 5 | 3 | <1 | 2 | 2 | <1 |
| | peeling strength (g) | 260 | 160 | 8 | 25 | 110 | 3 |

Figure 11:
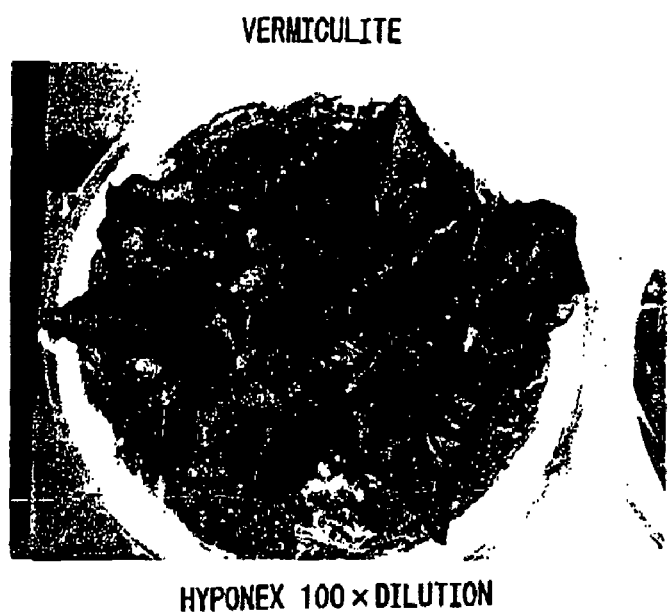
FIG. 11 is a photograph showing the state of growth of a plant obtained in an Example appearing hereinafter.
Figure 12:
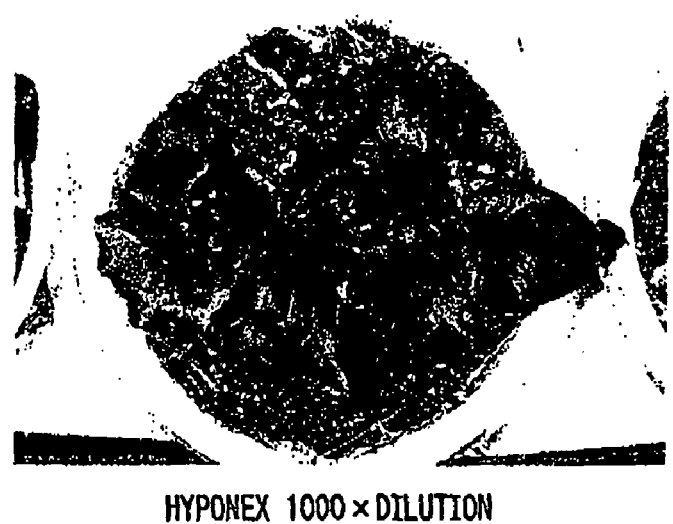
FIG. 12 is a photograph showing the state of growth of a plant obtained in an Example appearing hereinafter.
Figure 13:
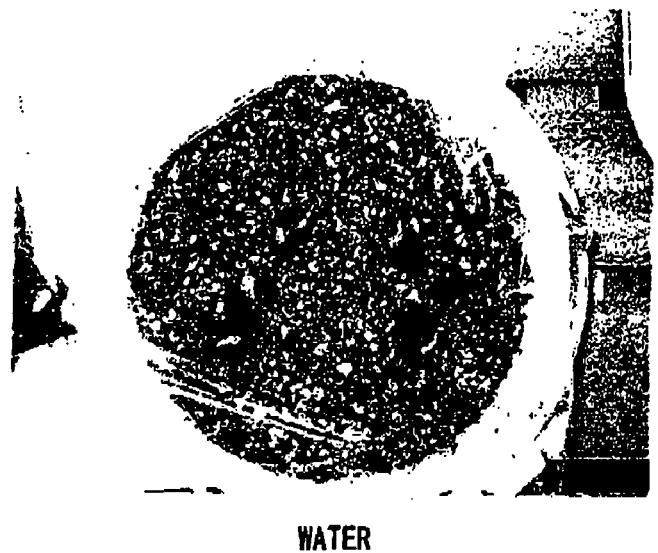
FIG. 13 is a photograph showing the state of growth of a plant obtained in an Example appearing hereinafter.

FIGS. 11-13 are photographs showing the state of the plant at the time of day 35 after the start of cultivation obtained in this Example (the soil was vermiculite in any of them). FIG. 11 is a case in which the Hyponex 100×diluted solution was used as the solution, FIG. 12 is a case in which the Hyponex 1000×diluted solution was used, and FIG. 13 is a case in which water (tap water) was used.

Figure 16:
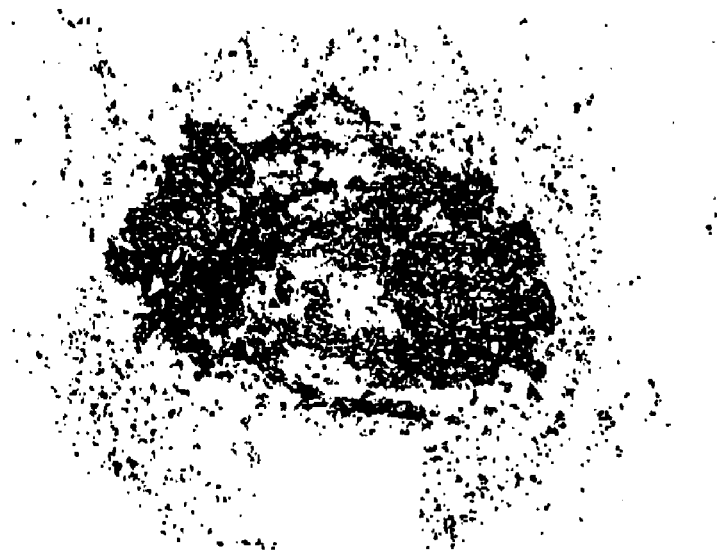
FIG. 16 is a photograph showing the state of development of a plant root on a film obtained in an Example appearing hereinafter.

FIGS. 14-16 are photographs showing the state of the root viewed from the backside (the solution side) of the film at the time of day 35 after the start of cultivation obtained in this Example (the soil was vermiculite in any of them). FIG. 14 is a case in which the Hyponex 100×diluted solution was used as the solution, FIG. 15 is a case in which the Hyponex 1000×diluted solution was used, and FIG. 16 is a case in which water (tap water) was used.

From the above Table 1 and photographs, it could be appreciated that the favorable growth of plant has been obtained in this Example. Better growth may be seen when the Hyponex 100×diluted solution is used than when the Hyponex 1000× diluted solution and tap water are used (Table 1, FIGS. 11 and 14). It could also be easily appreciated from these data (for example, comparison of the data of 100×dilution, 1000×dilution and water) that the plant obtains fertilizer components necessary for the growth from the fertilizer solution through the film.

Example 2

The concentrations of the nutrient fluid were set at Hyponex 1000×dilution, Hyponex 2000×dilution and Hyponex 3000×dilution and the same experiments as in Example 1 were conducted except that the item tested were as described in Table 2.

200 g of the soil (moisture 79%, dry weight 40 g) was placed on the film (200×200 mm), into which two seedlings were planted. Into the bowl, 240 g of water or the nutrient fluid was added, and the sieve basket with the film and seedlings was placed thereon.

(Period: October 30 to Dec. 4, 2002)

The results obtained in the above experiment are shown below.

TABLE 2

| | | Exp. No. | | |
|---|---|---|---|---|
| | | 1-1 | 1-2 | 1-3 |
| Exp. condition | film | PVA 40 µm | | |
| | seedling | sunny lettuce having one-odd true leaf (two seedlings for each condition) | | |
| | soil | rock fiber | | |
| | kind of liquid fertilizer | Hyponex | | |
| | dilution factor for liquid fertilizer | 1000x | 2000x | 3000x |
| Exp. results | amount of water evaporation (g) | | | |
| | 12 days | 103 | 97 | 98 |
| | 34 days | 204 | 192 | 197 |
| | liquid fertilizer EC (dS/m) | | | |
| | 0 days | 0.61 | 0.39 | 0.34 |
| | 12 days | 0.6/0.6 | 0.49/0.47 | 0.52/0.46 |
| | 34 days | 0.46 | 0.41 | 0.43 |
| | leaf weight (g) | 2 | 1 | 1 |
| | peeling strength (g) | 170 | 60 | 30 |

(Description on the Results of the Experiment)

It can be seen from the dependency of the growth rate of the plant on the concentration of the liquid fertilizer that plant growth is better when the concentration is higher, as in Example 1 indicating the uptake of the fertilizer components through the film.

Example 3

(Effect of Vermiculite/PVA Liquid Fertilizer)

Using the vermiculite/PVA system, the effects of water and a Hyponex 1000×diluted solution were compared. The experiment was carried out as in Example 1 except as shown in Table 3.

235 g of the soil (moisture 63%) was placed on the film disposed on a sieve basket, and two seedlings were planted. Into the bowl, about 250 ml of water or the fertilizer solution was added, and the sieve basket was placed thereon. (Experiment Period: October 22 to Nov. 25, 2002)

The results obtained in the above experiment are shown below.

TABLE 3

| | | Exp. No. | |
|---|---|---|---|
| | | 1 | 2 |
| Exp. condition | film | PVA 40 µm | |
| | seedling | sunny lettuce having one-odd true leaf (two seedlings for each condition) | |
| | soil | vermiculite | |
| | kind of fertilizer | Hyponex | |
| | dilution factor for liquid fertilizer | 1000x | water |
| Exp. results | Amount of water evaporation (g) | | |
| | 18 days | 176 | 163 |
| | 34 days | 270 | 216 |
| | liquid fertilizer EC (dS/m) | | |
| | 0 days | 0.50 | — |
| | 13 days | .47/.50 | — |
| | 35 days | 0.22 | — |
| | leaf weight (g) | 9 | 1 |
| | peeling strength (g) | >100 | 20–30 |

EC: values before and after the addition of the fertilizer solution

Peeling experiment: A post scale was used (Description on the Results of Experiment)

The EC value of the fertilizer solution was initially 0.5 dS/m and decreased to 0.22 dS/m on the final day 35, indicating an apparent consumption of the fertilizer by accompanied with the growth of the plant (if the evaporation of water is considered, the amount consumed of the fertilizer is thought to be greater).

Example 4

Using vermiculite as the soil and a hydrophilic polyester backed with a black unwoven fabric is the film, the experiment was carried out as in Example 1 except as shown in Table 4.

<Effect of Vermiculite/Unwoven Fabric-Attached Hydrophilic Polyester Liquid Fertilizer>

In the experiment, 230 g of the soil (moisture 76%, dry weight 55 g) was placed on the film disposed on a sieve basket, and two seedlings were planted. Into the bowl, about 200 ml of water or the fertilizer solution was added, and the "sieve basket" was placed thereon.

The results obtained in the above experiment are shown below.

TABLE 4

|  |  | Exp. No. | |
|---|---|---|---|
|  |  | 1 | 2 |
| Exp. condition | film | hydrophilic polyester with black non-woven fabric | |
|  | seedling | sunny lettuce having one-odd true leaf (two seedlings for each condition) | |
|  | soil | vermiculite | |
|  | kind of liquid fertilizer | Hyponex | |
|  | dilution factor for liquid fertilizer | 1000x | water |
| Exp. results | amount of water evaporation (g) | | |
|  | 13 days | 664 | 592 |
|  | 17 days | 743 | 651 |
|  | 23 days | 925 | 811 |
|  | 29 days | 1075 | 934 |
|  | 30 days | 1100 | 955 |
|  | weight of propagated roots (g) | 15 | 4 |

(Description on the Results of Experiment)

When the weights of the root and the leaf at the time of day 30 were compared between the fertilizer solution and water, they were apparently greater in the fertilizer solution, indicating that the fertilizer is being absorbed.

Example 5

Using rock fiber (the amount used: dry weight 10, 20, 30 g), the experiment was carried out as in Example 1 except the items were as shown in Table 5.

<Effect of the Amount of Rock Fiber>

50-150 g of the soil (moisture 83%, dry weight 10, 20, 30 g) was placed on the film, and two seedlings were planted. Into the bowl, 290-390 g of water or the fertilizer solution was added, and the sieve basket was placed thereon.

(Experiment Period: November 1 to Dec. 4, 2002)

The results obtained in the above experiment are shown below.

TABLE 5

|  |  | Exp. No. | | |
|---|---|---|---|---|
|  |  | 1 | 2 | 3 |
| Exp. condition | film | PVA 40 μm | | |
|  | seedling | sunny lettuce having 1.5 true leaves (two seedlings for each condition) | | |
|  | soil | rock fiber | | |
|  | kind of liquid fertilizer | Hyponex (x1000 dilution) | | |
|  | amount of rock fiber | 10 g | 20 g | 30 g |
| Exp. results | amount of water evaporation (g) | | | |
|  | 8 days | 61 | 68 | 74 |
|  | 11 days | — | 83 | 88 |
|  | 33 days | — | 158 | 192 |
|  | leaf weight (g) | 0 | 1 | 2 |
|  | peeling strength (g) | — | 110 | 140 |

Peeling test: A spring type balance was used (Description on the results of experiment)

When the amount of the soil is 10 g, the plant decayed at the time of day 10, suggesting that before the root of the plant reaches to the film, develops on the film and uptakes water and fertilizer components through the film, the water of the soil became short. Therefore, an appropriate amount of soil may be considered to be very favorable.

Example 6

(Performance of Various Films)

According to the method described above, the growth of the seedling by water was observed for various films. As the film, three types (PVA, biaxially oriented PVA (BOVLON), three kinds of hydrophilic polyester) were used in a total of five samples.

500 ml of the soil was placed on each film (260×260 mm) disposed on a sieve basket, and two seedlings were planted. Into the bowl, 250 ml of water was added, and the "sieve basket" was placed thereon. Period is August 17 to September 14.

TABLE 6

|  |  | Exp. No. | | | | |
|---|---|---|---|---|---|---|
|  |  | 1 | 2 | 3 | 4 | 5 |
| Exp. condition | film | PVA | hydrophilic polyester | hydrophilic polyester with non-woven fabric | hydrophilic polyester with cloth | BOBLON |
|  | seedling | Pansy (Maxim) having two true leaves (two seedlings for each condition) | | | | |
|  | soil | Super Mix-A 500 ml | | | | |
|  | solution | water | | | | |

TABLE 6-continued

| | | Exp. No. | | | | |
|---|---|---|---|---|---|---|
| | | 1 | 2 | 3 | 4 | 5 |
| Exp. results | amount of water evaporation (g) | | | | | |
| | 14 days | 190 | 272 | 572 | 161 | 200 |
| | 28 days | 338 | 529 | 1243 | 265 | 340 |
| | 28 days (number of true leaves) | 6 | 4.5 | 6-odd | 3 | 3.5 |

(Description on the Results of the Experiment)

The amount of the evaporated water from the hydrophilic polyester backed with unwoven fabric was prominent, which is probably because the evaporation from the unwoven fabric is included.

The number of leaf of the final seedling was in the order of hydrophilic polyester backed with unwoven fabric>=PVA>hydrophilic polyester>=BOVLON>hydrophilic polyester backed with cloth. This was the same trend as the growth of the root, except the hydrophilic polyester backed with unwoven fabric.

Example 7

(Saline Solution Permeability Test)

According to the method of <Test of film permeability to salt/water> described above, tests of film permeability to salt/water were carried out for various films. Films used are six types: PVA, BOVLON (biaxially oriented PVA), hydrophilic polyester, cellophane, PH-35, unwoven fabric of ultrafine fiber (Shaleria).

The results obtained from the above experiment are as follows:

water, whereas for PVA, the hydrophilic polyester and the cellophane the permeation of salt occurred rather quickly. BOVLON exhibited a small permeation rate to salt but at the time of four days the difference in the EC value between the salt system and the water system was 4.5 or less.

Example 8

(Glucose Permeability Test)

According to the method of the following<Glucose (dextrose) permeability test>method, the glucose permeability test was carried out on various films. The films used are five types: PVA, BOVLON (biaxially oriented PVA), cellophane, permeable cellophane, and PH-35.

<Glucose (Dextrose) Permeability Test>

Using a sieve basket bowl set, 150 g of a 5% glucose solution in water (50 g of glucose/1000 ml of water) was put into the bowl. A film of 200×200 mm was spread on the sieve basket, and 150 g of water was placed on the film. Then the sieve basket with the film and water was placed on the glucose solution in the bowl. Changes in respective concentration and weight with time were measured.

Using Brix meter (refractometer), Brix(%) was determined. Brix(%) is a unit of % by weight when sucrose was dissolved in water. For example, a liquid in which 10 g of sucrose is dissolved in 100 g, is Brix 10%.

TABLE 7

| saline-side EC (dS/m) | | | | | | |
|---|---|---|---|---|---|---|
| days | PVA/saline | BOBLON/saline | hydrophilic polyester/ saline | cellophane/ saline | PH-35/saline | non-woven fabric/ Saline |
| 0 days | 9 | 9 | 9 | 9 | 9 | 9 |
| 1 day | 6.2 | 8.2 | 5.8 | 5.3 | 9.1 | 4.7 |
| 2 days | 5.1 | 7.6 | 5.1 | 4.8 | 9 | 4.8 |
| 3 days | 5 | 7.5 | 5 | 4.8 | 9.1 | 4.9 |
| 4 days | 4.9 | 7.1 | 5 | 4.8 | 9 | 4.9 |

| water-side EC (dS/m) | | | | | | |
|---|---|---|---|---|---|---|
| days | PVA/water | BOBLON/water | hydrophilic polyester/ water | cellophane/ water | PH-35/water | non-woven fabric/ water |
| 0 days | 0.2 | 0.2 | 0.2 | 0.2 | 0.2 | 0.2 |
| 1 day | 3.7 | 1 | 3.8 | 4.2 | 0.2 | 3.8 |
| 2 days | 4.5 | 1.8 | 4.5 | 4.7 | 0.2 | 4.6 |
| 3 days | 4.8 | 2.2 | 4.8 | 4.7 | 0.2 | 4.8 |
| 4 days | 4.8 | 2.7 | 4.8 | 4.8 | 0.2 | 4.8 |

Figure 18:
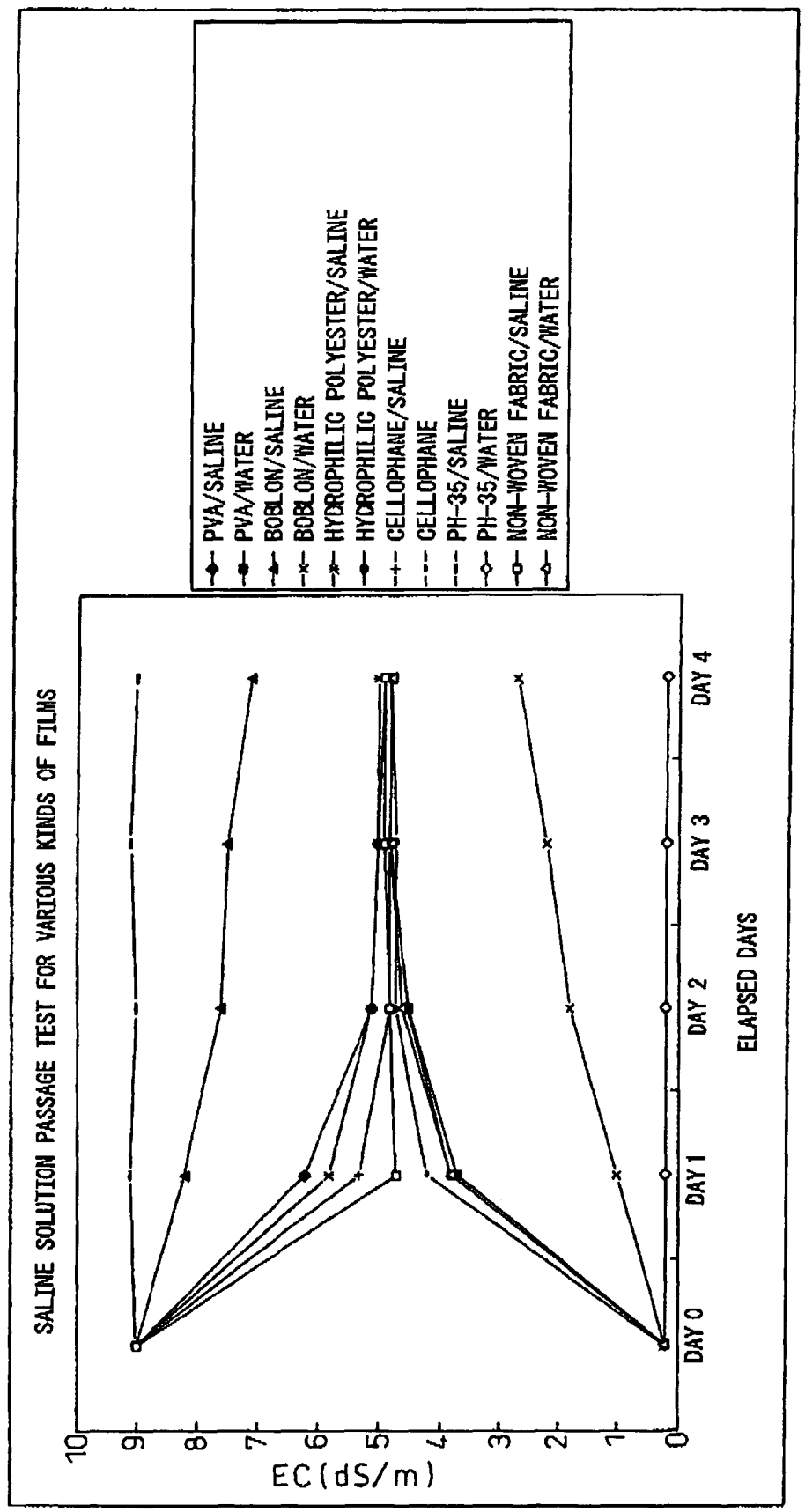
FIG. 18 is a graph showing an example of the result of film characteristic measurement (water-saline solution contact) for use in the present invention.

A graph for the above data is shown in FIG. 18.

(Description on the Results of the Experiment)

Among the six types of films, PH-35 did not exhibit permeability to saline. In the other films, the unwoven fabric of ultrafine fiber was completely permeable to salt together with Results obtained from the above experiment are as follows:

TABLE 8

Change in Brix % with elapse of time

| Time (hrs) | PVA/ water system | PVA/ sugar system | cellophane/ water system | cellophane/ sugar system | permeable cellophane/ water system | permeable cellophane/ sugar system | PH-35/ water system | PH-35/ sugar system | BOBLON/ water system | BOBLON/ sugar system |
|---|---|---|---|---|---|---|---|---|---|---|
| 0 | 0 | 4.9 | 0 | 4.9 | 0 | 4.9 | 0 | 4.9 | 0 | 4.9 |
| 23.5 | 0.9 | 3.8 | 1.3 | 3.4 | 1.5 | 3 | 0 | 4.8 | 0 | 4.9 |
| 36.5 | 1.3 | 3.2 | 2 | 2.8 | 2.2 | 2.8 | 0 | 4.9 | 0 | 4.9 |
| 47.5 | 1.7 | 3.1 | 2.2 | 2.6 | 2.3 | 2.6 | 0 | 4.9 | 0 | 4.9 |
| 60.5 | 1.8 | 2.8 | 2.4 | 2.6 | 2.4 | 2.6 | 0 | 4.8 | 0 | 4.9 |
| 71.5 | 2.1 | 2.8 | 2.5 | 2.5 | 2.5 | 2.6 | 0 | 4.9 | 0 | 4.8 |
| 85 | 2.2 | 2.7 | 2.5 | 2.6 | 2.5 | 2.6 | 0 | 5 | 0 | 4.7 |
| 95.5 | 2.3 | 2.6 | 2.6 | 2.5 | 2.6 | 2.6 | 0 | 4.9 | 0.1 | 4.7 |
| 119.5 | 2.4 | 2.6 | 2.5 | 2.5 | 2.5 | 2.5 | 0 | 4.9 | 0.2 | 4.5 |

Figure 19:
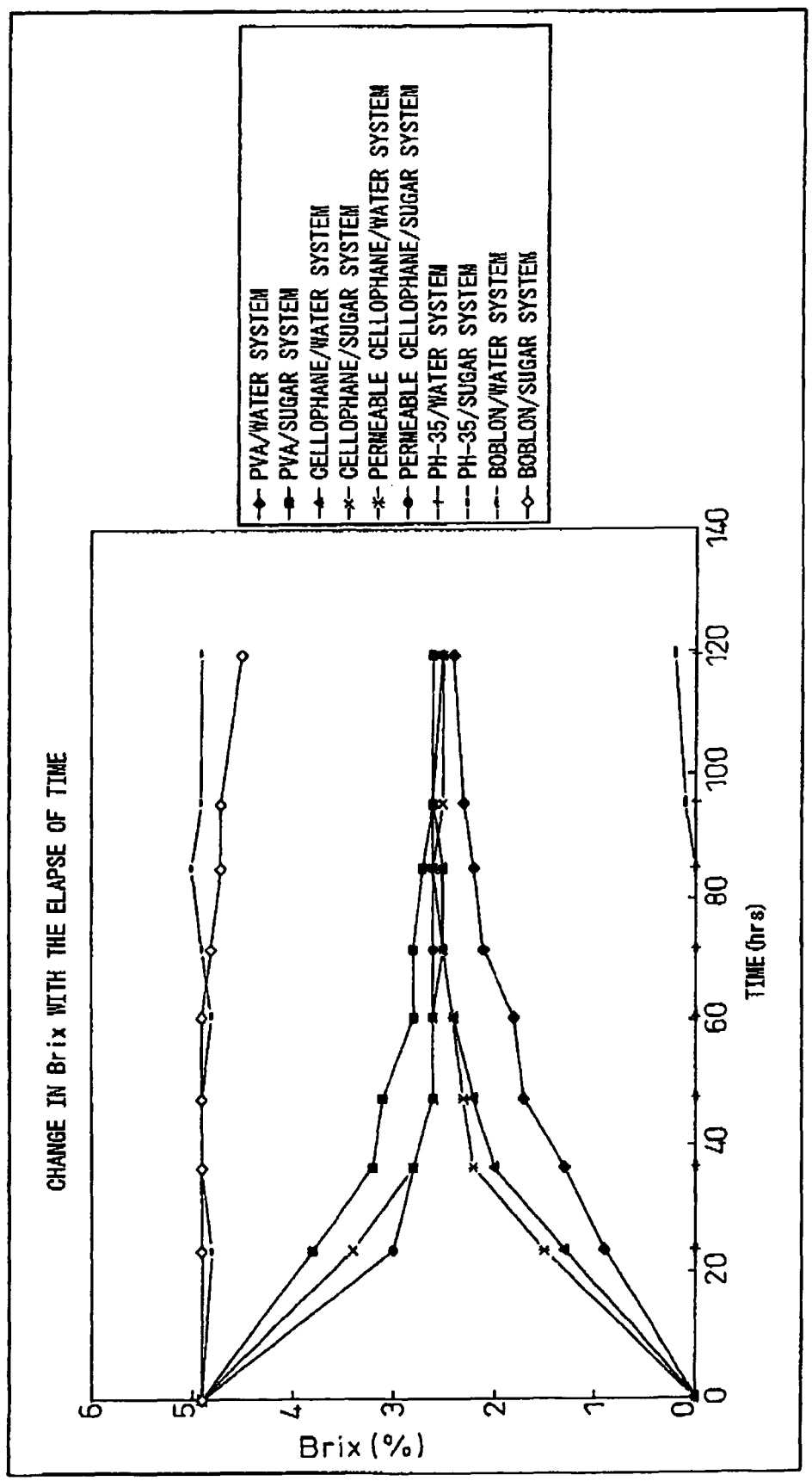
FIG. 19 is a graph showing an example of the result of film characteristic measurement (water-glucose contact) of the film for use in the present invention.

A graph for the above data is shown in FIG. 19.

(Description on the Results of the Experiment)

Among the five types of films, PVA, cellophane and permeable cellophane, except for BOvLON and PH-35, the difference in Brix value between the glucose system and the water system became 1 or less at about day 3 after the start of the experiment, indicating that glucose has permeated through the film.

Example 9

(Water Pressure Resistance Test)

According to a test according to JIS L1092 (method B), water pressure resistance test at 200 cmH$_2$O was carried out.

Results of the Experiment

| Film type | Water pressure resistance (cm H$_2$O) |
|---|---|
| PVA film (40 μm) | 200 or more |
| Biaxially oriented PVA (BOVLON) | 200 or more |
| Cellophane | 200 or more |
| Hydrophilic polyester | 200 or more |
| Unwoven fabric of urtrafine fiber | 0 |

Example 10

(Comparison of PVA and Unwoven Fabric of Ultrafine Fiber)

Plants were cultivated under the following condition and the root were pulled apart from the film obtained (the PVA film and the unwoven fabric that were in contact with the plant root) by hand.

<Experimental Condition>
Device: sieve basket bowl set
Film: PVA (200×200 mm)
unwoven fabric: Shaleria (160×170 mm)
Soil: Vermiculite
Seedling: Sunny lettuce
Solution: Hyponex 1000×diluted solution
Period: September 29 to Oct. 31, 2002

Figure 20:
FIG. 20 is a photograph showing an example of the state of a plant root penetrating a film.
Figure 21:
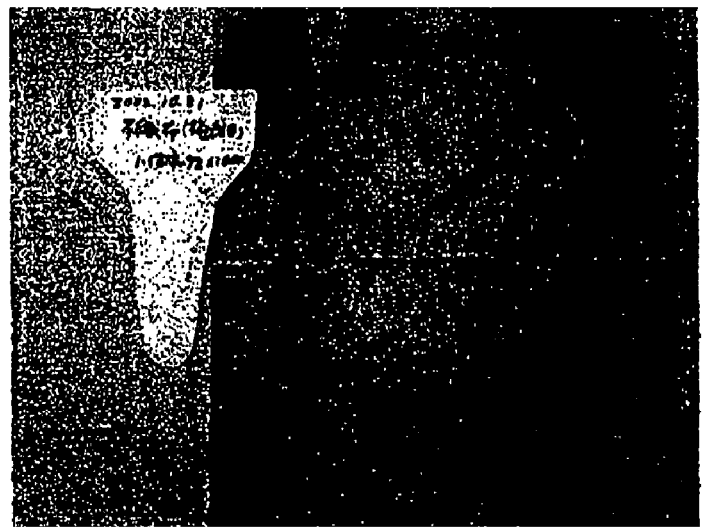
FIG. 21 is a photograph showing an example of the state of a plant root penetrating a film.
Figure 22:
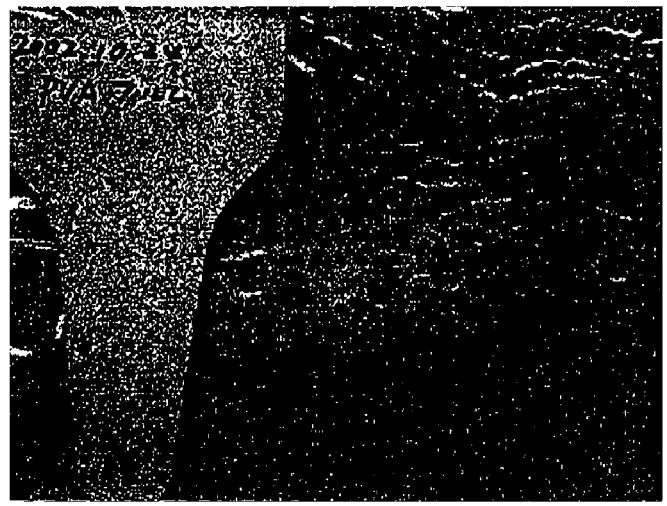
FIG. 22 is a photograph showing an example of the state of a plant root not penetrating a film.

The state of the film after being peeled off is shown in photographs of FIGS. 20-22. FIG. 20 shows the backside of the unwoven fabric. It can be observed that root protruded to the backside of the unwoven fabric. FIG. 21 is the photograph of the front (soil) side of the unwoven fabric, indicating that root still remained even after the root was peeled from the fabric. Thus, when the root protruded to the backside of the film or unwoven fabric, it is a state of penetrating root, which is not suitable for the cultivation of the present invention.

In contrast, FIG. 22 shows the backside of the PVA film. Since a PVA film is transparent, it can be observed that no root remain on the front and the back of the film after the root was peeled from the film. This means no protrusion of the root through the film in PVA.

Example 11

(Measurement of pH)

Into a box (30×22×8 cm), 1.3 L of a 300×diluted Hyponex solution (EC:1.37) was introduced, onto which a PVA film (48×40 cm) was placed. The soil (Supermix A) placed on the film to a depth of 2 cm, and 12 seedlings of Sunny lettuce (3 main leaves) were planted into the soil. They were grown in a non-heated greenhouse (November 12 to December 25), and the EC value and pH of the solution were regularly measured. During this time, no overhead water supply or supplement of nutrition fluid was carried out.

Results obtained from the above experiment are as follows:

TABLE 9

| days | EC (dS/m) | pH |
|---|---|---|
| 0 | 1.37 | 7.2 |
| 8 | 1.35 | |
| 15 | 1.34 | |
| 22 | 1.31 | 6.3 |
| 29 | 1.24 | 6.3 |
| 36 | 1.10 | 5.9 |
| 43 | 0.99 | 4.2 |

Figure 23:
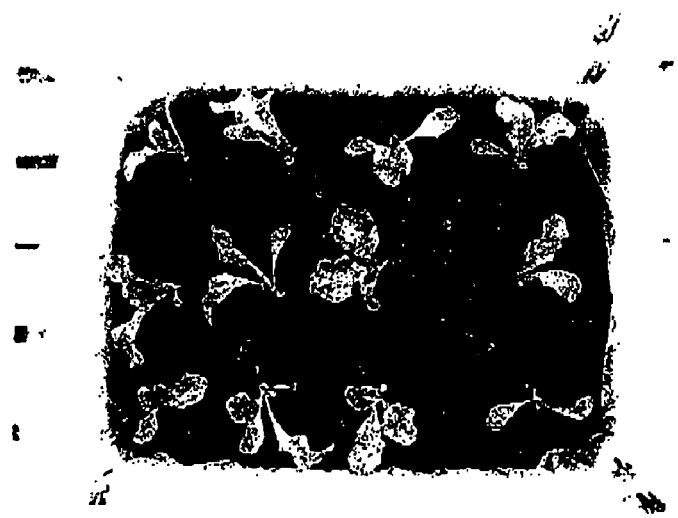
FIG. 23 is a photograph showing the state of an early growth period of a plant obtained in an Example appearing hereinafter.
Figure 24:
FIG. 24 is a photograph showing the state of a late growth period of a plant obtained in an Example appearing hereinafter.
Figure 25:
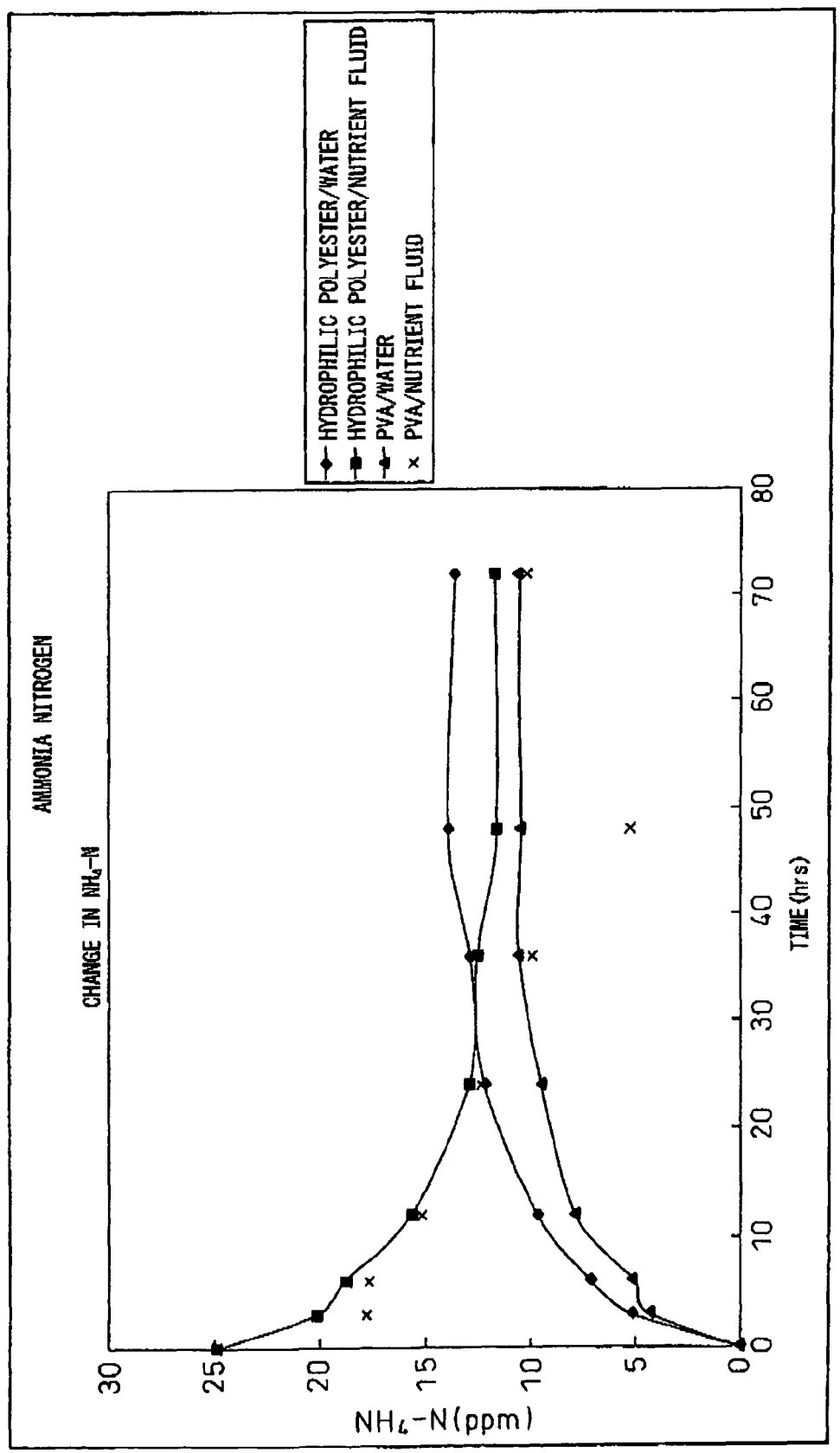
FIG. 25 is a graph showing the film permeability to ammonia nitrogen.
Figure 26:
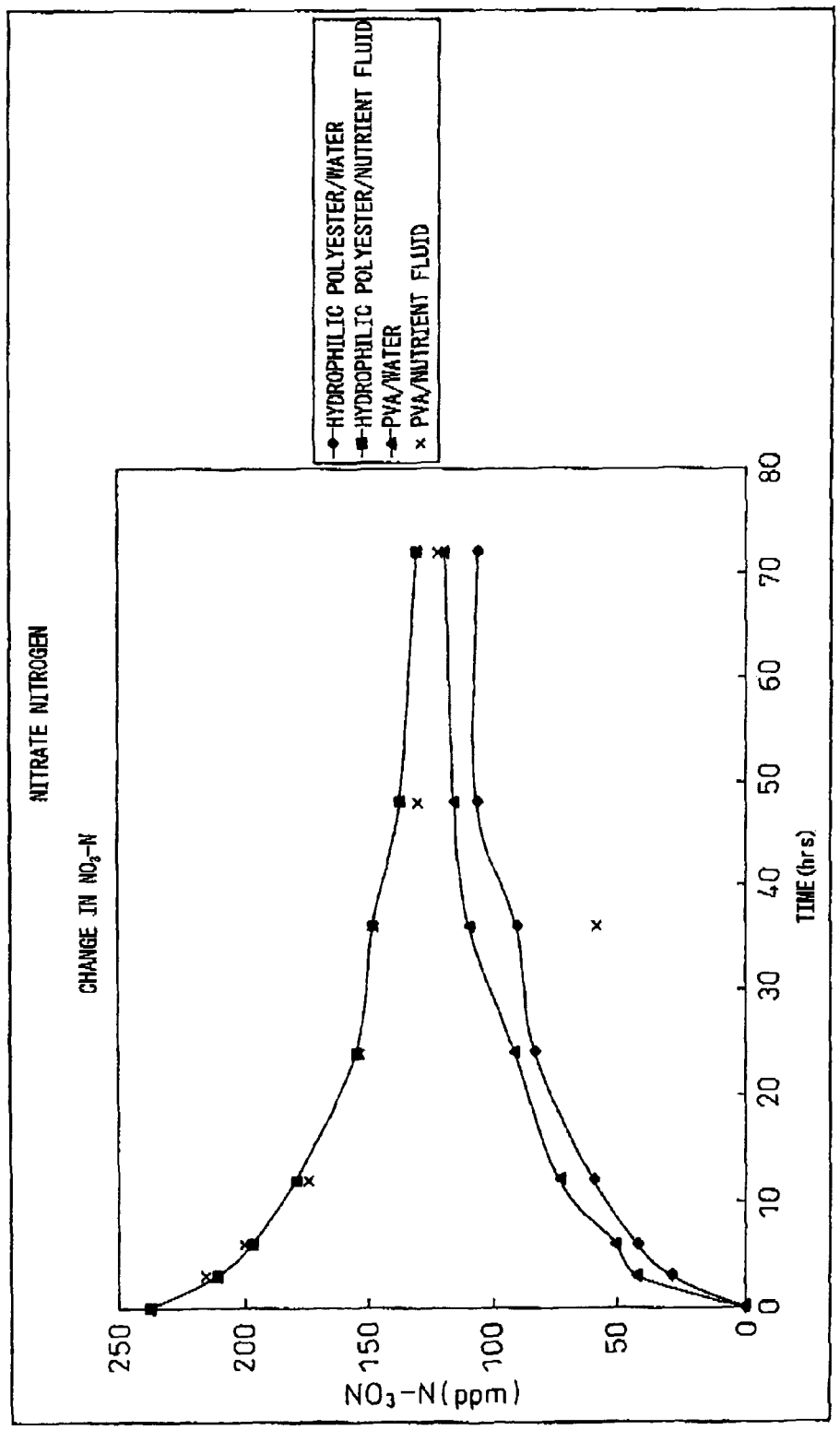
FIG. 26 is a graph showing the film permeability to nitrate nitrogen.
Figure 27:
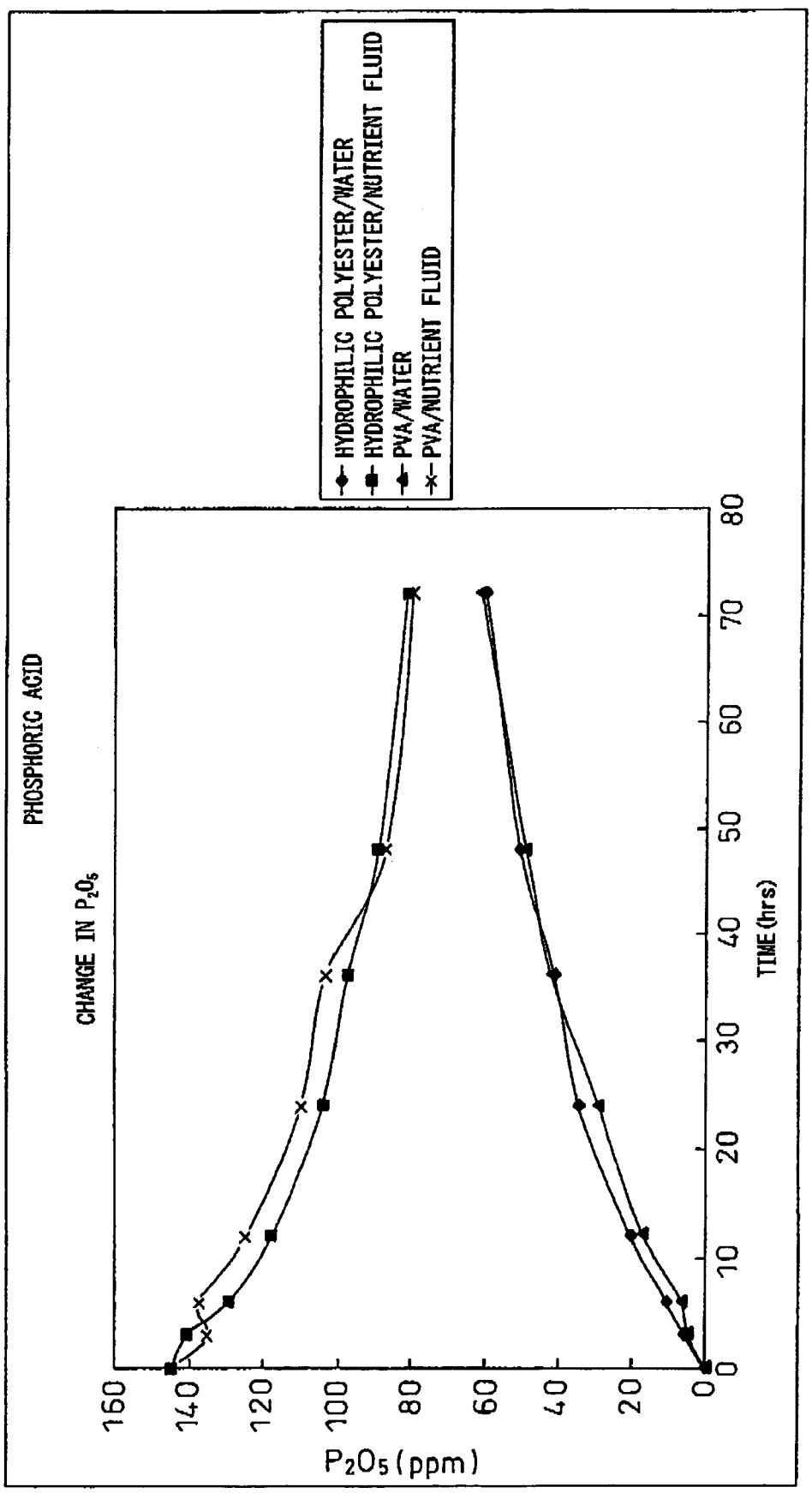
FIG. 27 is a graph showing the film permeability to phosphoric acid.
Figure 28:
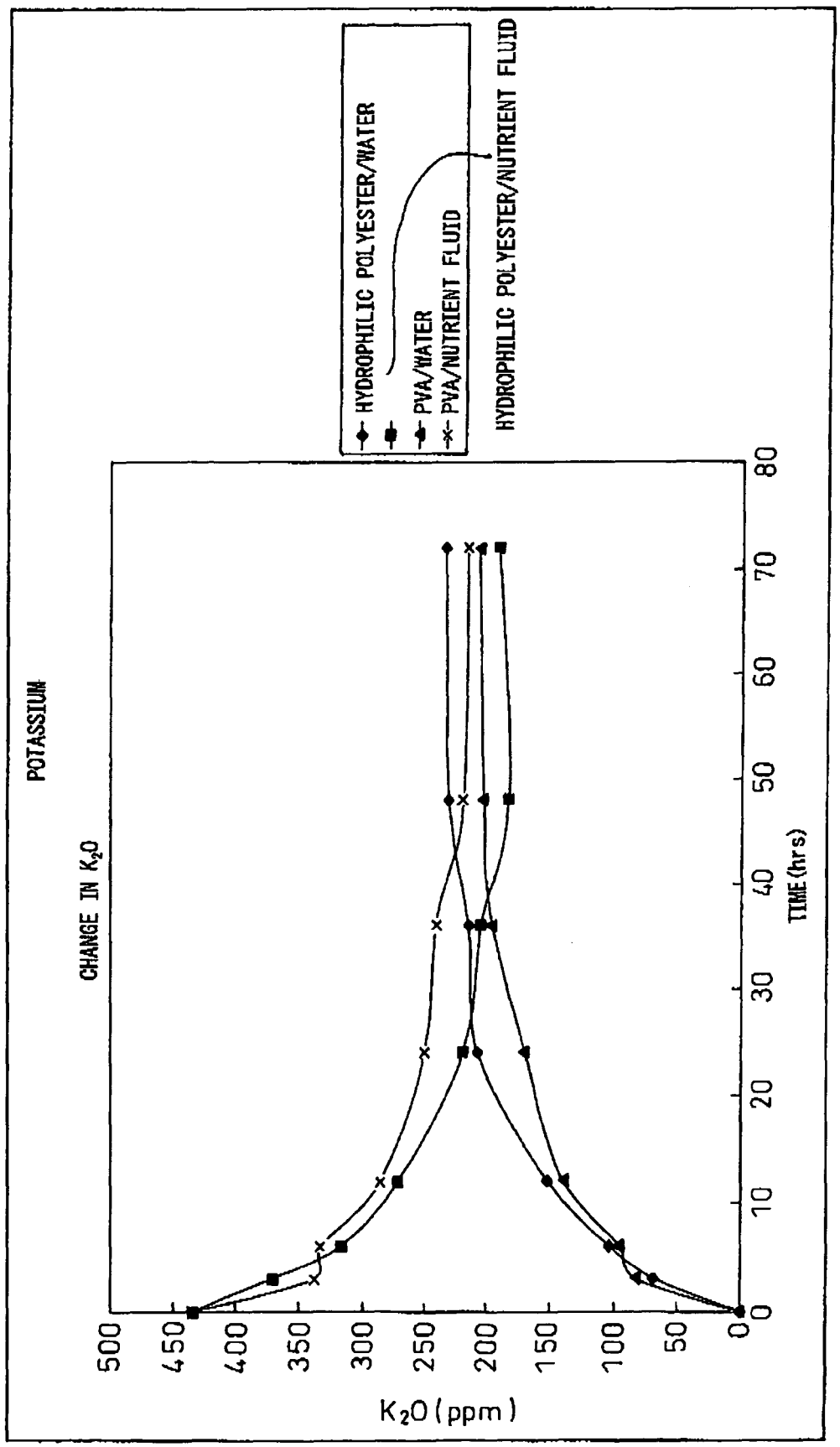
FIG. 28 is a graph showing the film permeability to potassium.
Figure 29:
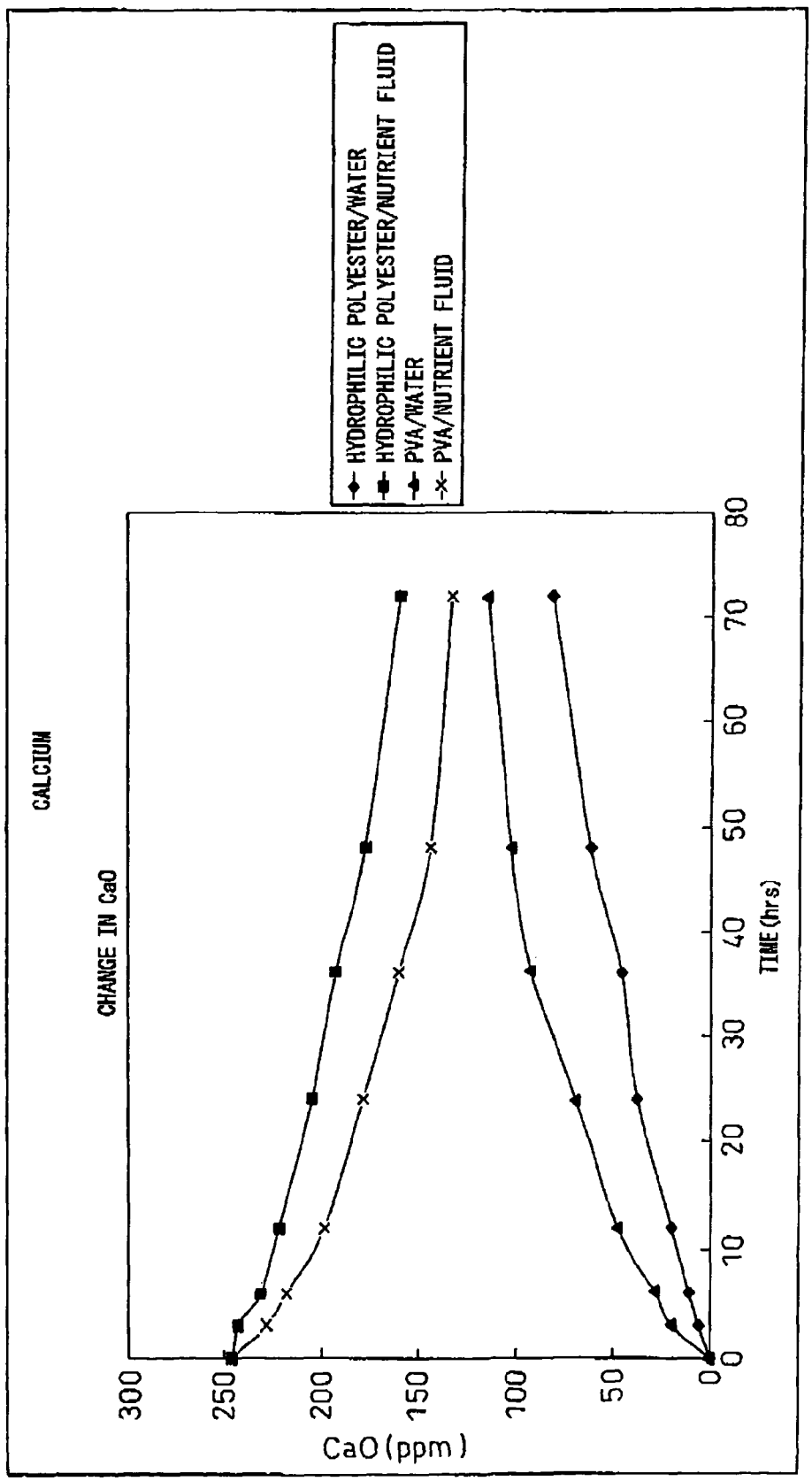
FIG. 29 is a graph showing the film permeability to calcium.
Figure 30:
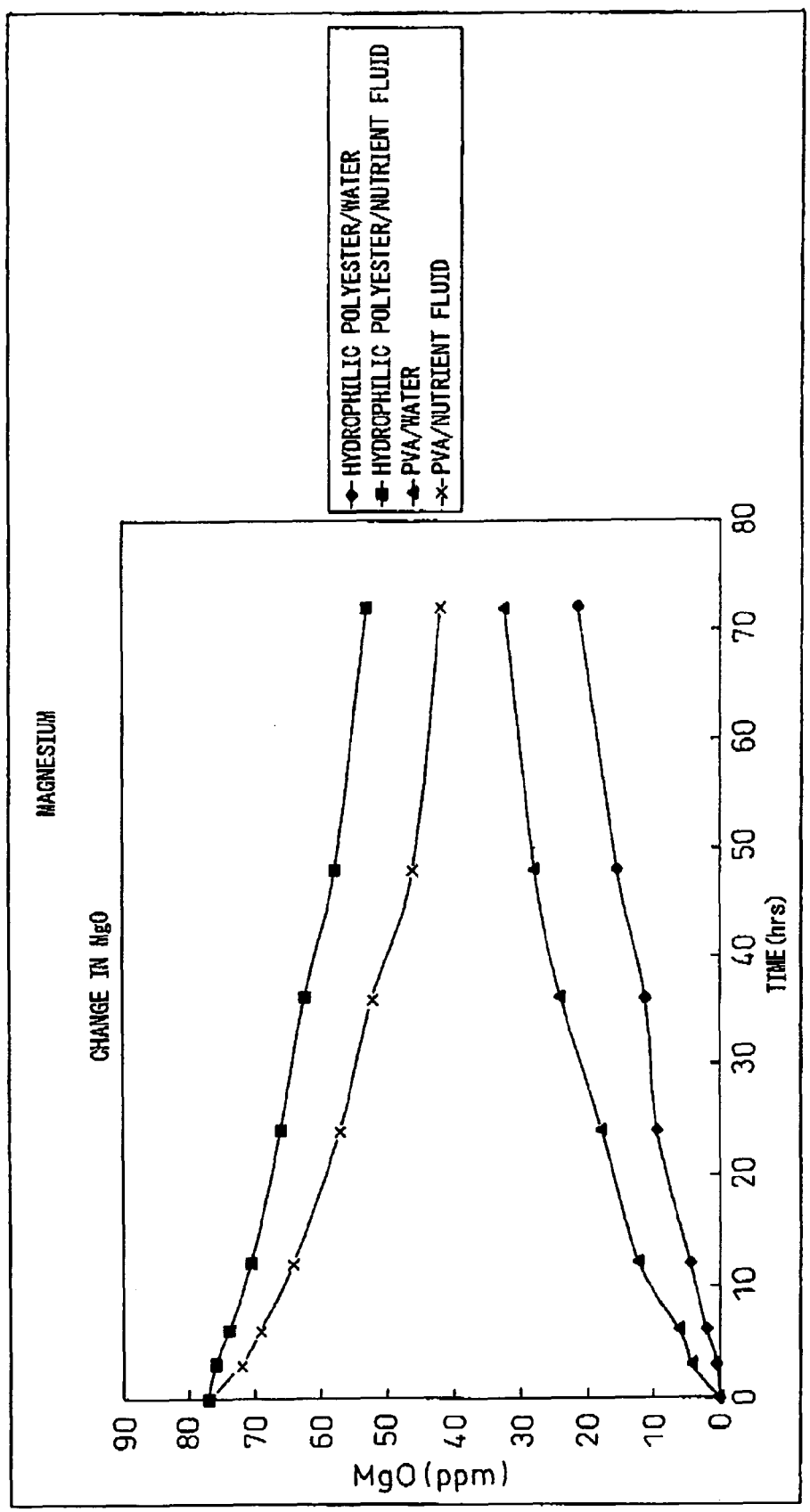
FIG. 30 is a graph showing the film permeability to magnesium.
Figure 31:
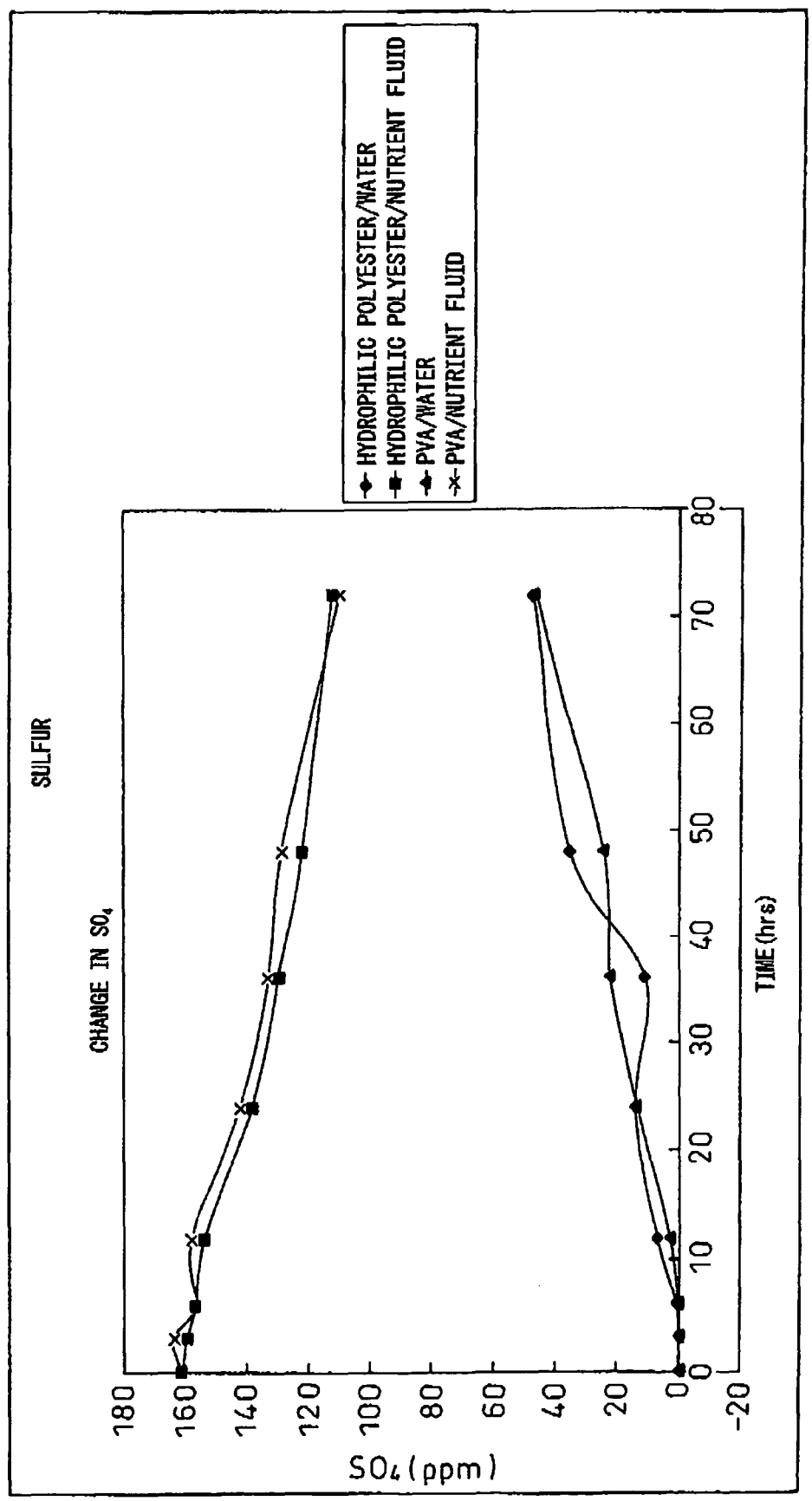
FIG. 31 is a graph showing the film permeability to sulfur.

FIGS. 23 and 24 show photographs of the state of growth. FIG. 23 is a photograph of seedling at the time of planting and FIG. 24 is a photograph at the time of day 43.

(Description on the Results of the Experiment)

pH decreased to 4.2 at the time of day 43 with respect to 7.2 at the time of day 0. It is generally thought that since lettuce preferentially absorbs the ammonia nitrogen as a nitrogen fertilizer, pH decreases. From the result of the present experiment also, ammonia nitrogen is thought to be consumed. The EC value also decreases with time, supporting the absorption of fertilizers, and the growth of seedlings can be appreciated from the comparison of FIGS. 23 and 24 as well.

Example 12

Using a sieve basket bowl set (the radius of the sieve basket is 6.4 cm and the content is 130 cm³) in a manner similar to Example 7, a film was placed on the sieve basket, onto which 150 g of pure water was placed, and 150 g of nutrient fluid was added into the ball side, and covered with SARAN wrap (a polyvinylidene chloride film). A total of seven containers are prepared for the sampling times of 3, 6, 12, 24, 36, 48 and 72 hrs, and after the passage of a given time, 100 ml each was taken into a sample container. Major fertilizer components in each sample were analyzed.
1) Water vapor-permeable film: PVA film, 25μm (mfd. by The Nippon Synthetic Chemical Industry Co., Ltd.), hydrophilic polyester, 20 μ, (mfd. by Dupont)
2) Water: distilled water (mfd. by Wako Pure Chemical Industries, Ltd.), nutrient fluid fertilizer: Otsuka House No. 1, 1.5 g/L, No. 2, 1 g/L (mfd. by Otsuka Chemical Co., Ltd.)
3. Analytical method
a) Ammonium ions, nitrate ions and sulfate ions:
Analyzed by ion chromatography (with respect to details of analysis, reference can be made to "Analysis of Water" 4th edition, edited by Hokkaido branch of The Japan Society for Analytical Chemistry, issued by Kagakudojin Co., Ltd., Jul. 20, 1997, Chapter 3 Analytical methods used for the analysis of water 3.7.3 Ion chromatography (pp. 125-129)).
b) Phosphorous, potassium, calcium and magnesium:
Analyzed by ICP (Inductively Coupled Plasma-Atomic Emission Spectrometry) ion chromatography (with respect to details of analysis, reference can be made to "Analysis of Water" 4th edition, edited by Hokkaido branch of The Japan Society for Analytical Chemistry, issued by Kagakudojin Co., Ltd., Jul. 20, 1997, Chapter 13 Analytical methods related to trace polluting substance 1.3.10 ICP (pp. 478-480)).

For major component of ammonia nitrogen ($NH_4$—N), nitrate nitrogen ($NO_3$—N), phosphorous ($P_2O_5$), potassium ($K_2O$), calcium (CaO), magnesium (MgO)) and sulfur ($SO_4$), the film permeabilities are shown in Tables 10-16, and graphs thereof corresponding to these data are shown in FIGS. 25-31.

With regard to film permeability to fertilizers, as shown the above Tables and graphs, the permeation rate may differ with the fertilizer components, but all of the major components of nitrogen (N), phosphorous (P), potassium K), calcium (Ca), magnesium (Mg) and sulfur (S) are permeable through the films.

TABLE 10 ammonia nitrogen unit: ppm

| time (hrs) | hydrophilic polyester/ water | hydrophilic polyester/ nutrient fluid | PVA/Water | PVA/ nutrient fluid |
|---|---|---|---|---|
| 0 | 0 | 24.9 | 0 | 24.9 |
| 3 | 5.2 | 20.2 | 4.4 | 17.8 |
| 6 | 7.2 | 18.8 | 5.1 | 17.7 |
| 12 | 9.7 | 15.7 | 7.9 | 15.2 |
| 24 | 12.2 | 12.9 | 9.5 | 12.3 |

TABLE 10-continued ammonia nitrogen unit: ppm

| time (hrs) | hydrophilic polyester/ water | hydrophilic polyester/ nutrient fluid | PVA/Water | PVA/ nutrient fluid |
|---|---|---|---|---|
| 36 | 12.9 | 12.5 | 10.6 | 9.9 |
| 48 | 13.9 | 11.6 | 10.5 | 5.3 |
| 72 | 13.6 | 11.7 | 10.6 | 10.2 |

TABLE 11 nitrate nitrogen unit: ppm

| time (hrs) | hydrophilic polyester/ water | hydrophilic polyester/ nutrient fluid | PVA/Water | PVA/ nutrient fluid |
|---|---|---|---|---|
| 0 | 0 | 237.9 | 0 | 237.9 |
| 3 | 29 | 211.4 | 42.4 | 215.1 |
| 6 | 42.3 | 197.3 | 51 | 199.8 |
| 12 | 59.5 | 179.6 | 72.9 | 174.1 |
| 24 | 82.9 | 155 | 90.9 | 153.5 |
| 36 | 90.3 | 148.2 | 109.8 | 58.1 |
| 48 | 106.5 | 137.8 | 116.2 | 130 |
| 72 | 106.5 | 131 | 120.1 | 122.2 |

TABLE 12 phosphoric acid unit: ppm

| time (hrs) | hydrophilic polyester/ water | hydrophilic polyester/ nutrient fluid | PVA/water | PVA/ nutrient fluid |
|---|---|---|---|---|
| 0 | 0 | 144.7 | 0 | 144.7 |
| 3 | 5.8 | 140.4 | 4.9 | 135.4 |
| 6 | 10.7 | 129.2 | 6.7 | 137.4 |
| 12 | 20.3 | 117.6 | 17 | 124.6 |
| 24 | 34.5 | 103.7 | 29.3 | 109.7 |
| 36 | 41.1 | 7.1 | 41.8 | 102.9 |
| 48 | 50.5 | 88.5 | 49 | 86.6 |
| 72 | 60.1 | 80.8 | 61.1 | 79.4 |

TABLE 13 potassium unit: ppm

| time (hrs) | hydrophilic polyester/ water | hydrophilic polyester/ nutrient fluid | PVA/water | PVA/ nutrient fluid |
|---|---|---|---|---|
| 0 | 1 | 434.6 | 0 | 434.6 |
| 3 | 68.8 | 371.2 | 83.4 | 338.1 |
| 6 | 103.3 | 317.3 | 96.2 | 333.6 |
| 12 | 152.2 | 271.5 | 140.5 | 286.1 |
| 24 | 207.2 | 218.6 | 170.7 | 249.7 |
| 36 | 214.3 | 205 | 196.5 | 241 |
| 48 | 231 | 183.6 | 203.5 | 219.2 |
| 72 | 233.6 | 191.4 | 207.3 | 215.9 |

TABLE 14 calcium unit: ppm

| time (hrs) | hydrophilic polyester/ water | hydrophilic polyester/ nutrient fluid | PVA/water | PVA/ nutrient fluid |
|---|---|---|---|---|
| 0 | 0 | 246.7 | 0 | 246.7 |
| 3 | 6 | 243.4 | 20.6 | 228.6 |
| 6 | 11 | 231.8 | 28.6 | 218.2 |
| 12 | 20.1 | 222.4 | 48.3 | 198.9 |
| 24 | 37.8 | 205.2 | 69.6 | 178.9 |
| 36 | 46 | 193 | 92.5 | 160.6 |
| 48 | 62 | 178.2 | 103.2 | 144.2 |
| 72 | 82.4 | 160.8 | 116.3 | 134.1 |

TABLE 15 magnesium unit: ppm

| time (hrs) | hydrophilic polyester/ water | hydrophilic polyester/ nutrient fluid | PVA/water | PVA/ nutrient fluid |
|---|---|---|---|---|
| 0 | 0 | 76.9 | 0 | 76.9 |
| 3 | 0.5 | 75.9 | 4.1 | 72 |
| 6 | 1.9 | 73.9 | 6.2 | 69.1 |
| 12 | 4.4 | 70.6 | 12.3 | 64.1 |
| 24 | 9.4 | 66 | 17.9 | 56.9 |
| 36 | 11.3 | 62.4 | 24.1 | 52.1 |
| 48 | 15.5 | 57.8 | 27.9 | 46.1 |
| 72 | 21.4 | 53 | 32.5 | 41.9 |

TABLE 16 sulfur unit: ppm

| time (hrs) | hydrophilic polyester/ water | hydrophilic polyester/ nutrient fluid | PVA/water | PVA/nutrient fluid |
|---|---|---|---|---|
| 0 | 0 | 161.3 | 0 | 161.3 |
| 3 | 0 | 159.2 | 0 | 163.6 |
| 6 | 0.6 | 156.7 | 0 | 156.6 |
| 12 | 6.9 | 153.8 | 2.9 | 158 |
| 24 | 14.2 | 138.3 | 14 | 142.1 |
| 36 | 11.4 | 129.8 | 22.2 | 133 |
| 48 | 35.3 | 122.3 | 25 | 128.8 |
| 72 | 47.4 | 112.5 | 46.7 | 110.1 |

Example 13

In a manner similar to Example 11, a nutrient fluid was placed in a Styrofoam box, the surface of which was covered with a film, and then vermiculite was added thereon at 0.2-0.3 g/cm² The vermiculite was impregnated with about 70% moisture, and using an aluminum foil as a mulching film for covering the soil surface, a young seedling of rocket was planted. After the passage of the test period, the state of growth was observed and the weight of the plant was measured.

[Test Conditions and Results]

TABLE 17

| | kind of film | |
|---|---|---|
| | PH-35 | PVA |
| of styrofoam box (cm) | 30 × 21 × 10 | 50 × 30 × 10 |
| nutrient fluid (EC: 1.7) | 1 L | 2 L |
| amount of additional nutrient fluid | 0 | 2 L |
| number of seedlings (sown on April 17) | rucola 4 | rucola 4 |
| weight of rucola (g) (average of four seedlings) | <1 | 13.1 |

Film: PH-35 (about 40 μm) (mfd. by Tokuyama Co., Ltd.) micro porous polypropylene film, PVA 40 μm (mfd. by Aicello Chemical Co., Ltd.)
Soil; Vermiculite (mfd. by Showa Vermiculite Co., Ltd.)
Mulching film: Aluminum foil (mfd. by Alfamic Co., Ltd.)
Nutrient fluid: Matsuzaki No. 1, 6 g/8 L, Matsuzaki No. 2, 4 g/8 L (mfd. by Matsuzaki Agribusiness Co., Ltd.)
Test Period: May 9 to Jun. 4, 2003. The weight of plant after growth is shown in table 17 and the state of growth is shown in FIGS. 32-33. Growth was evidently poor in the micro porous polypropylene, and though water vapor permeates through the micro porous polypropylene film, water and fertilizer components did not.

Example 14

In a manner similar to Example 11, 1.3 L of a 300×diluted aqueous solution (EC: 1.37) of a Hyponex stock (N: 5%, P: 10%, K: 5%) (mfd. by Hyponex Japan) was added into a box of 30×22×8 cm, and PVA film of 48×48 cm and 40 μm (mfd. by Aicello Chemical Co., Ltd.) was floated on it.

On the film, Supermix A (mfg. by Sakata Seed Corporation) was placed as the soil to a depth of 2 cm, and 12 pieces of sunny lettuce (three main leaves) were planted. They were grown in a hothouse (without control of temperature or humidity) from Nov. 12, 2002, to Jan. 11, 2003 (60 days). Then, the PVA film that was integrated with the root, was used as the sample, and optical photomicrographs (magnification: 10 to 100 fold) of the interface of the root were taken.

[Sample Pretreatment and Observation]
1) Sample is dehydrated with ethanol.
2) Embedded in a hydrophilic resin "Technovit" (mfd. by Okenshoji Co., Ltd.).
3) Cut into a thickness of 3 μm by a glass knife, and placed on a glass plate to dry.
4) Stain with a 0.1% toluidine blue for 15 minutes.
5) Destain the excessively stained parts with a 70% ethanol solution under running water (differential).
6) After dehydrating with alcohol, put in xylene, and then cover with a cover glass.
7) Examine with an optical microscope at magnification of 10 to 100-fold. (With respect to the details of the method of pretreatment of samples and the examination method, see, for example, the detailed test methods for the homepage of Okenshoji Co., Ltd., the column of "low-temperature polymerization resin Technovit").

The results of observation by an optical microscope are shown in FIG. 34. As shown in this FIG. 34, the cells of the root closely adhered onto the PVA film surface, and it was observed that the PVA film has integrated with the root.

Example 15

Culture of Mini Tomato (Result of Brix Measurement)

In a similar manner to Example 11, 2.2 L of the nutrient fluid was added to a Styrofoam box (internal volume: 11 L), which was covered with a PVA film of 40 μm. 0.6 g/cm² of vermiculite was spread thereon, and tap water was added to the vermiculite to adjust moisture to 75% (water/vermiculite ratio=75/25), thereby preparing a cultivation bed. Seedlings of mini tomato were planted horizontally, and were grown in a hothouse.

(Test Condition and Result)
Film: PVA of 40 μm (mfd. by Aicello Chemical Co., Ltd.)
Cultivation soil: Vermiculite (mfd. by Nittai)
Nutrient fluid: 500×diluted solution (EC: 1.28) of Hyponex stock (mfd. by Hyponex Japan Co., Ltd.) 2 L of the nutrient fluid was additionally added on May, 20 (day 34 after the start of cultivation), and 2 L was supplemented on June, 16 (day 61 after the start of cultivation).
Seedling: Mini tomato
Culture period: April 16 to Jun. 29, 2003

| Measured date | Series No. | Weight (g) | Brix (%) |
|---|---|---|---|
| 6/15 | 1 | 13.3 | 7.6 |
|  | 2 | 13.2 | 7.6 |
| 6/23 | 1 | 7.2 | 8.2 |
|  | 2 | 4.2 | 8.4 |
|  |  | 8.4 | 7.0 |
| 6/25 | 2 | 8.4 | 8.0 |
| 6/29 | 2 | 8.4 | 7.8 |

(Brix measurement: Handy refractometer ATC-1 (mfd. by Atago Co., Ltd.)
[Comparative commercial product] on July 9 (measured date)
Piccolo tomato (Aichi Atumi)
154 g/13 pieces, Brix: 4.6%

As described above, with respect to a Brix of about 5% for common (commercially available) products (mini tomato), it was confirmed that the present Example gave the Brix level of 7.0-8.4%.

Example 16

1. Results of Measurement of Sunny Lettuce Brix

2 L of a nutrient fluid was added in a Styrofoam box (internal volume: 5.3 L), the surface of which was covered with a PVA film of 40 μm. The soil was added thereon to a depth of about 2 cm, and moisture was adjusted to about 75% thereby to prepare a cultivation bed. The soil surface was covered with an aluminum foil, and two young seedlings of sunny lettuce were planted and were grown in a hothouse.

[Test Conditions and Results]
Film; PVA of 40 μm (mfd. by Aicello Chemical Co., Ltd.)
Soil: 1) Vermiculite (mfd. by Showa Vermiculite Co., Ltd.) 0.3 g/cm²,
2) Supermix A (mfd. by Sakata Seed Corporation) 0.9 g/cm²,
3) Satsuma pumice (mfd. by Espec Mic Corp.) 0.9 g/cm²
Seedling: Sunny lettuce (sown on April 10) two-odd main leaves
Mulching fil: Aluminum foil (mfd. by Alphamic K.K.)
Nutrient fluid: Matsuzaki No. 1, 6 g/8 L, Matsuzaki No. 2, 4 g/8 L (Matsuzaki Agribusiness Co., Ltd.)
EC: 1.7

TABLE 18

| soil | vermiculite | Super-Mix A | Satsuma pumice |
|---|---|---|---|
| Brix (%) of leaf | 2.8, 3.0 | 3.2, 3.2 | 2.6, 3.0 |

Comparison: Commercially available sunny lettuce (a product of Nagano Pref., hydroponic cultivation)
Brix: 0.5% (Brix measurement: Handy refractometer ATC-1E (mfd. by Atago Co., Ltd.)

As shown in Table 18, in any of the soils, Brix(%) were higher than the commercially available products of 0.5%.

2. Result of Measurement of Rocket Brix

Inside of a Styrofoam container (internal volume: 60 cm wide×15 cm deep×about 3 m long) was covered with a polymer sheet with a thickness of 0.15 mm to prepare a pool for cultivation. The nutrient fluid was added into the pool, a film was spread thereon, the soil was placed thereon to a thickness of about 2 cm to prepare a cultivation bed. The moisture of the soil was adjusted to about 70%, on which young seedlings were planted, and the development of the plant was observed by the presence or absence of a mulching film for preventing of the water evaporation.

[Test conditions and results]
Film: PVA of 40 μm (mfd. by Aicello Chemical Co., Ltd.)
Soil: 1) Vermiculite (mfd. by Showa Vermiculite Co., Ltd.)
Mulching film: aluminum foil (mfd. by Alpha Mic K.K.)
Nutrient fluid: Matsuzaki No. 1, 6 g/8 L, Matsuzaki No. 2, 4 g/8 L (Matsuzaki Agribusiness Co., Ltd.), 45 L
EC: 1.3,
Test period: May 19 to Jun. 14, 2003

TABLE 19

| soil | vermiculite | vermiculite |
|---|---|---|
| mulching film | aluminum foil | none |
| number of seedlings (sown on May 3) | rucola 4 | rucola 4 |
| weight of plant body (g) (average of four seedlings) | 16.3 | 6.3 |
| Brix (%) of leaf of plant body | 3.8 | 5.2 |

Comparison: commercially available rocket cultivated by conventional hydroponics
Brix: 2.6
(Brix measurement: Handy refractometer ATC-1E (mfd. by Atago Co., Ltd.)

It can be seen that by controlling water evaporation from the surface of the soil with a mulching film, the growth of plant and the Brix(%) (a measure of nutrient content) of plant can be controlled.

Brix(%) increased from 3.8 with a mulching film to 5.2 without a mulching film.

As shown in Table 19, in any of the soils of this Example, Brix was higher, in particular the value was much higher for the cover with the mulching film which significantly suppresses the water evaporation from the soil, than Brix of the commercially available products cultivated by conventional hydroponics shown in the Comparative Example.

3. Result of Measurement of Spinach Bri

Brix of the spinach that was cultivated in Example 17 with or without heating in the winter.

(Brix measurement: Handy refractometer ATC-1E (mfd. by Atago Co., Ltd.)

| Condition | Brix (%) |
|---|---|
| Not heated (winter) | 6.2 |
| Heated (19° C.) | 4 |
| Comparison (commercially available spinach) | 2.2 |

Spinach, with or without heating, exhibited higher Brix than the commercially available spinach. Specifically, in the case of no heating, water suppression is higher and hence higher Brix was obtained.

Example 17

1. Effect of Heating in Winter

A sieve basket of 18×28×7.5 cm was set in a Styrofoam box (internal volume: about 26 L). A film was stuck in the sieve basket, of which the soil was spread to a thickness of about 2 cm to prepare a cultivation bed. 20 L of a nutrient fluid was added into the box, which was heated to 19° C. by a heater. Young seedlings were planted in the soil, and the growth of the plant was observed with or without heating.

TABLE 20

| heating | yes (19° C.) | no |
|---|---|---|
| number of seedlings | spinach 12 | spinach 12 |
| weight of plant body (g) (average) | 7 | <2 |

Film: PVA of 40 μm (mfd. by Aicello Chemical Co., Ltd.)
Soil: Supermix A (moisture 70%) (Sakata Seed Corporation)
Seedling: Spinach (Dimple, Sakata Seed Corporation)
Nutrient fluid: Hyponex stock New type (mfd. by Hyponex Japan Co., Ltd.)
EC of diluted aqueous solution of Hyponex stock: 2.8
Heater for a nutrient fluid: 150 W (mfd. by Kotobuki-Kogei Co., Ltd.)
Test period: Dec. 28, 2002 to Feb. 16, 2003
(Yokohama City)

2. Effect of Cooling in Summer

A film was stuck in a Styrofoam box (internal volume; about 15 L), on which a soil with a moisture content of about 70% was spread to a thickness of about 2 cm to prepare a cultivation bed. 4-6.5 L of a nutrient fluid was added into the box, which was circulated by a cooling device. Young seedlings were planted in the soil, and the growth of the plant was observed with or without cooling.

TABLE 21

| cooling | | yes (20° C.) | no |
|---|---|---|---|
| number of seedlings (sown on June 11) | | spinach 7 | spinach 7 |
| amount of nutrient fluid | (6/23) | 6.5 | 4 |
| additional | (7.26) | 2 | 2 |
| mulching film | | Yes | Yes |
| weight of plant body (g) (average of seven seedlings) | | 8.5 | 6.7 |

Film: PVA of 40 μm (mfd. by Aicello Chemical Co., Ltd.)
Mulching film: Silver mulching film of 30 μm (mfd. by Tokankosan Co., Ltd.)
Soil: Vermiculite (mfd. by Showa Vermiculite Co., Ltd.)
Seedling: Spinach (Okame, Takii & Co., Ltd.)
Nutrient fluid: Matsuzaki No. 1, 6 g/8 L, Matsuzaki No. 2, 4 g/8 L (mfd. by Matsuzaki Agribusiness Co., Ltd.)
EC: 2.7
Cooling device: Rei Sea LX-502XC type (mfd. by Rei Sea Co., Ltd.)
Test period: June 23 to Aug. 5, 2003

3. Summary of Results

Tables 20 and 21 show the results, and FIGS. 35-38 show photographs of the state of growth at the time of planting and at the end of cultivating. The mean weight of the plant in the winter is 2 g or less under no heating and increased to 7 g under heating, and in the case of summer, it is 6.7 g without cooling and increased to 8.5 g with cooling.

The optimum temperature for growth of spinach is thought to be 15-20° C. It was demonstrated that by heating or cooling the only rhizophere region in the suitable temperature range, favorable growth can be obtained even in winter or summer without heating or cooling the whole of the environment.

Example 18

In a similar manner to Example 16, inside of a Styrofoam container (internal volume: 60 cm wide×15 cm deep×about 3 m long) was wrapped with a polymer sheet with a thickness of 2 mm to prepare a pool for cultivation. A nutrient fluid was added into the pool, the surface was covered with a film, and the soil was placed thereon to a thickness of about 2 cm to prepare a cultivation bed.

To the soil, water was added and young seedlings were planted, and the growth of the plant was observed by the presence or absence of a mulching film for preventing of water evaporation.

[Test Conditions and Results]
Film: PVA of 40 μm (mfd. by Aicello Chemical Co., Ltd.)
Soil: Vermiculite (mfd. by Showa Vermiculite Co., Ltd.)
Mulching film: Aluminum foil (mfd. by Alpha Mic Co., Ltd.)
Nutrient fluid: Matsuzaki No. 1, 6 g/8 L, Matsuzaki No. 2, 4 g/8 L (mfd. by Matsuzaki Agribusiness Co., Ltd.), 45 L
EC: 1.3,
Test period: May 19 to Jun. 14, 2003

TABLE 22

| soil | vermiculite | vermiculite |
|---|---|---|
| Mulching film | aluminum foil | none |
| number of seedlings (sown on May 3) | rucola 4 | rucola 4 |
| weight of plant body (g) (average of four seedlings) | 16.3 | 6.3 |
| Brix (%) of leaf of plant body | 3.8 | 5.2 |

TABLE 23

| soil | Satsuma pumice (pumice) | Satsuma pumice (pumice) |
|---|---|---|
| Mulching film | aluminum foil | none |
| number of seedlings (sown on May 3) | sunny lettuce 4 | sunny lettuce 4 |
| weight of plant body (g) (average of four seedlings) | 13.7 | 7.0 |
| Brix (%) of leaf of plant body | 3.0 | 3.6 |

As shown in Table 22 and Table 23, in the system of rocket/vermiculite, the weight of the plant increased from 6.3 g in the absence of the mulching film to 16.3 g in its presence. On the other hand, in the system of sunny lettuce/pumice, the weight of the plant increased from 7 g in the absence of the mulching film to 13.7 g in its presence. FIGS. 39 and 40 show the state of growth of rocket and sunny lettuce in the presence or absence of the mulching film.

The above tests in which types of soil and types of plant were varied revealed that by preventing the evaporation of water from the surface of soil, the growth of plant can be controlled.

Example 19

In a similar manner to 2 of Example 16, the inside of a Styrofoam container (internal volume: 60 cm wide×15 cm deep×about 3 m long) was wrapped with a polymer sheet with a thickness of 2 mm to prepare a pool for cultivation. A nutrient fluid was added into the pool, the surface was covered with a film, and the soil was spread thereon to a thickness of about 2 cm to prepare a cultivation bed.

To the soil, water was added and young seedlings were planted, and the growth of the plant was grown using a silver mulching film, and the amount of the nutrient fluid consumed was measured.

Area of Styrofoam container: 60 cm×310 cm
Nutrient fluid: Matsuzaki No. 1, 6 g/8 L, Matsuzaki No. 2, 4 g/8 L (mfd. by Matsuzaki Agribusiness Co., Ltd.), 52 L
EC: 2.7
Film: PVA of 40 μm in thickness, 1 m in width and 4 m in length (mfd. by Aicello Chemical Co., Ltd.)
Soil: Vermiculite (mfd. by Showa Vermiculite Co., Ltd.), about 2 cm in depth
Mulching film: Silver mulching film of 30 μm in thickness, 95 cm in width and 3.1 m in length (mfd. by Tokankosan Co., Ltd.)
Seedling: 14 pieces of Rocket, 14 pieces of sunny lettuce
Test period; June 15 to Jul. 9, 2003

| [Result] | Start (6/15) | End (7/9) |
|---|---|---|
| Amount of nutrient fluid | 52 | 42 |
| Amount consumed of nutrient fluid (L/seedling/day) | 10 | 0.015 |

Example 20

Figure 41:
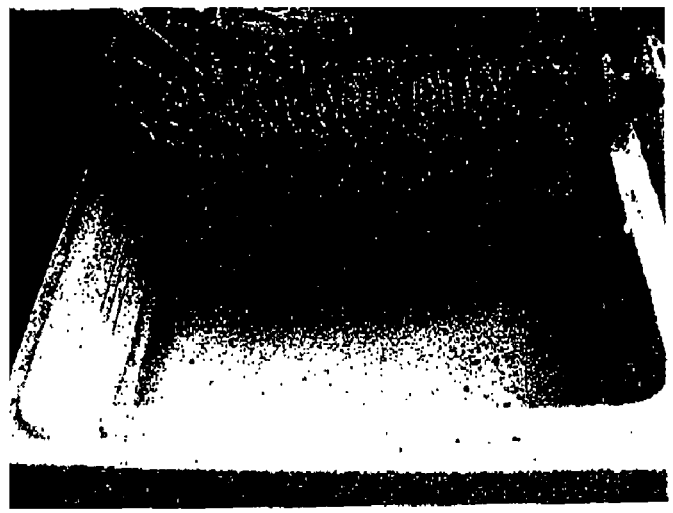
FIG. 41 is a photograph of a nutrient fluid at the time of 39 days after the start of the cultivation of mini tomato.
Figure 42:
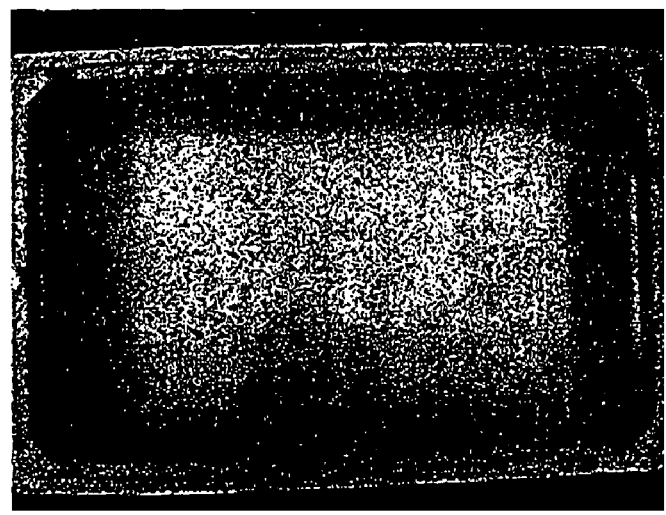
FIG. 42 is a photograph of a nutrient fluid at the time of 20 days after the start of the cultivation of rocket and sunny lettuce.
Figure 43:
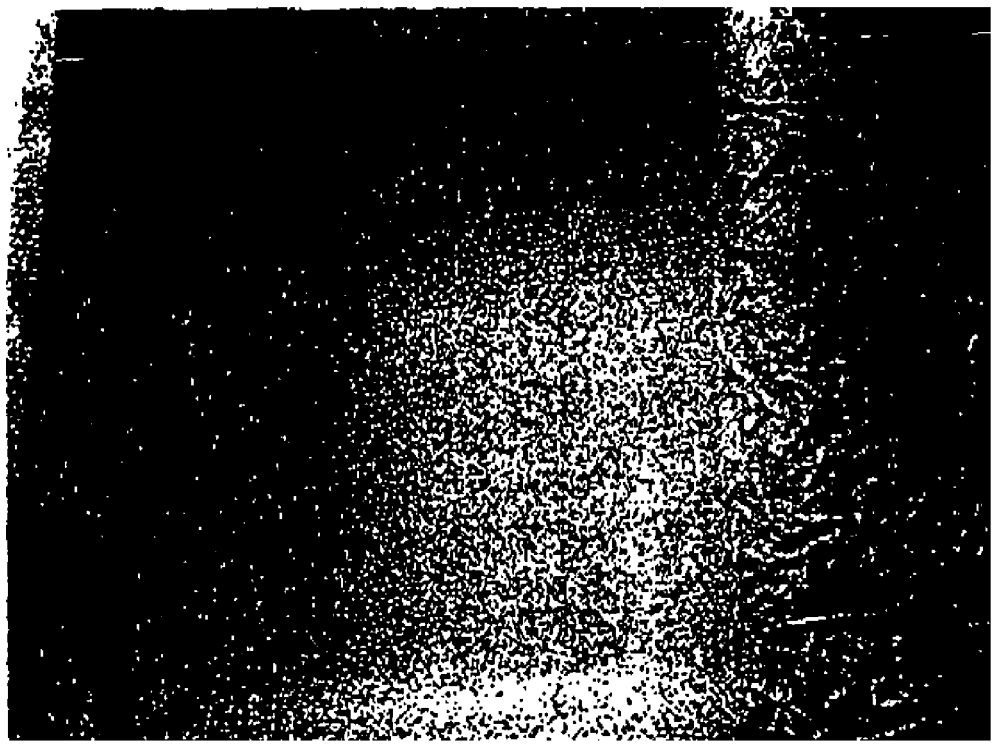
FIG. 43 is a photograph of a nutrient fluid at the time of 43 days after the start of the cultivation of spinach.

The degree of contamination of the nutrient fluid after a plant was grown in the system (the method of Example 15 or 2 of Example 17 of the present invention) was observed. As photographs in FIG. 41 to FIG. 43 show the state of the nutrient fluid when mini tomato, rocket, sunny lettuce and spinach were cultivated, all of the nutrient fluid were very clear.

1. Mini Tomatoes 2.2 L of a nutrient fluid was added into a Styrofoam box (internal volume 11 L), and its surface was covered with a PVA film of 40 μm. Vermiculite was spread thereon at 0.6 g/cm$^2$ and the moisture was adjusted to about 70% to prepare a cultivation bed. Seedlings of mini tomato were planted and grown in a hothouse.

[Test Condition]
Film: PVA of 40 μm (Aicello Chemical Co., Ltd.) Cultivating soil: Vermiculite (mfd. by Nittai K.K.), 0.6 g/cm$^2$
Nutrient fluid: 500×diluted solution of Hyponex stock (Hyponex Japan Co., Ltd.) (EC:1.28), On May 20, 2 L of the nutrient fluid was supplemented.
Seedling: Mini tomatoes
Culture period: April 16 to Jun. 29, 2003
FIG. 41 shows a photograph of a nutrient fluid at the time of 39 days after the start of cultivation.

2. Cultivation of Sunny Lettuce and Rocket

4 L of a nutrient fluid was added into a Styrofoam box (internal volume 15 L), and its surface was covered with a PVA film of 40 μm. Vermiculite was spread thereon at 0.3 g/cm$^2$ and the moisture was adjusted to about 70% to prepare a cultivation bed. Seedlings of rocket and sunny lettuce were placed in the soil and grown in a hothouse.

[Test Condition]
Film: PVA of 40 μm (mfd. by The Nippon Synthetic Chemical Industry Co., Ltd.)
Soil: Vermiculite (mfd. by Showa Vermiculite K.K.)
Nutrient fluid: Matsuzaki No. 1 and No. 2 (mfd. by Matsuzaki Agribusiness Co., Ltd.), EC:2.7
Seedling: Three pieces of Sunny lettuce and rocket, respectively
Culture period: June 27 to Jul. 13, 2003
FIG. 42 shows a photograph of a nutrient fluid at the time of 20 days after the start of cultivation and it was very clear.

3. Cultivation of Spinach

4 L of a nutrient fluid was added into a Styrofoam box (internal volume 15 L), and its surface was covered with a PVA film of 40 μm. Vermiculite was spread thereon at 0.3 g/cm$^2$ and the moisture was adjusted to about 70% to prepare a cultivation bed. Seedlings of spinach were planted and grown in a hothouse.

[Test Condition]
Film: PVA of 40 μm (mfd. by The Nippon Synthetic Chemical Industry Co., Ltd.)
Soil: Vermiculite (mfd. by Showa Vermiculite K.K.),
Mulching film: Silver mulching film of 30 μm (mfd. by Tokan Kosan K.K.)
Nutrient fluid: Matsuzaki No. 1 and No. 2 (mfd. by Matsuzaki Agribusiness Co., Ltd.), EC:2.7
Seedling: 7 pieces of spinach "Okame" (Takii & Co., Ltd.),
Culture period: June 23 to Aug. 5, 2003
FIG. 43 shows a photograph of a nutrient fluid at the time of 43 days after the start of cultivation and it was very clear.

Example 21

Using a sieve basket bowl set (the radius of the sieve basket is 6.4 cm and the content is 130 cm$^3$) in a manner similar to Example 7, a film of 20×20 cm was placed on the sieve basket, to which 150 g of tap water was added, and 150 g of saline solution was added to the ball side, covered with SARAN wrap (a polyvinylidene chloride film), and left to stand at room temperature. At each sampling time, a nutrient fluid at the water side (sieve basket) and the saline solution side (bowl) were well agitated, and then sampled using a dropper to determine the EC value.

1) Film: Hydrophilic polyester films (mfd. by Dupont) and PVA films with different thickness (mfd. by The Nippon Synthetic Chemical Industry Co., Ltd.) were used.

Hydrophilic polyester films: K06-20 µm, K06-40 µm, CRP06-75 µm (mfd. by Dupont)

PVA films: #2500 (25 µm), 34000 (40 µm), #6500 (65 µm) (mfd. by The Nippon Synthetic Chemical Industry Co., Ltd.)

2) 0.5% saline: 0.5% by weight of "Hakatano Sio" (mfd. by Hakata Engyo Co., Ltd.) was dissolved in tap water.

Hakatano Sio: 100 g contains 37.5 g of sodium, 110 mg of magnesium, 90 mg of calcium and 50 mg of potassium.

3) Experimental Method

Measurement of EC: A small amount of solution sampled using a dropper was placed on the measuring site of the conductometer, and the electric conductivity EC (dS/m) was measured using Twin Cond B-173, (Horiba Ltd.).

Period: Aug. 26-31, 2003

Figure 44:
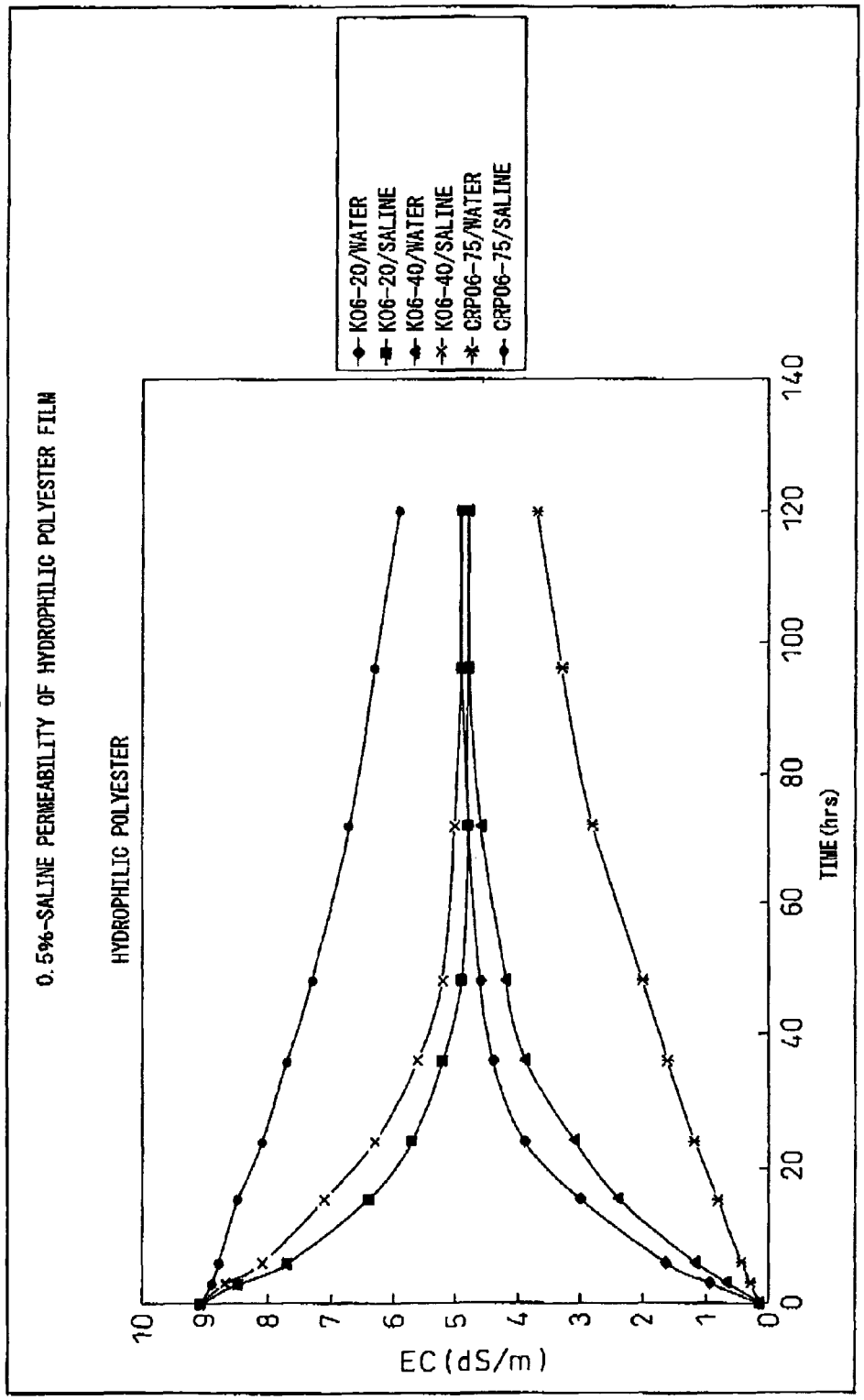
FIG. 44 is a graph showing the permeability of a 0.5%-saline solution through hydrophilic polyester films of various thicknesses.
Figure 45:
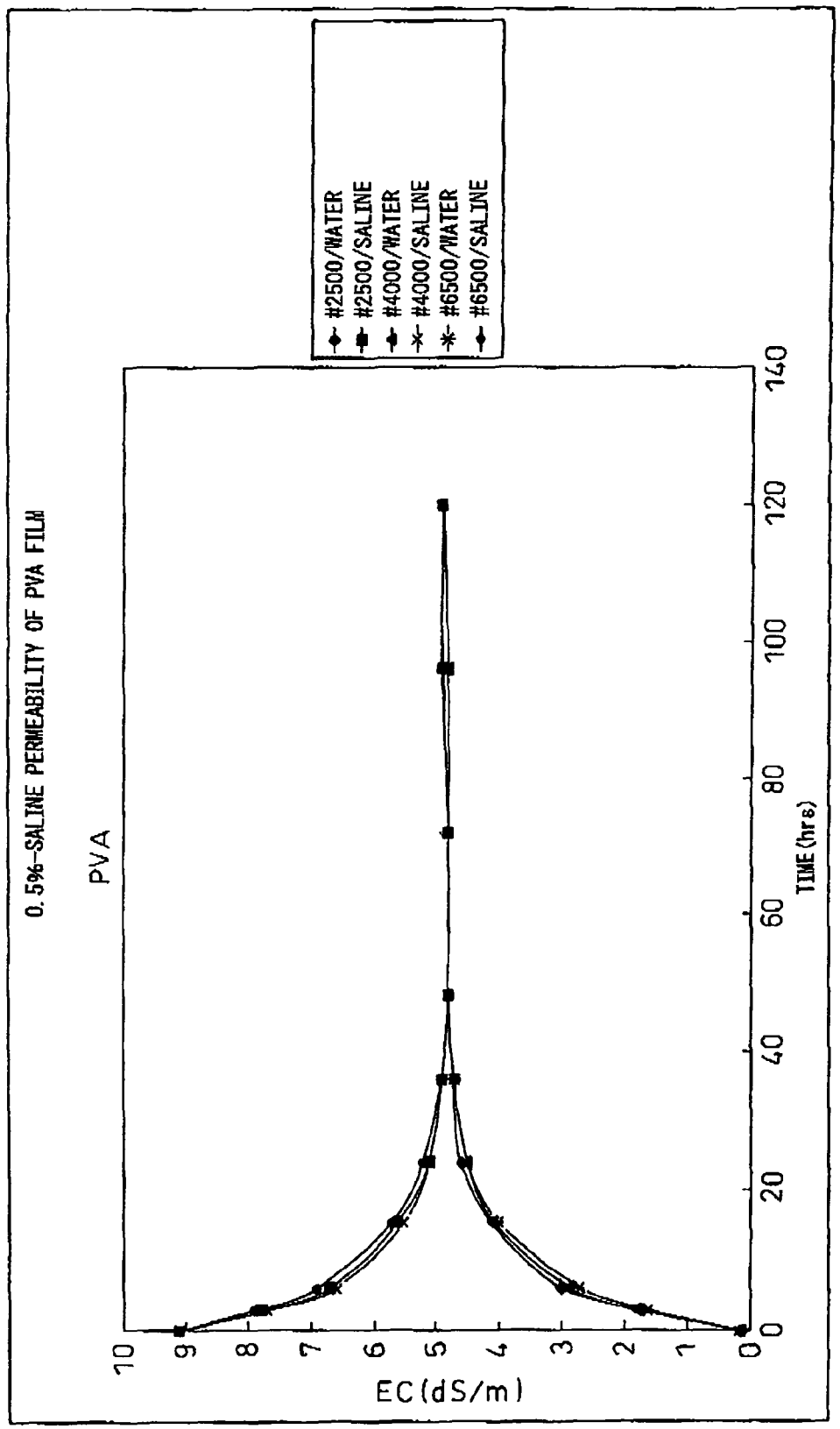
FIG. 45 is a graph showing the permeability of a 0.5%-saline solution through PVA films of various thicknesses.

Results for the hydrophilic polyester films are shown in Table 24 and FIG. 44, and those for the PVA films are shown in Table 25 and FIG. 45.

The above FIG. 44 and FIG. 45 revealed that for both of the hydrophilic polyester films and the PVA films the EC value at the water side increases, the EC value at the saline solution side decreases and the values of them reach almost the same value with time. In the case of the hydrophilic polyester films, in the range of film thickness of 20-75 µm, the increasing rate of the EC value of the water side and the decreasing rate of the EC value of the saline solution side become slower as the thickness increases, i.e. permeability to 0.5% saline solution has markedly decreased. On the other hand, in the case of the PVA films, in the range of film thickness of 20-65 µm, permeability to 0.5% saline solution changes little even when the thickness increases.

TABLE 24 hydrophilic polyester unit: dS/m

| Time (hrs) | K06-20/ water | K06-20/ saline | K06-40/ water | K06-40/ saline | CRP06-75/ water | CRP06-75/ saline |
|---|---|---|---|---|---|---|
| 0 | 0.15 | 9.1 | 0.15 | 9.1 | 0.15 | 9.1 |
| 3 | 0.94 | 8.5 | 0.7 | 8.7 | 0.28 | 8.9 |
| 6 | 1.64 | 7.7 | 1.19 | 8.1 | 0.43 | 8.8 |
| 15.5 | 3 | 6.4 | 2.4 | 7.1 | 0.82 | 8.5 |
| 24 | 3.9 | 5.7 | 3.1 | 6.3 | 1.19 | 8.1 |
| 36 | 4.4 | 5.2 | 3.9 | 5.6 | 1.61 | 7.7 |
| 48 | 4.6 | 4.9 | 4.2 | 5.2 | 2 | 7.3 |
| 72 | 4.8 | 4.8 | 4.6 | 5 | 2.8 | 6.7 |
| 96 | 4.8 | 4.9 | 4.8 | 4.9 | 3.3 | 6.3 |
| 120 | 4.8 | 4.9 | 4.8 | 4.9 | 3.7 | 5.9 |

TABLE 25

PVA unit: dS/m

| Time (hrs) | #2500/ water | #2500/ saline | #4000/ water | #4000/ saline | #6500/ water | #6500/ saline |
|---|---|---|---|---|---|---|
| 0 | 0.15 | 9.1 | 0.15 | 9.1 | 0.15 | 9.1 |
| 3 | 1.69 | 7.8 | 1.79 | 7.7 | 1.63 | 7.9 |
| 6 | 3 | 6.7 | 2.9 | 6.6 | 2.7 | 6.9 |
| 15.5 | 4.1 | 5.6 | 4.1 | 5.5 | 4 | 5.7 |
| 24 | 4.6 | 5.1 | 4.5 | 5.1 | 4.5 | 5.2 |
| 36 | 4.7 | 4.9 | 4.7 | 4.9 | 4.7 | 4.9 |
| 48 | 4.8 | 4.8 | 4.8 | 4.8 | 4.8 | 4.8 |
| 72 | 4.8 | 4.8 | 4.8 | 4.8 | 4.8 | 4.8 |
| 96 | 4.9 | 4.9 | 4.8 | 4.8 | 4.9 | 4.9 |
| 120 | 4.9 | 4.9 | 4.9 | 4.9 | 4.9 | 4.9 |

Example 22

A nutrient fluid was placed in a Styrofoam box, and the surface was covered with a film. Onto the film, seeds that were subjected to a different treatment method as described below were sown, and the box was covered with a Silver mulching film, and the box was placed near the window in the room. On day 2, the Silver mulching film was removed, and covered with SARAN wrap (a polyvinylidene chloride film) (mfd. by Asahi Kasei Corp.), which was subjected to light because the Silver mulching film is opaque but the SARAN wrap (a polyvinylidene chloride film) is clear, and the state of growth was observed at the time of day 4.

In experiment No. 2, Shoji paper was stacked on a PVA film, on which seeds were sown. Table 26 shows the test condition.

TABLE 26

| | No. 1 | No. 2 |
|---|---|---|
| film | PVA | PVA + Shoji paper |
| size of styrofoam box (cm) | 30 × 21 × 8 | 30 × 21 × 8 |
| nutrient fluid (EC: 1.5) | 2 L | 2 L |
| seed | rucola, broccoli | rucola, broccoli |
| condition for seed pre-treatment | 1)–4) | 1)–4) |

[Test Condition and Results]

Film: PVA of 40 µm (mfd. by The Nippon Synthetic Chemical Industry Co., Ltd.)

Shoji paper: No patterns, pulp (85%), rayon (10%), binder (5%) (mfd. by L-Home)

Mulching film: Polysilver mulching film of 30 µm (Tokankosan Co., Ltd.)

Nutrient fluid; Otsuka House No. 1, No. 2 (mfd. by Otsuka Chemical Co., Ltd.), nutrient fluid EC:1.5

Figure 46:
FIG. 46 is a photograph (magnification: ×0.5) showing the state of seeds (rocket) which have been allowed to germinate by being disposed on a PVA film.
Figure 47:
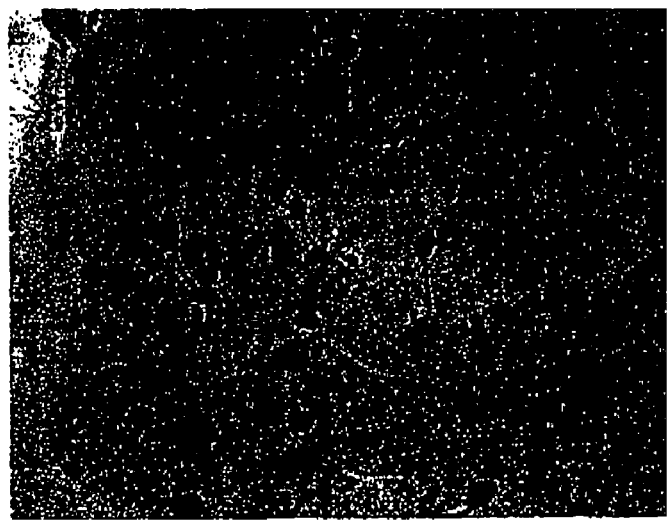
FIG. 47 is a photograph (magnification: ×0.5) showing the state of seeds (broccoli) which have been allowed to germinate by being disposed on a PVA film stacked with a Shoji paper.

Test period: September 6 to Sep. 10, 2003 Pre-treatment condition for seeds:

1) No treatment (seeds are sown as they are, and moisture is gently given using a sprayer)
2) Immerse in water for 30 minutes
3) Immerse in a 100×diluted aqueous solution of a gardening energizer, Menedael (mfd. by Menedael Co., Ltd.) for 30 minutes
4) Immerse in a 1000×diluted aqueous solution of Microorganism Soil amendment, EM1 (mfd. by EM laboratory) for 30 minutes Photographs of growth of the plant at the time of four days obtained as above are shown in FIG. 46 and FIG. 47. These figures revealed that any of No. 1 (the PVA film alone was used) and No. 2 (the PVA film stacked with Shoji paper was used) have well germinated and grown.

Example 23

Into a plastic box (30×22×5 cm), 2 L of a nutrient fluid (EC: 2.0 dS/m) was added, a PVA film (40×32 cm) was spread, and covered with a mulching film.

The mulching film was cut like x mark at an interval of every 10 cm, through the cut portion, six young seedlings of sunny lettuce having 3 to 4 main leaves, whose seeds (mfd. by Tohoku K.K.) were grown for 34 days, were planted, and the state of growth thereafter was observed.

[Test Condition and Results]
Film: PVA of 40 μm (mfd. by The Nippon Synthetic Chemical Industry Co., Ltd.)
Mulching film: Polysilver mulching film (mfd. by Tokan Kosan K.K.)
Nutrient fluid: Otsuka House No. 1, 1.5 g/L, No. 2 1 g/L (mfd. by Otsuka Chemical Co., Ltd.), 2 L
EC:2.0
Test period: December 8 to Dec. 30, 2003
As shown in FIGS. 49A and 49B, it can be observed that even when a soil or a similar substance is absent, seedling has grown.

Example 24

Into a Styrofoam box (32×24×13 cm), 6 L of a nutrient fluid (EC:2.7 dS/m) was added, and a PVA film (60×50 cm) was spread. Thereupon, a cell tray (cell: 3 cm in diameter and 4.5 cm in depth, mfd. by Takii & Co., Ltd.) which is commonly used for growing seedlings, was placed upside down, and covered with a mulching film.

The mulching film was cut like x mark at an interval of every 15 cm, and through the cut portion of the mulching film and a hole on the bottom of the cell tray facing upward, young seedlings of rocket (at the time of day 29 after sowing seeds mfd. by Takii & Co., Ltd.) were planted. The state of growth thereafter was observed.

Figure 51:
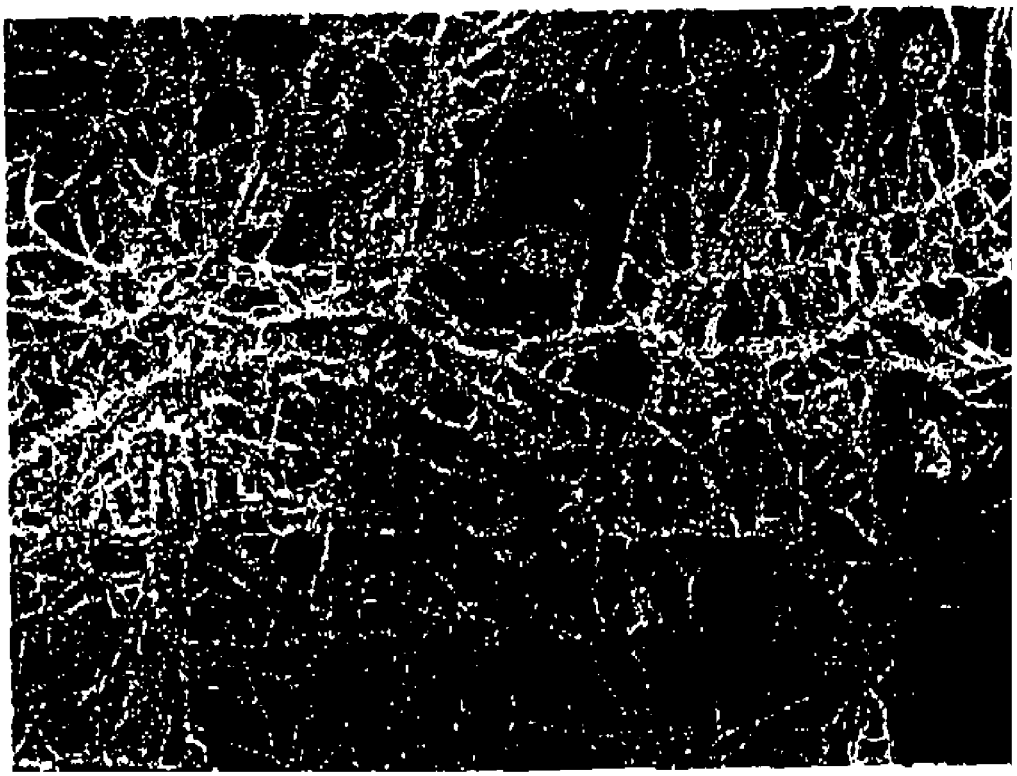
FIG. 51 is a photograph showing the back side of a cell tray obtained in Example 24.

[Test Condition and Results]
Film: PVA of 40 μm (mfd. by The Nippon Synthetic Chemical Industry Co., Ltd.)
Mulching film: Polysilver mulching film (Tokankosasn Co., Ltd.)
Nutrient fluid: Otsuka House No. 1, 1.5 g/L, No. 2 1 g/L (mfd. by Otsuka Chemical Co., Ltd.), 2 L
EC:2.6
Test period: September 7 to Nov. 15, 2003
As shown in FIGS. 50A and 50B, it can be observed that though a cell tray that supports seedlings is present, seedlings have grown even if a space exists between the seedling and the film. From FIG. 51 that shows a photograph of the backside of the tray, it can be seen that the root of rocket has well developed at the interface of the tray and the PVA film.

Example 25

Into a Styrofoam box (30×22×8 cm), 2.5 L of a nutrient fluid (EC:2.6 dS/m) was added, and a PVA film was spread. Thereupon, a soft polyurethane foam was placed, and covered with a mulching film.

The mulching film and the polyurethane foam were cut like x mark at an interval of every 15 cm, and through the opening young seedlings of sunny lettuce (at the time of day 17 after sowing seeds mfd. by Takii & Co., Ltd.) were planted. The state of growth thereafter was observed.

Figure 53:
FIG. 53 is a photograph showing the back side of a polyurethane foam obtained in Example 25.

[Test Condition and Results]
Film: PVA of 40 μm (mfd. by The Nippon Synthetic Chemical Industry Co., Ltd.)
Soft polyurethane foam: (mfd. by Shinwa Co., Ltd.)
Mulching film: Polysilver mulching film (Tokankosan Co., Ltd.)
Nutrient fluid: Matsuzaki No. 1 6 g/8 L, Matsuzaki No. 2, 4 g/8 L (mfd. by Matsuzaki Agribusiness Co., Ltd.)
EC:2.6, 2.5
Test period: July 19 to Sep. 8, 2003
As shown in FIGS. 52A and 52B, it can be seen that plant can grow even if a synthetic polymer which is not a common natural soil, is used as a support. From FIG. 53 that shows a photograph of the backside of the polyurethane foam, it can be seen that the root of sunny lettuce has well developed at the interface of the polyurethane foam and the PVA film.

Example 26

(Measurement of Water Content)

300 ml of water was added to a polypropylene-capped plastic container (15×11×4 cm), and three types of PVA films (10×20 cm) having a different thickness and one type of a hydrophilic polyester film (10×20 cm) were immersed therein, which was maintained in a box keeping the inside temperature constant for 20 hours. After 20 hours the films were taken out, and the water on the surface thereof was immediately wiped and weighed ($W_T$ g). With the weight at dry being set as $W_O$ g, water content (%)=$(W_T-W_O)/W_T \times 100$ was determined.

The measurement temperatures were 5, 20, 35° C., and samples were measured at n=2 for each temperature.
PVA film: PVA#2500 (25 μm), 40000 (40 μm), #6500 (65 μm) (mfd. by The Nippon Synthetic Chemical Industry Co., Ltd.)
Hydrophilic polyester film: K06-40 (40 μm) (mfd. by Dupont)
Box of keeping the inside temperature: Model ERV740 (volume: 9 L, power consumption: 75 W) (mfd. by Matsushita Electric Works, Ltd.)

(Results)

Figure 54:
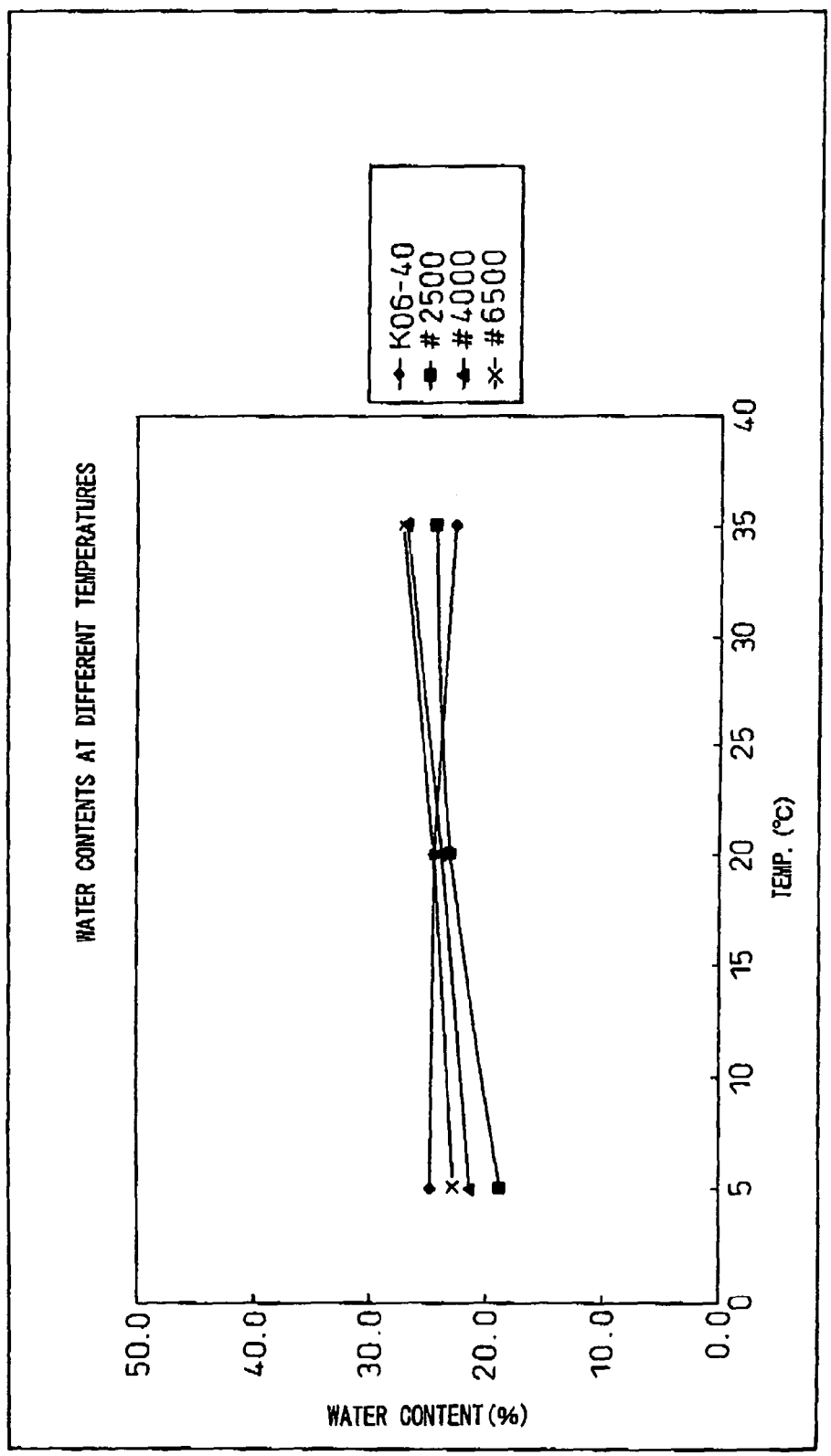
FIG. 54 is a graph showing temperature dependence of the water content of the several films obtained in Example 26.

FIG. 54 shows a change in the water content by temperature; As can be shown by this graph, the water content of PVA film tends to increase as temperature rises. In hydrophilic polyester film, unlike PVA film, water content tends to decrease as temperature lowers. The difference in water content by the difference in the film thickness of PVA film or the type of polymers is not markedly large, and is about 20-28% including changes in temperature.

INDUSTRIAL APPLICABILITY

According to the present invention, as described above, there is provided a plant-cultivating device having a film capable of being substantially integrated with the root of a plant; a plant-film integrate having a plant and a film which has substantially been integrated with the root of the plant; and a plant-cultivating method which comprises using the plant-cultivating device.

In the plant-cultivating device according to the present invention having the above configuration, the root of the plant and the nutrient fluid (a liquid containing a fertilizer component) are not in the direct contact, i.e., the functions of the supply of oxygen to the plant body and of the supply of water and a fertilizer component are being preferably separated. Thus, according to the present invention, plant can effectively utilize oxygen in the air, and can easily solve the problem of the conventional nutrient fluid cultivation, such as the difficulty in supply of oxygen to root, necessity of strict control of the nutrient fluid, the contamination of the nutrient fluid from root or the contamination of pathogenic microorganism of plat from the nutrient fluid, etc.

Further, by using the plant-cultivating device according to the present invention, it becomes very easy to place the plant to be cultivated under a water-suppressed condition so that the plant can be changed into a high-quality one.

In addition, according to the present invention, a fertilizer component or nutrient in the nutrient fluid side in contact through the film can be effectively utilized, and therefore it is possible to cultivate useful plant while reducing excessively high level of nutrient component. For example, it becomes possible to amend water quality of lakes, etc. by contacting polluted water such as lakes (for example, by floating one or more) with the plant-cultivating device according to the present invention.

The invention claimed is:

1. A plant-cultivating system comprising:
    a container having a shape capable of receiving a plant to be cultivated;
    an aqueous fertilizer solution accommodated in said container; and
    a hydrophilic film having a water impermeability of 10 cm or more in terms of water pressure resistance as measured in accordance with JIS (Japanese Industrial Standards) L1092 (method B), said hydrophilic film for cultivating a plant thereon, and being placed on said aqueous fertilizer solution in a manner such that the lower surface of said hydrophilic film is in contact with the surface of the aqueous fertilizer solution, and said aqueous fertilizer solution affecting the growth of the plant.

2. A plant-cultivating system according to claim 1, wherein the film shows an electrical conductivity (EC) difference of 4.5 dS/m or less as determined by a method comprising contacting water with a saline solution having a salt concentration of 0.5% by weight through said hydrophilic film, measuring respective electrical conductivities of the water and the saline solution 4 days (96 hours) after the start of the contact, and calculating the difference in electrical conductivity between the water and the saline solution.

3. A plant-cultivating system according to claim 1, wherein the film shows a Brix concentration (%) difference of 4% or less as determined by a method comprising contacting water with a glucose solution having a glucose concentration of 5% by weight through said hydrophilic film, measuring respective Brix concentrations (%) of the water and the glucose solution 3 days (72 hours) after the start of the contact, and calculating the difference in Brix concentration (%) between the water and the glucose solution.

4. A plant-cultivating system according to claim 1, wherein the film shows a peeling strength of 10 g or more relative to roots of a plant in terms of a strength needed to peel off the roots of the plant from said film as measured by a method comprising cultivating a plant on the hydrophilic film in said plant-cultivating system, and peeling off roots of the plant from said film 35 days after the start of cultivation of the plant on said film to measure the strength (g) needed for the peeling.

5. A plant-cultivating system according to claim 1, wherein the hydrophilic film is made of a material selected from the group consisting of polyvinyl alcohol (PVA), cellophane, cellulose acetate, cellulose nitrate, ethyl cellulose, and polyester.

6. A plant-cultivating system according to claim 1, wherein the hydrophilic film has a thickness of 5-200 μm.

7. A plant-cultivating system according to claim 1, wherein the hydrophilic film is laminated on a porous material.

8. A plant-cultivating system according to claim 7, wherein the porous material is an unwoven fabric or a sponge having communicating pores, wherein the unwoven fabric or sponge is made of a material selected from the group consisting of polyethylene, polypropylene, polyethylene terephthalate, polyamide, polyvinyl alcohol, and cellulose.

9. A plant-cultivating method, comprising:
    (1) providing a plant-cultivating system comprising:
    a container having a shape capable of receiving a plant to be cultivated;
    an aqueous fertilizer solution accommodated in said container; and
    a hydrophilic film having a water impermeability of 10 cm or more in terms of water pressure resistance as measured in accordance with JIS (Japanese Industrial Standards) L1092 (method B), said hydrophilic film placed on said aqueous fertilizer solution in a manner such that the lower surface of said hydrophilic film is in contact with the surface of said aqueous fertilizer solution;
    (2) disposing a plant on said hydrophilic film in the system;
    (3) allowing the aqueous fertilizer solution to affect the plant growth through the hydrophilic film; and
    (4) allowing roots of the plant to grow on and integrate with the hydrophilic film, thereby cultivating the plant on said hydrophilic film with an aqueous fertilizer solution.

10. A plant-cultivating method according to claim 9, wherein said plant cultivation system further comprises a plant-retaining support disposed on said hydrophilic film.

* * * * *